United States Patent
Stover et al.

(10) Patent No.: US 11,629,072 B2
(45) Date of Patent: Apr. 18, 2023

(54) LIQUID SOLUTION CONCENTRATION SYSTEM COMPRISING ISOLATED SUBSYSTEM AND RELATED METHODS

(71) Applicant: Gradiant Corporation, Woburn, MA (US)

(72) Inventors: Richard Stover, Waltham, MA (US); Looh Tchuin Choong, Singapore (SG); Maximus G. St. John, Boston, MA (US); Prakash Narayan Govindan, Singapore (SG)

(73) Assignee: Gradiant Corporation, Woburn, MA (US)

( * ) Notice: Subject to any disclaimer, the term of this patent is extended or adjusted under 35 U.S.C. 154(b) by 0 days.

(21) Appl. No.: 17/270,142

(22) PCT Filed: Aug. 22, 2019

(86) PCT No.: PCT/US2019/047609
§ 371 (c)(1),
(2) Date: Feb. 22, 2021

(87) PCT Pub. No.: WO2020/041542
PCT Pub. Date: Feb. 27, 2020

(65) Prior Publication Data
US 2021/0179452 A1    Jun. 17, 2021

Related U.S. Application Data

(60) Provisional application No. 62/721,015, filed on Aug. 22, 2018.

(51) Int. Cl.
*B01D 61/02* (2006.01)
*C02F 1/44* (2023.01)
*C02F 103/08* (2006.01)

(52) U.S. Cl.
CPC ............ *C02F 1/441* (2013.01); *B01D 61/025* (2013.01); *B01D 61/026* (2022.08);
(Continued)

(58) Field of Classification Search
CPC .. B01D 61/002; B01D 61/58; B01D 2321/06; B01D 61/005; B01D 61/022;
(Continued)

(56) References Cited

U.S. PATENT DOCUMENTS 2,151,990 A  3/1939  Ruys
2,606,820 A  8/1952  Harms
(Continued)

FOREIGN PATENT DOCUMENTS

CA    2816746 A1    11/2012
CA    2821453 A1    11/2012
(Continued)

OTHER PUBLICATIONS

International Search Report and Written Opinion for International App. No. PCT/US2019/047609 dated Nov. 1, 2019.
(Continued)

*Primary Examiner* — Patrick Orme
(74) *Attorney, Agent, or Firm* — Wolf, Greenfield & Sacks, P.C.

(57) ABSTRACT

Liquid solution concentration systems, and related methods, are generally described. In some embodiments, the system is an osmotic system comprising a plurality of osmotic modules. For example, the osmotic system can comprise a feed osmotic module configured to produce an osmotic module retentate outlet stream having a higher concentration of solute than the retentate inlet stream transported to the feed osmotic module. The osmotic system can also comprise an isolation osmotic module fluidically connected to the feed osmotic module. The osmotic system can also optionally
(Continued)

comprise a purification osmotic module fluidically connected to the feed osmotic module and/or the isolation osmotic module. Certain embodiments are related to altering the degree to which the feed osmotic module retentate outlet stream is recycled back to the retentate-side inlet of the feed osmotic module during operation. Additional embodiments are related to the manner in which the retentate-side effluent from the isolation osmotic module is distributed among the system modules during operation.

23 Claims, 7 Drawing Sheets

(52) U.S. Cl.
CPC ...... B01D 2311/06 (2013.01); B01D 2311/08 (2013.01); B01D 2311/25 (2013.01); B01D 2317/022 (2013.01); B01D 2317/025 (2013.01); B01D 2317/04 (2013.01); C02F 2103/08 (2013.01); C02F 2301/046 (2013.01); C02F 2301/08 (2013.01)

(58) Field of Classification Search
CPC .............. B01D 61/025; B01D 61/026; B01D 2311/06; B01D 2311/08; B01D 2311/25; B01D 2317/022; B01D 2317/025; B01D 2317/04; C02F 1/441; C02F 1/445; C02F 1/006; C02F 2103/06; C02F 2103/08; C02F 2301/046; C02F 2301/08
See application file for complete search history.

(56) References Cited

U.S. PATENT DOCUMENTS

| | | |
|---|---|---|
| 2,606,839 A | 8/1952 | Evans |
| 2,640,018 A | 5/1953 | Heath |
| 2,997,856 A | 8/1961 | Pike |
| 3,032,482 A | 5/1962 | Shoemaker |
| 3,042,606 A | 7/1962 | Salutsky et al. |
| 3,080,302 A | 3/1963 | Rogers et al. |
| 3,236,747 A | 2/1966 | Margiloff |
| 3,331,773 A | 7/1967 | Gunderson et al. |
| 3,454,490 A | 7/1969 | Wallace |
| 3,472,766 A | 10/1969 | Rosenbaum |
| 3,475,331 A | 10/1969 | McLain |
| 3,489,652 A | 1/1970 | Williamson |
| 3,625,761 A | 12/1971 | Tate |
| 3,630,378 A | 12/1971 | Bauman |
| 3,725,209 A | 4/1973 | Rosa |
| 3,906,250 A | 9/1975 | Loeb |
| 3,922,154 A | 11/1975 | Kawasaki et al. |
| 3,926,739 A | 12/1975 | Izumi |
| 4,062,197 A | 12/1977 | Hester |
| 4,105,547 A | 8/1978 | Sandblom |
| 4,156,645 A | 5/1979 | Bray |
| 4,224,148 A | 9/1980 | Lindman et al. |
| 4,251,367 A | 2/1981 | Santora |
| 4,312,755 A | 1/1982 | Hwang |
| 4,334,886 A | 6/1982 | Tani et al. |
| 4,358,377 A | 11/1982 | Clark |
| 4,452,696 A | 6/1984 | Lopez |
| 4,478,719 A | 10/1984 | Michele et al. |
| 4,511,436 A | 4/1985 | el Din Nasser |
| 4,563,337 A | 1/1986 | Kim |
| 4,574,049 A | 3/1986 | Pittner |
| 4,576,724 A | 3/1986 | Colman et al. |
| 4,652,373 A | 3/1987 | Trimmer |
| 4,704,324 A | 11/1987 | Davis et al. |
| 4,708,805 A | 11/1987 | D'Muhala |
| 4,735,722 A | 4/1988 | Krepak |
| 4,755,298 A | 7/1988 | Grinstead |
| 4,765,897 A | 8/1988 | Cadotte et al. |
| 4,769,148 A | 9/1988 | Fibiger et al. |
| 4,770,775 A | 9/1988 | Lopez |
| 4,797,187 A | 1/1989 | Davis et al. |
| 4,806,244 A | 2/1989 | Guilhem |
| 4,812,238 A | 3/1989 | Cadotte et al. |
| 4,824,574 A | 4/1989 | Cadotte et al. |
| 4,828,700 A | 5/1989 | Fibiger et al. |
| 4,832,115 A | 5/1989 | Albers et al. |
| 4,839,203 A | 6/1989 | Davis et al. |
| 4,843,828 A | 7/1989 | Gladman |
| 4,859,338 A | 8/1989 | Behr |
| 4,859,384 A | 8/1989 | Fibiger et al. |
| 4,894,165 A | 1/1990 | Fibiger et al. |
| 4,909,943 A | 3/1990 | Fibiger et al. |
| 4,927,540 A | 5/1990 | Wessling et al. |
| 4,941,972 A | 7/1990 | Kau et al. |
| 4,944,882 A | 7/1990 | Ray et al. |
| 4,956,157 A | 9/1990 | Nasu |
| 4,957,817 A | 9/1990 | Chau et al. |
| 4,959,237 A | 9/1990 | Walker |
| 4,973,201 A | 11/1990 | Paul et al. |
| 4,980,063 A | 12/1990 | Mahoney et al. |
| 4,980,077 A | 12/1990 | Morris et al. |
| 4,981,593 A | 1/1991 | Priestley et al. |
| 4,992,485 A | 2/1991 | Koo et al. |
| 5,015,391 A | 5/1991 | Mohn |
| 5,053,132 A | 10/1991 | Sirkar |
| 5,096,590 A | 3/1992 | Watanabe et al. |
| 5,123,481 A | 6/1992 | Albers et al. |
| 5,167,828 A | 12/1992 | Emmons et al. |
| 5,190,656 A | 3/1993 | Paul et al. |
| 5,207,916 A | 5/1993 | Goheen et al. |
| 5,225,087 A | 7/1993 | Kardos |
| 5,238,574 A | 8/1993 | Kawashima et al. |
| 5,250,185 A | 10/1993 | Tao et al. |
| 5,282,995 A | 2/1994 | Paul et al. |
| 5,328,616 A | 7/1994 | Martyak et al. |
| 5,425,902 A | 6/1995 | Miller et al. |
| 5,453,205 A | 9/1995 | Browne |
| 5,464,540 A | 11/1995 | Friesen et al. |
| 5,490,937 A | 2/1996 | van Reis et al. |
| 5,503,750 A | 4/1996 | Russo, Jr. et al. |
| 5,656,161 A | 8/1997 | Solomon et al. |
| 5,670,053 A | 9/1997 | Collentro et al. |
| 5,840,195 A | 11/1998 | Delsalle et al. |
| 5,873,260 A | 2/1999 | Linhardt et al. |
| 6,010,631 A | 1/2000 | Delsalle et al. |
| 6,056,878 A | 5/2000 | Tessier et al. |
| 6,062,070 A | 5/2000 | Maltby et al. |
| 6,113,797 A | 9/2000 | Al-Samadi |
| 6,146,525 A | 11/2000 | Li et al. |
| 6,187,200 B1 | 2/2001 | Yamamura et al. |
| 6,190,556 B1 | 2/2001 | Uhlinger |
| 6,190,558 B1 | 2/2001 | Robbins |
| 6,270,671 B1 | 8/2001 | Shorr et al. |
| 6,299,766 B1 | 10/2001 | Permar |
| 6,319,409 B1 | 11/2001 | Saitou et al. |
| 6,416,668 B1 | 7/2002 | Al-Samadi |
| 6,423,235 B1 | 7/2002 | Shimoi et al. |
| 6,440,310 B1 | 8/2002 | Shorr et al. |
| 6,461,514 B1 | 10/2002 | Al-Samadi |
| 6,508,936 B1 | 1/2003 | Hassan |
| 6,547,965 B1 | 4/2003 | Chancellor |
| 6,582,605 B2 | 6/2003 | Krulik et al. |
| 6,699,369 B1 | 3/2004 | Hartman et al. |
| 6,730,234 B2 | 5/2004 | Symens et al. |
| 6,783,682 B1 | 8/2004 | Awerbuch |
| 6,817,476 B2 | 11/2004 | Donnick, Jr. et al. |
| 6,919,000 B2 | 7/2005 | Klausner et al. |
| 7,022,240 B2 | 4/2006 | Hart et al. |
| 7,048,852 B2 | 5/2006 | Ballard |
| 7,115,670 B2 | 10/2006 | Hensman et al. |
| 7,141,171 B2 | 11/2006 | Lightfoot, Jr. |
| 7,225,620 B2 | 6/2007 | Klausner et al. |
| 7,303,666 B1 | 12/2007 | Mitsis |
| 7,306,437 B2 | 12/2007 | Hauge |
| 7,316,080 B1 | 1/2008 | Woolsey |
| 7,459,084 B2 | 12/2008 | Baig et al. |
| 7,459,088 B2 | 12/2008 | Davis |

(56) References Cited

U.S. PATENT DOCUMENTS

| | | |
|---|---|---|
| 7,465,376 B2 | 12/2008 | Neubert et al. |
| 7,510,656 B2 | 3/2009 | Shafer et al. |
| 7,520,993 B1 | 4/2009 | Laraway et al. |
| 7,527,726 B2 | 5/2009 | Slough et al. |
| 7,597,784 B2 | 10/2009 | Bednarek et al. |
| 7,628,921 B2 | 12/2009 | Efraty |
| 7,678,235 B2 | 3/2010 | Deep et al. |
| 7,718,069 B2 | 5/2010 | Laraway et al. |
| 7,726,398 B2 | 6/2010 | Collins et al. |
| 7,727,400 B2 | 6/2010 | Flynn |
| 7,731,847 B2 | 6/2010 | Ton That |
| 7,815,804 B2 | 10/2010 | Nagghappan |
| 7,824,552 B2 | 11/2010 | Slabaugh et al. |
| 7,950,921 B1 | 5/2011 | Woolsey |
| 7,964,101 B2 | 6/2011 | Slough et al. |
| 8,012,358 B2 | 9/2011 | Slabaugh et al. |
| 8,043,509 B2 | 10/2011 | Thiers |
| 8,119,007 B2 | 2/2012 | Bajpayee et al. |
| 8,147,696 B1 | 4/2012 | Pandya |
| 8,152,999 B2 | 4/2012 | Lightfoot, Jr. et al. |
| 8,197,693 B2 | 6/2012 | Al-Jlil |
| 8,216,473 B2 | 7/2012 | Wohlert |
| 8,252,092 B2 | 8/2012 | Govindan et al. |
| 8,292,272 B2 | 10/2012 | Elsharqawy et al. |
| 8,366,924 B2 | 2/2013 | Vuong |
| 8,469,092 B2 | 6/2013 | Curole et al. |
| 8,496,234 B1 | 7/2013 | Govindan et al. |
| 8,501,007 B2 | 8/2013 | Bajpayee et al. |
| 8,523,985 B2 | 9/2013 | Govindan et al. |
| 8,562,824 B2 | 10/2013 | Thiers et al. |
| 8,647,477 B2 | 2/2014 | Govindan et al. |
| 8,678,080 B2 | 3/2014 | Curole et al. |
| 8,679,347 B2 | 3/2014 | Al-Samadi |
| 8,695,343 B2 | 4/2014 | Moe |
| 8,727,325 B2 | 5/2014 | Sparrow et al. |
| 8,771,477 B2 | 7/2014 | Thiers |
| 8,778,065 B2 | 7/2014 | Govindan et al. |
| 8,794,320 B2 | 8/2014 | Ayirala et al. |
| 8,820,723 B1 | 9/2014 | Sparrow et al. |
| 8,840,792 B2 | 9/2014 | Wohlert |
| 8,857,798 B1 | 10/2014 | Sparrow et al. |
| 8,889,000 B2 | 11/2014 | Hannemann et al. |
| 8,980,100 B2 | 3/2015 | Chidambaran |
| 8,999,172 B1 | 4/2015 | Zuback |
| 9,072,984 B2 | 7/2015 | Govindan et al. |
| 9,079,117 B2 | 7/2015 | Govindan et al. |
| 9,085,971 B2 | 7/2015 | Janssen et al. |
| 9,120,033 B2 | 9/2015 | Govindan et al. |
| 9,206,060 B1 | 12/2015 | Abusharkh |
| 9,221,694 B1 | 12/2015 | Govindan et al. |
| 9,266,748 B1 | 2/2016 | Govindan et al. |
| 9,266,762 B2 | 2/2016 | Wang et al. |
| 9,314,742 B2 | 4/2016 | Goodfellow |
| 9,427,705 B1 | 8/2016 | Abusharkh |
| 9,428,404 B2 | 8/2016 | Bajpayee et al. |
| 9,550,685 B2 | 1/2017 | Klausner et al. |
| 9,556,041 B2 | 1/2017 | Govindan et al. |
| 9,617,179 B2 | 4/2017 | Govindan et al. |
| 9,700,811 B2 | 7/2017 | Govindan et al. |
| 9,751,045 B2 | 9/2017 | Wohlert |
| 9,950,297 B2 | 4/2018 | Chang et al. |
| 9,957,180 B2 | 5/2018 | Govindan et al. |
| 9,969,638 B2 | 5/2018 | Govindan et al. |
| 10,245,555 B2 | 4/2019 | St. John et al. |
| 10,258,926 B2 | 4/2019 | Thiel et al. |
| 10,308,524 B1* | 6/2019 | Ahmed .................. C02F 1/445 |
| 10,518,221 B2* | 12/2019 | Choong ............... B01D 61/002 |
| 10,888,820 B2* | 1/2021 | Govindan ............ B01D 61/022 |
| 10,940,439 B1 | 3/2021 | Ahmed et al. |
| 10,953,367 B2 | 3/2021 | Chang |
| 2002/0108907 A1 | 8/2002 | Van Reis |
| 2003/0106860 A1 | 6/2003 | Peloquin et al. |
| 2003/0132166 A1 | 7/2003 | Rey |
| 2003/0178367 A1 | 9/2003 | van Reis |
| 2004/0187897 A1 | 9/2004 | Kenowski et al. |
| 2005/0023222 A1 | 2/2005 | Baillie |
| 2006/0127550 A1 | 6/2006 | Kawana et al. |
| 2006/0144787 A1 | 7/2006 | Schmidt et al. |
| 2006/0150892 A1 | 7/2006 | Mayer |
| 2006/0157409 A1 | 7/2006 | Hassan |
| 2006/0157410 A1 | 7/2006 | Hassan |
| 2007/0012556 A1 | 1/2007 | Lum et al. |
| 2007/0068791 A1 | 3/2007 | Thom et al. |
| 2007/0080113 A1 | 4/2007 | Vuong |
| 2007/0084713 A1 | 4/2007 | Deep et al. |
| 2007/0102359 A1 | 5/2007 | Lombardi et al. |
| 2007/0131428 A1 | 6/2007 | Willem Cornelis den Boestert et al. |
| 2007/0181480 A1 | 8/2007 | Lee |
| 2007/0235391 A1 | 10/2007 | Ylikangas et al. |
| 2007/0246406 A1 | 10/2007 | Dibel et al. |
| 2008/0023333 A1 | 1/2008 | Johnson |
| 2008/0073200 A1 | 3/2008 | Godshall et al. |
| 2008/0102119 A1 | 5/2008 | Grovender et al. |
| 2008/0116134 A1 | 5/2008 | Cartwright |
| 2008/0121585 A1 | 5/2008 | Mavis |
| 2008/0164206 A1 | 7/2008 | Dueker |
| 2008/0237110 A1 | 10/2008 | Lightfoot et al. |
| 2008/0245737 A1 | 10/2008 | Coulter |
| 2008/0277344 A1 | 11/2008 | SenGupta et al. |
| 2009/0020289 A1 | 1/2009 | Sharif |
| 2009/0032446 A1 | 2/2009 | Wiemers et al. |
| 2009/0101490 A1 | 4/2009 | Thiers |
| 2009/0101587 A1 | 4/2009 | Blokker et al. |
| 2009/0127210 A1 | 5/2009 | Swisher |
| 2009/0173096 A1 | 7/2009 | Wohlert |
| 2009/0173690 A1 | 7/2009 | Oklejas, Jr. |
| 2009/0194272 A1 | 8/2009 | Baillie |
| 2009/0218210 A1 | 9/2009 | Demmons et al. |
| 2009/0277634 A1 | 11/2009 | Case et al. |
| 2009/0277640 A1 | 11/2009 | Thompson et al. |
| 2009/0277641 A1 | 11/2009 | Walters et al. |
| 2009/0308820 A1 | 12/2009 | Thiers et al. |
| 2010/0032377 A1* | 2/2010 | Wohlert ............... B01D 61/022 210/652 |
| 2010/0132386 A1 | 6/2010 | Bahar |
| 2010/0163471 A1 | 7/2010 | Elyanow et al. |
| 2010/0163472 A1 | 7/2010 | Thiers et al. |
| 2010/0234795 A1 | 9/2010 | Wallenas |
| 2010/0242995 A1 | 9/2010 | Xiong et al. |
| 2010/0282675 A1 | 11/2010 | SenGupta et al. |
| 2010/0294718 A1 | 11/2010 | Treyvaud |
| 2010/0314238 A1 | 12/2010 | Frolov et al. |
| 2011/0017677 A1 | 1/2011 | Evans |
| 2011/0024354 A1 | 2/2011 | Xia et al. |
| 2011/0056822 A1 | 3/2011 | Elsharqawy et al. |
| 2011/0056878 A1 | 3/2011 | Matsushiro et al. |
| 2011/0094965 A1 | 4/2011 | Al-Samadi |
| 2011/0108484 A1 | 5/2011 | Liberman et al. |
| 2011/0114558 A1 | 5/2011 | Al-Mayahi et al. |
| 2011/0120157 A1 | 5/2011 | Wohlert |
| 2011/0155666 A1 | 6/2011 | Prakash et al. |
| 2011/0180479 A1 | 7/2011 | Cordatos et al. |
| 2011/0198285 A1 | 8/2011 | Wallace |
| 2011/0203929 A1 | 8/2011 | Buckley et al. |
| 2011/0215039 A1 | 9/2011 | Acernese et al. |
| 2011/0233137 A1 | 9/2011 | Cath et al. |
| 2011/0257788 A1 | 10/2011 | Wiemers et al. |
| 2011/0303607 A1 | 12/2011 | Vora et al. |
| 2011/0306525 A1 | 12/2011 | Lighthelm |
| 2012/0012005 A1 | 1/2012 | Burke |
| 2012/0012511 A1 | 1/2012 | Kim et al. |
| 2012/0037568 A1 | 2/2012 | Karrs et al. |
| 2012/0067819 A1 | 3/2012 | McGinnis |
| 2012/0067820 A1 | 3/2012 | Henthorne et al. |
| 2012/0090833 A1 | 4/2012 | Ligthelm et al. |
| 2012/0091061 A1 | 4/2012 | Al-Jlil |
| 2012/0125603 A1 | 5/2012 | Willingham et al. |
| 2012/0125611 A1 | 5/2012 | Ayirala et al. |
| 2012/0125861 A1 | 5/2012 | Thiers |
| 2012/0145635 A1 | 6/2012 | Lucas, III et al. |
| 2012/0174639 A1* | 7/2012 | Herron .................. C05F 17/50 71/14 |
| 2012/0199524 A1 | 8/2012 | Bly, Jr. et al. |

(56) References Cited

U.S. PATENT DOCUMENTS

| | | |
|---|---|---|
| 2012/0199534 A1 | 8/2012 | Holtzapple et al. |
| 2012/0205307 A1 | 8/2012 | Boudinar |
| 2012/0227975 A1 | 9/2012 | Ayirala et al. |
| 2012/0234664 A1 | 9/2012 | Nicoll |
| 2012/0234765 A1 | 9/2012 | SenGupta et al. |
| 2012/0267307 A1 | 10/2012 | McGinnis |
| 2012/0273417 A1 | 11/2012 | McGinnis et al. |
| 2012/0273422 A1 | 11/2012 | Wohlert |
| 2012/0279396 A1 | 11/2012 | Brammer et al. |
| 2012/0285886 A1 | 11/2012 | Liberman |
| 2012/0292259 A1 | 11/2012 | Marcin |
| 2012/0312755 A1 | 12/2012 | Ryan et al. |
| 2012/0318729 A1 | 12/2012 | Yip et al. |
| 2013/0008079 A1 | 1/2013 | Chung et al. |
| 2013/0043190 A1 | 2/2013 | Al-Samadi |
| 2013/0056193 A1 | 3/2013 | Thiers |
| 2013/0074694 A1 | 3/2013 | Govindan et al. |
| 2013/0075098 A1 | 3/2013 | Janjua et al. |
| 2013/0075940 A1 | 3/2013 | Govindan et al. |
| 2013/0087501 A1 | 4/2013 | Moe et al. |
| 2013/0092622 A1 | 4/2013 | Kas et al. |
| 2013/0092626 A1 | 4/2013 | Zimmerman et al. |
| 2013/0105323 A1 | 5/2013 | Averbeck et al. |
| 2013/0118887 A1 | 5/2013 | Frolov et al. |
| 2013/0186822 A1 | 7/2013 | Herron et al. |
| 2013/0193074 A1 | 8/2013 | Voigt et al. |
| 2013/0199921 A1 | 8/2013 | McGovern |
| 2013/0213892 A1 | 8/2013 | Henthorne |
| 2013/0233786 A1 | 9/2013 | Posa |
| 2013/0240442 A1 | 9/2013 | Chidambaran et al. |
| 2013/0256228 A1 | 10/2013 | Bharwada et al. |
| 2013/0318743 A1 | 12/2013 | Chinta et al. |
| 2014/0008291 A1 | 1/2014 | Tang et al. |
| 2014/0021135 A1 | 1/2014 | Sawyer et al. |
| 2014/0041856 A1 | 2/2014 | Janssen et al. |
| 2014/0042058 A1 | 2/2014 | Janssen et al. |
| 2014/0042061 A1 | 2/2014 | Wallace |
| 2014/0061022 A1 | 3/2014 | Frank |
| 2014/0069821 A1 | 3/2014 | Marcin et al. |
| 2014/0116956 A1 | 5/2014 | Yuan et al. |
| 2014/0197022 A1 | 7/2014 | Antar et al. |
| 2014/0197029 A1 | 7/2014 | Sparrow et al. |
| 2014/0224716 A1* | 8/2014 | Hancock ............... B01D 61/58 210/143 |
| 2014/0246368 A1 | 9/2014 | Neubrand et al. |
| 2014/0263055 A1 | 9/2014 | Govindan et al. |
| 2014/0263081 A1 | 9/2014 | Thiers |
| 2014/0299462 A1 | 10/2014 | Thiers |
| 2014/0339162 A1 | 11/2014 | Cao et al. |
| 2014/0367871 A1 | 12/2014 | Govindan et al. |
| 2015/0013987 A1 | 1/2015 | Underwood et al. |
| 2015/0014248 A1 | 1/2015 | Herron et al. |
| 2015/0053619 A1 | 2/2015 | Cao et al. |
| 2015/0060286 A1 | 3/2015 | Govindan et al. |
| 2015/0060360 A1 | 3/2015 | Motherway et al. |
| 2015/0083577 A1 | 3/2015 | Govindan et al. |
| 2015/0083656 A1 | 3/2015 | Williams |
| 2015/0107840 A1 | 4/2015 | Ligthelm et al. |
| 2015/0107841 A1 | 4/2015 | Suijkerbuijk et al. |
| 2015/0129410 A1 | 5/2015 | Govindan et al. |
| 2015/0136699 A1 | 5/2015 | Wohlert |
| 2015/0251930 A1 | 9/2015 | Dufresne et al. |
| 2015/0353397 A1 | 12/2015 | Cath et al. |
| 2015/0367285 A1 | 12/2015 | Chang et al. |
| 2016/0001235 A1 | 1/2016 | Frisk |
| 2016/0009582 A1 | 1/2016 | Heimel et al. |
| 2016/0040522 A1 | 2/2016 | Jacob et al. |
| 2016/0137526 A1 | 5/2016 | Govindan et al. |
| 2016/0228795 A1 | 8/2016 | St. John et al. |
| 2016/0229705 A1 | 8/2016 | St. John et al. |
| 2016/0244349 A1 | 8/2016 | St. John et al. |
| 2016/0339354 A1 | 11/2016 | Govindan et al. |
| 2016/0339356 A1 | 11/2016 | Govindan et al. |
| 2016/0339357 A1 | 11/2016 | Govindan et al. |
| 2016/0339390 A1 | 11/2016 | Abusharkh |
| 2017/0036171 A1 | 2/2017 | Lienhard et al. |
| 2017/0044033 A1 | 2/2017 | Lienhard et al. |
| 2017/0144906 A1 | 5/2017 | Andrews et al. |
| 2017/0174543 A1 | 6/2017 | Govindan et al. |
| 2017/0349467 A1* | 12/2017 | Blohm ............... B01D 61/022 |
| 2018/0008919 A1 | 1/2018 | Tierney, III |
| 2018/0036682 A1 | 2/2018 | Nicoll et al. |
| 2018/0104649 A1 | 4/2018 | Govindan et al. |
| 2018/0169583 A1 | 6/2018 | Wohlert |
| 2018/0236372 A1 | 8/2018 | Govindan et al. |
| 2018/0236406 A1 | 8/2018 | St. John et al. |
| 2018/0244545 A1 | 8/2018 | St. John et al. |
| 2019/0054421 A1 | 2/2019 | Wei et al. |
| 2019/0176088 A1 | 6/2019 | Wohlert |
| 2019/0224624 A1 | 7/2019 | Kitamura et al. |
| 2020/0086274 A1 | 3/2020 | Benton et al. |
| 2020/0147554 A1 | 5/2020 | Choong et al. |
| 2020/0308037 A1 | 10/2020 | Alamoudi et al. |

FOREIGN PATENT DOCUMENTS

| | | |
|---|---|---|
| CA | 2821458 A1 | 11/2012 |
| CA | 2779732 A1 | 12/2012 |
| CA | 2818055 A1 | 8/2013 |
| CN | 1623936 A | 6/2005 |
| CN | 1835892 A | 9/2006 |
| CN | 1856447 A | 11/2006 |
| CN | 100999364 A | 7/2007 |
| CN | 101056693 A | 10/2007 |
| CN | 101397152 A | 4/2009 |
| CN | 101417208 A | 4/2009 |
| CN | 101636354 A | 1/2010 |
| CN | 101717161 A | 6/2010 |
| CN | 102036739 A | 4/2011 |
| CN | 102143786 A | 8/2011 |
| CN | 102258942 A | 11/2011 |
| CN | 102363101 A | 2/2012 |
| CN | 102438957 A | 5/2012 |
| CN | 102725236 A | 10/2012 |
| CN | 102933507 A | 2/2013 |
| DE | 2145861 C2 | 6/1973 |
| DE | 102012017860 A1 | 5/2014 |
| EP | 0 070 059 A1 | 1/1983 |
| EP | 0 207 390 A1 | 1/1987 |
| EP | 0 253 287 A1 | 1/1988 |
| EP | 0 623 561 A1 | 11/1994 |
| EP | 1 775 267 A2 | 4/2007 |
| EP | 2 216 299 A1 | 8/2010 |
| FR | 1582201 A | 9/1969 |
| FR | 2561637 A1 | 9/1985 |
| GB | 821939 A | 10/1959 |
| GB | 1013767 A | 12/1965 |
| GB | 1036920 A | 7/1966 |
| GB | 1 320 429 A | 6/1973 |
| GB | 1324031 A | 7/1973 |
| GB | 1444241 A | 7/1976 |
| GB | 2395946 A | 6/2004 |
| JP | S53-58974 A | 5/1978 |
| JP | S55-147199 A | 11/1980 |
| JP | H05-208199 A | 8/1993 |
| JP | H06-233 A | 1/1994 |
| JP | 2001-046842 A | 2/2001 |
| JP | 2002-001068 A | 1/2002 |
| JP | 2016-016384 A | 2/2016 |
| JP | 2018-001111 A | 1/2018 |
| KR | 101229482 B1 | 2/2013 |
| KR | 20130074104 A | 7/2013 |
| WO | WO 95/27683 A1 | 10/1995 |
| WO | WO 00/00273 A1 | 1/2000 |
| WO | WO 01/14256 A1 | 3/2001 |
| WO | WO 02/32813 A1 | 4/2002 |
| WO | WO 2005/012185 A1 | 2/2005 |
| WO | WO 2007/128062 A1 | 11/2007 |
| WO | WO 2007/132477 A1 | 11/2007 |
| WO | WO 2007/138327 A1 | 12/2007 |
| WO | WO 2007/144591 A1 | 12/2007 |
| WO | WO 2008/137082 A1 | 11/2008 |
| WO | WO 2010/026589 A1 | 3/2010 |
| WO | WO 2010/118425 A1 | 10/2010 |

(56) References Cited

FOREIGN PATENT DOCUMENTS

| | | |
|---|---|---|
| WO | WO 2010/122336 A2 | 10/2010 |
| WO | WO 2010/131251 A2 | 11/2010 |
| WO | WO 2010/135561 A2 | 11/2010 |
| WO | WO 2011/159743 A1 | 12/2011 |
| WO | WO 2012/138502 A1 | 10/2012 |
| WO | WO 2012/142396 A1 | 10/2012 |
| WO | WO 2012/148911 A2 | 11/2012 |
| WO | WO 2012/159203 A1 | 11/2012 |
| WO | WO 2013/012548 A1 | 1/2013 |
| WO | WO 2013/037047 A1 | 3/2013 |
| WO | WO 2013/078124 A1 | 5/2013 |
| WO | WO 2013/158315 A1 | 10/2013 |
| WO | WO 2013/159220 A1 | 10/2013 |
| WO | WO 2013/172605 A1 | 11/2013 |
| WO | WO 2014/058696 A1 | 4/2014 |
| WO | WO 2014/088826 A1 | 6/2014 |
| WO | WO 2014/121153 A2 | 8/2014 |
| WO | WO 2014/144704 A1 | 9/2014 |
| WO | WO 2014/144778 A1 | 9/2014 |
| WO | WO 2014/150848 A1 | 9/2014 |
| WO | WO 2014/162094 A2 | 10/2014 |
| WO | WO 2014/188450 A1 | 11/2014 |
| WO | WO 2014/200829 A1 | 12/2014 |
| WO | WO 2015/021062 A1 | 2/2015 |
| WO | WO 2015/038983 A2 | 3/2015 |
| WO | WO 2015/042584 A1 | 3/2015 |
| WO | WO 2015/061194 A1 | 4/2015 |
| WO | WO 2016/057764 A1 | 4/2016 |
| WO | WO 2016/189438 A1 | 12/2016 |
| WO | WO 2017/019944 A1 | 2/2017 |
| WO | WO 2017/030932 A1 | 2/2017 |
| WO | WO 2017/030937 A1 | 2/2017 |
| WO | WO 2017/030941 A1 | 2/2017 |
| WO | WO 2017/044645 A1 | 3/2017 |
| WO | WO 2017/044668 A1 | 3/2017 |
| WO | WO 2017/127607 A1 | 7/2017 |
| WO | WO 2017/147113 A1 | 8/2017 |
| WO | WO 2018/045393 A2 | 3/2018 |
| WO | WO 2018/075637 A1 | 4/2018 |
| WO | WO 2018/084246 A1 | 5/2018 |
| WO | WO 2018/136077 A1 | 7/2018 |
| WO | WO 2019/097261 A1 | 5/2019 |
| WO | WO 2020/251568 A1 | 12/2020 |

OTHER PUBLICATIONS

International Preliminary Report on Patentability for International App. No. PCT/US2019/047609 dated Mar. 4, 2021.
[No Author Listed], 13.5 Colligative Properties. Prentice Hall. Accessed Jul. 9, 2019 as available Aug. 23, 2012 from <https://web.archive.org/web/20120823004120/http://wps.prenhall.com/wps/media/objects/3082/3156628/blb1305.html>. 10 pages.
[No Author Listed], Accepta 4360 Material Safety Data Sheet. Accepta Ltd. Manchester, UK. Jul. 19, 2011. 5 pages.
[No Author Listed], Caustic Soda 50% Material Safety Data Sheet. Univar. Redmond, Washington. Apr. 8, 2013. 10 pages.
[No Author Listed], Color Removal Using Ozone. Spartan Environmental Technologies Air and Water Treatment—Technical Bulletin. Available Jul. 21, 2006. Last accessed Mar. 2, 2017 from <http://www.spartanwatertreatment.com/ozone-color-removal.html>. 2 pages.
[No Author Listed], Everything you want to know about Coagulation & Flocculation. Chapter 1: The Electrokinetic Connection. Zeta-Meter, Inc. Staunton, VA. 4th Edition. 1993:1-8.
[No Author Listed], F0 Plant Completes 1-Year of Operation. Water Desalination Report Nov. 15, 2010:2 pages.
[No Author Listed], Forward Osmosis. Wikipedia. Accessed Jul. 9, 2019 as available May 5, 2007 from <https://web.archive.org/web/20080317095053/https://en.wikipedia.org/wiki/Forward_osmosis>. 3 pages.
[No Author Listed], Hi-Cal Hydrate Material Safety Data Sheet. Chemical Lime Co. Fort Worth, Texas. May 1, 2008. 6 pages.
[No Author Listed], Landfill Leachate Treatment. Osmotek, Inc. Corvallis, OR. Accessed Jul. 9, 2019 as available Oct. 9, 2007 from <https://web.archive.org/web/20071009130111/http://www.rimnetics.com/OSMOTEK%20BROCHURE.pdf>. 7 pages.
[No Author Listed], Polyaluminum Chloride Solution Material Safety Data Sheet. GEO Specialty Chemicals, Ltd. Little Rock, Arkansas. Mar. 12, 2015. 11 pages.
[No Author Listed], Servco 1010 Material Safety Data Sheet. Servco Chemicals. Lubbock, Texas. Aug. 7, 2013. 4 pages.
[No Author Listed], Soda Ash Material Safety Data Sheet. Univar. Redmond, Washington. Apr. 7, 2003. 10 pages.
Achilli et al., Selection of inorganic-based draw solutions for forward osmosis applications. Journal of Membrane Science. 2010;364:233-41. Epub Aug. 14, 2010.
Akram et al., Energy Utilization of Brine from an MSF Desalination Plant by Pressure Retarded Osmosis. The International Desalination Association World Congress on Desalination and Water Reuse. Tianjin, China. Oct. 2013. 12 pages.
Al-Hallaj et al., Solar desalination with a humidification-dehumidification cycle: performance of the unit. Desalination. 1998;120:273-80.
Alshakhs, Modifying Water Salinity to Improve Oil Recovery. Stanford Academic Report. Oct. 29, 2013. Last accessed on Dec. 8, 2016 at <http://large.stanford.edu/courses/2013/ph240/alshakhs1/>. 2 pages.
Aramco, Saudi Aramco's 'Smart Water' May Aid Oil Production. Rigzone. Jul. 29, 2009. <http://www.rigzone.com/news/article_pf.asp?a_id=78707> Last accessed Jul. 30, 2015. 1 page.
Arthur et al., Technical Summary of Oil & Gas Produced Water Treatment Technologies. All Consulting, LLC (Mar. 2005). Last accessed on Dec. 21, 2016 from <http://dvikan.no/ntnu-studentserver/reports/ALLConsulting-WaterTreatmentOptionsReport.pdf>. 53 pages.
Banchik et al., Thermodynamic Analysis of a Reverse Osmosis Desalination System Using Forward Osmosis for Energy Recovery. Proceedings of the ASME 2012 International Mechanical Engineering Congress & Exposition. American Society of Mechanical Engineers. Houston, Texas. Nov. 9-15, 2012. 13 pages.
Beasley et al., Analysis of a pressure driven absorption refrigeration cycle. Int J Energy Res. Jan. 1988;12:175-84.
Bruno, A Low-Energy Water Purifier. MIT Technology Review. Jan. 8, 2009:3 pages.
Burk, New Technology Spotlight. CaribDA News. 2012 Fall;2(4):6-7.
Cath et al., A Novel Hybrid Forward Osmosis Process for Drinking Water Augmentation Using Impaired Water and Saline Water Sources. WERC and Water Research Foundation. 2009:84 pages.
Cath et al., Forward osmosis: Principles, applications, and recent developments. J Membr Sci. Sep. 15, 2006;281(1-2):70-87.
El-Dessouky et al., Multiple-effect evaporation desalination systems: thermal analysis. Desalination. 1999;125:259-76.
Ge et al., Exploration of polyelectrolytes as draw solutes in forward osmosis processes. Water Research. 2012;46:1318-26. Epub Dec. 27, 2011.
Global Water Intelligence, Water Desalination Report. Tom Pankratz, ed. Dec. 17, 2012;48(48):1-4.
Govindan, Thermal Design of Humidification Dehumidification Systems for Affordable and Small-scale Desalination. Doctoral Thesis. Massachusetts Institute of Technology. Sep. 2012 286 pages.
Gude, Energy consumption and recovery in reverse osmosis. Desalination and Water Treatment. 2011;36(1-3):239-60.
Huang et al., The bridging force between colloidal particles in a polyelectrolyte solution. Langmuir. Nov. 27, 2012;28(47):16300-5. doi:10.1021/la303918p.
Jain et al., Desalination of Brines Associated with Geological Storage of Carbon Dioxide. SWMOA Annual Symposium. The Growing Role of Membranes in the Thirsty Southwest. Jun. 13-15, 2016: 20 pages.
Khayet et al., Determination of surface and bulk pore sizes of flat-sheet and hollow-fiber membranes by atomic force microscopy, gas permeation and solute transport methods. Desalination. 2003;158:57-64.
Kim et al., Effect of PEG additive on membrane formation by phase inversion. Journal of Membrane Science. 1998;138:153-63.

(56) References Cited

OTHER PUBLICATIONS

Klausner et al., Evaporative heat and mass transfer for the diffusion driven desalination process. Heat Mass Transfer. 2006;42:528-36.

Kwak et al., New Insights on the Role of Multivalent Ions In Water-Carbonate Rock Interactions. Saudi Journal of Technology. 2014:25-38. Last accessed on Dec. 8, 2016 at <http://www.saudiaramco.com/content/dam/Publications/Journal-of-Technology/Summer2014/New_Insights.pdf>.

Lakerveld et al., Membrane assisted crystallization using reverse osmosis: Influence of solubility characteristics on experimental application and energy saving potential. Chem Eng Sci. Jan. 2010;65:2689-99.

Li, Experimental Analysis of Produced Water Desalination by a Humidification-Dehumidification Process. 2009. 62 pages.

Li, Mineral precipitation and deposition in cooling systems using impaired waters: mechanisms, kinetics, and inhibition. Dissertation defended Jul. 27, 2010. 224 pages.

Loeb et al., Countercurrent flow osmotic processes for the production of solutions having a high osmotic pressure. Desalination. Aug. 1973;13:207-15.

Mccutcheon et al., Influence of concentrative and dilutive internal concentration polarization on flux behavior in forward osmosis. Journal of Membrane Science. Nov. 2006;284(1-2):237-47.

Mcginnis et al., Pilot demonstration of the NH3/CO2 forward osmosis desalination process on high salinity brines. Desalination. Mar. 2013;312:67-74. Supporting information included.

Miller et al., Forward Osmosis: A New Approach to Water Purification and Desalination. Sandia Report. Sandia National Laboratories. Jul. 1, 2006. doi: 10.2172/893156.

Moghadasi et al., Scale deposits in porous media and their removal by EDTA injection. ECI Symposium Series. 2007. vol. RP5. Article 10. p. 57-70.

Narayan et al., The potential of solar-driven humidification-dehumidification desalination for small-scale decentralized water production. Renewable and Sustainable Energy Reviews. 2010;14:1187-1201.

Narayan et al., Thermal design of the humidification desalination system: an experimental investigation. International Journal of Heat and Mass Transfer. 2013;58:1-9.

Narayan et al., Thermodynamic balancing of the humidification dehumidification desalination system by mass extraction and injection. International Journal of Heat and Mass Transfer. 2013;57:756-70.

Park et al., Cost-based analysis about a newly designed two-staged reverse osmosis process with draw solute. Comput Aided Chem Eng. 2016;38:223-8.

Park et al., Cost-based feasibility study and sensitivity analysis of a new draw solution assisted reverse osmosis (DSARO) process for seawater desalination. Desalination. Aug. 2017;422:182-93.

Park et al., Theoretical Analysis and Economic Evaluation of Draw Solution Assisted Reverse Osmosis Process. 2015 AlChE Annual Meeting. 2015;1:112-20. Abstract only.

Riffat et al., Analysis of using centrifugal reverse osmosis in absorption refrigeration systems. Chartered Institute of Building Services Engineers. 2001 Conference. 5 pages.

Sahin, A Mathematical Model for Explanation of Ion Exchange of the Boric Acid Adsorption. Jour. Chem. Soc. Pak. 1998;20(1):12-8.

Sinex, EDTA—A molecule with a complex story. University of Bristol, School of Chemistry. <www.chm.bris.ac.uk/motm/edta/edtah.htm> (accessed Jan. 8, 2013). Aug. 1, 2007.

Thiel et al., Hybridization of Humidification-Dehumidification and Pressure Retarded Osmosis for Brine Concentration Applications. The International Desalination Association World Congress on Desalination and Water Reuse. San Diego, California. Aug.-Sep. 2015. 8 pages.

Tiraferri et al., Relating performance of thin-film composite forward osmosis membranes to support layer formation and structure. Journal of Membrane Science. Nov. 12, 2010;367:340-52.

Zamen et al., Improvement of solar humidification-dehumidification desalination using multi-stage process. 6 pages. Accessed Jun. 6, 2014.

Office Action for SG Application No. 11202101293T dated Mar. 16, 2022.

Office Action for IN Application No. 202117007199 dated Sep. 29, 2022.

\* cited by examiner ated Subsystem and

LIQUID SOLUTION CONCENTRATION SYSTEM COMPRISING ISOLATED SUBSYSTEM AND RELATED METHODS

RELATED APPLICATIONS

This application is a U.S. National Stage patent application of International Patent Application No. PCT/US2019/047609, filed Aug. 22, 2019, and entitled "Liquid Solution Concentration System Comprising Isolated Subsystem and Related Methods", which claims priority under 35 U.S.C. § 119(e) to U.S. Provisional Application No. 62/721,015, filed Aug. 22, 2018, and entitled "Liquid Solution Concentration System Comprising Isolated Subsystem and Related Methods," each of which is incorporated herein by reference in its entirety for all purposes.

TECHNICAL FIELD

Liquid solution concentration systems, and related methods, are generally described.

BACKGROUND

Membranes which are selectively permeable to solvent and impermeable to solutes have been used to purify feed solutions. As one example, membrane-based desalination has been used to desalinate aqueous feed solutions. In one such purification process—generally referred to as forward osmosis—solvent (e.g., water) is transported from a feed solution through a semi-permeable membrane by applying a draw solution (also sometimes referred to as a sweep solution) to the permeate side of the membrane that has an osmotic pressure that is higher than the osmotic pressure of the feed solution. The driving force for separation in a forward osmosis process is the osmotic pressure difference across the semi-permeable membrane; because the draw solution on one side of the membrane has a higher osmotic pressure than the feed solution on the other side of the membrane, the solvent is drawn through the semi-permeable membrane from the feed solution to the draw solution to equalize the osmotic pressures.

Another type of membrane-based solution concentration process is reverse osmosis. In contrast to forward osmosis, reverse osmosis processes use an applied hydraulic pressure as the driving force for separation. The applied hydraulic pressure serves to counteract the osmotic pressure difference that would otherwise favor solvent flux from low osmotic pressure to high osmotic pressure. Therefore in reverse osmosis systems, solvent is driven from the high osmotic pressure side to the low osmotic pressure side.

Many membrane-based solution concentration systems have, to date, been limited by, for example, low efficiencies, large expense, and undesired fouling and scaling. Improved systems and methods for performing membrane-based solution concentration are desirable.

SUMMARY

Liquid solution concentration systems, and related methods, are generally described. In some embodiments, the system is an osmotic system comprising a plurality of osmotic modules. For example, the osmotic system can comprise a feed osmotic module configured to produce a feed osmotic module retentate outlet stream having a higher concentration of solute than the retentate inlet stream transported to the feed osmotic module. The osmotic system can also comprise an isolation osmotic module fluidically connected to the feed osmotic module. The osmotic system can also optionally comprise a purification osmotic module fluidically connected to the feed osmotic module and/or the isolation osmotic module. Certain embodiments are related to altering the degree to which the feed osmotic module retentate outlet stream is recycled back to the retentate-side inlet of the feed osmotic module during operation. Additional embodiments are related to the manner in which the retentate-side effluent from the isolation osmotic module is distributed among the system modules during operation.

The subject matter of the present invention involves, in some cases, interrelated products, alternative solutions to a particular problem, and/or a plurality of different uses of one or more systems and/or articles.

In certain aspects, a method is provided. In some embodiments, the method comprises transporting a feed solution comprising a solvent and a solute to a retentate side of a feed osmotic module such that: a feed osmotic module retentate outlet stream exits the retentate side of the feed osmotic module, the feed osmotic module retentate outlet stream having a concentration of the solute that is greater than a concentration of the solute within the feed solution entering the retentate side of the feed osmotic module, and at least a portion of the solvent from the feed solution is transported from the retentate side of the feed osmotic module, through an osmotic membrane of the feed osmotic module, to a permeate side of the feed osmotic module where the portion of the solvent is combined with a feed osmotic module permeate inlet stream to form a feed osmotic module permeate outlet stream that is transported out of the permeate side of the feed osmotic module. Some embodiments comprise transporting a purification osmotic module retentate inlet stream to a retentate side of a purification osmotic module such that: a purification osmotic module retentate outlet stream exits the retentate side of the purification osmotic module, the purification osmotic module retentate outlet stream having an osmotic pressure that is greater than an osmotic pressure of the purification osmotic module retentate inlet stream, and at least a portion of liquid from the purification osmotic module retentate inlet stream is transported from the retentate side of the purification osmotic module, through an osmotic membrane of the purification osmotic module, to a permeate side of the purification osmotic module. Some embodiments comprise transporting an isolation osmotic module retentate inlet stream to a retentate side of an isolation osmotic module and an isolation osmotic module permeate inlet stream to a permeate side of the isolation osmotic module such that: an isolation osmotic module retentate outlet stream exits the retentate side of the isolation osmotic module, the isolation osmotic module retentate outlet stream having an osmotic pressure that is greater than an osmotic pressure of the isolation osmotic module retentate inlet stream, and at least a portion of liquid from the isolation osmotic module retentate inlet stream is transported from the retentate side of the isolation osmotic module, through an osmotic membrane of the isolation osmotic module, to a permeate side of the isolation osmotic module where the portion of the liquid is combined with an isolation osmotic module permeate inlet stream to form an isolation osmotic module permeate outlet stream that is transported out of the permeate side of the isolation osmotic module. In some embodiments, the feed osmotic module permeate inlet stream comprises at least a portion of the isolation osmotic module retentate outlet stream; the isolation osmotic module permeate inlet stream comprises at least a portion of the isolation osmotic module retentate outlet stream; the isolation osmotic module retentate inlet stream comprises at least a portion of the purification osmotic module retentate outlet stream; the purification osmotic module retentate inlet stream comprises at least a portion of the feed osmotic module permeate outlet stream; and the purification osmotic module retentate inlet stream comprises at least a portion of the isolation osmotic module permeate outlet stream.

In certain embodiments, the method comprises transporting a feed solution comprising a solvent and a solute to a retentate side of a feed osmotic module such that: a feed osmotic module retentate outlet stream exits the retentate side of the feed osmotic module, the feed osmotic module retentate outlet stream having a concentration of the solute that is greater than a concentration of the solute within the feed solution entering the retentate side of the feed osmotic module, and at least a portion of the solvent from the feed solution is transported from the retentate side of the feed osmotic module, through an osmotic membrane of the feed osmotic module, to a permeate side of the feed osmotic module where the portion of the solvent is combined with a feed osmotic module permeate inlet stream to form a feed osmotic module permeate outlet stream that is transported out of the permeate side of the feed osmotic module. In some embodiments, during a first period of time, the retentate side of the feed osmotic module receives at least a portion of the feed osmotic module retentate outlet stream; during a second period of time that is after the first period of time, the retentate side of the feed osmotic module no longer receives any portion of the feed osmotic module retentate outlet stream or receives an amount of the feed osmotic module retentate outlet stream that is less than the amount of the feed osmotic module retentate outlet stream received by the retentate side of the feed osmotic module during the first period of time; during both the first period of time and the second period of time, at least a portion of an isolation osmotic module retentate inlet stream is transported to a retentate side of an isolation osmotic module, and at least a portion of an isolation osmotic module permeate inlet stream is transported to a permeate side of the isolation osmotic module such that: an isolation osmotic module retentate outlet stream, having an osmotic pressure that is greater than an osmotic pressure of the isolation osmotic module retentate inlet stream, exits the retentate side of the isolation osmotic module, and at least a portion of liquid from the isolation osmotic module retentate inlet stream is transported from the retentate side of the isolation osmotic module, through an osmotic membrane of the isolation osmotic module, to a permeate side of the isolation osmotic module where the portion of the liquid is combined with an isolation osmotic module permeate inlet stream to form an isolation osmotic module permeate outlet stream that is transported out of the permeate side of the isolation osmotic module; the feed osmotic module permeate inlet stream comprises at least a portion of the isolation osmotic module retentate outlet stream; and the isolation osmotic module permeate inlet stream comprises at least a portion of the isolation osmotic module retentate outlet stream.

In some embodiments, the method comprises transporting, over a first period of time, a first feed solution to a retentate side of a feed osmotic module such that, during the first period of time: a first feed osmotic module retentate outlet stream exits the retentate side of the feed osmotic module, the first feed osmotic module retentate outlet stream having a solute concentration that is greater than a solute concentration of the first feed solution entering the retentate side of the feed osmotic module, and at least a portion of the solvent from the first feed solution is transported from the retentate side of the feed osmotic module, through an osmotic membrane of the feed osmotic module, to a permeate side of the feed osmotic module where the portion of the solvent is combined with a feed osmotic module permeate inlet stream to form a first feed osmotic module permeate outlet stream that is transported out of the permeate side of the feed osmotic module; and at least a portion of the first feed osmotic module retentate outlet stream is recycled back to an inlet of the retentate side of the feed osmotic module. Some embodiments comprise transporting, over a second period of time that is after the first period of time, a second feed solution to the retentate side of the feed osmotic module such that, during the second period of time: a second feed osmotic module retentate outlet stream exits the retentate side of the feed osmotic module, the second feed osmotic module retentate outlet stream having a solute concentration that is greater than a solute concentration of the second feed solution entering the retentate side of the feed osmotic module, and at least a portion of the solvent from the second feed solution is transported from the retentate side of the feed osmotic module, through the osmotic membrane of the feed osmotic module, to the permeate side of the feed osmotic module where the portion of the solvent is combined with a feed osmotic module permeate inlet stream to form a second feed osmotic module permeate outlet stream that is transported out of the permeate side of the feed osmotic module; and the percentage of the second feed osmotic module retentate outlet stream that is recycled back to the retentate side of the feed osmotic module is reduced by at least 10 wt %, relative to the percentage of the first feed osmotic module retentate outlet stream that is recycled back to the retentate side of the feed osmotic module during the first period of time. Some embodiments comprise transporting, during both the first period of time and the second period of time, an isolation osmotic module retentate inlet stream to a retentate side of an isolation osmotic module and an isolation osmotic module permeate inlet stream to a permeate side of the isolation osmotic module such that: an isolation osmotic module retentate outlet stream exits the retentate side of the isolation osmotic module, the isolation osmotic module retentate outlet stream having an osmotic pressure that is greater than an osmotic pressure of the isolation osmotic module retentate inlet stream, and at least a portion of liquid from the isolation osmotic module retentate inlet stream is transported from the retentate side of the isolation osmotic module, through an osmotic membrane of the isolation osmotic module, to a permeate side of the isolation osmotic module where the portion of the liquid is combined with an isolation osmotic module permeate inlet stream to form an isolation osmotic module permeate outlet stream that is transported out of the permeate side of the isolation osmotic module.

In accordance with certain embodiments, the method comprises operating a feed osmotic module to produce a feed osmotic module retentate outlet stream having a solute concentration that is greater than a solute concentration of a feed solution entering the feed osmotic module; operating an isolation osmotic module to produce an isolation osmotic module retentate outlet stream having an osmotic pressure that is greater than an osmotic pressure of an isolation osmotic module retentate inlet stream; transporting a first portion of the isolation osmotic module retentate outlet stream to the permeate side of the feed osmotic module; and transporting a second portion of the isolation osmotic module retentate outlet stream to a permeate side of the isolation osmotic module. In some embodiments, during a first period of time, the retentate side of the feed osmotic module receives at least a portion of the feed osmotic module retentate outlet stream; and during a second period of time, the retentate side of the feed osmotic module no longer receives any portion of the feed osmotic module retentate outlet stream or receives an amount of the feed osmotic module retentate outlet stream that is less than the amount of the feed osmotic module retentate outlet stream received by the retentate side of the feed osmotic module during the first period of time.

In some embodiments, the method comprises operating a feed osmotic module to produce a feed osmotic module retentate outlet stream having a solute concentration that is greater than a solute concentration of a feed solution entering the feed osmotic module; operating an isolation osmotic module to produce an isolation osmotic module retentate outlet stream having an osmotic pressure that is greater than an osmotic pressure of an isolation osmotic module retentate inlet stream; transporting a first portion of the isolation osmotic module retentate outlet stream to the permeate side of the feed osmotic module; and transporting a second portion of the isolation osmotic module retentate outlet stream to a permeate side of the isolation osmotic module.

Certain aspects are related to osmotic systems. In some embodiments, the osmotic system comprises a feed osmotic module comprising a first side, a second side, and at least one osmotic membrane between the first side and the second side; a purification osmotic module comprising a first side, a second side, and at least one osmotic membrane between the first side and the second side; and an isolation osmotic module comprising a first side, a second side, and at least one osmotic membrane between the first side and the second side. In some embodiments, the second side of the feed osmotic module is fluidically connected to the first side of the purification osmotic module; the second side of the feed osmotic module is fluidically connected to the first side of the isolation osmotic module; the first side of the purification osmotic module is fluidically connected to the first side of the isolation osmotic module; the second side of the isolation osmotic module is fluidically connected to the first side of the isolation osmotic module; and the second side of the isolation osmotic module is fluidically connected to the first side of the purification osmotic module.

In certain embodiments, the osmotic system comprises a feed osmotic module comprising a first side, a second side, and at least one osmotic membrane between the first side and the second side; and an isolation osmotic module comprising a first side, a second side, and at least one osmotic membrane between the first side and the second side. In some embodiments, the second side of the feed osmotic module is fluidically connected to the first side of the isolation osmotic module; and the second side of the isolation osmotic module is fluidically connected to the first side of the isolation osmotic module.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
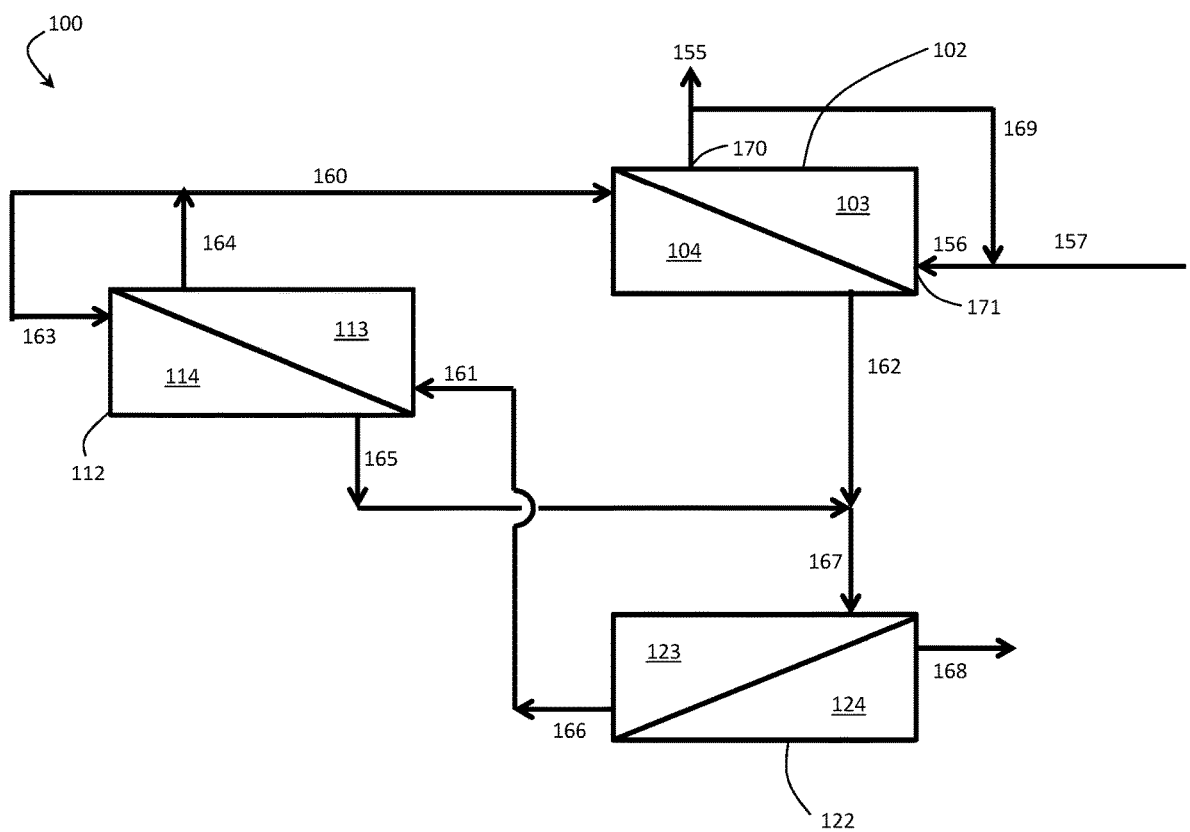
FIG. 1A is a schematic illustration of an exemplary osmotic system in which a retentate outlet of a feed osmotic module is recycled back to a retentate-side inlet of the feed osmotic module, in accordance with certain embodiments.

Disclosed herein are osmotic membrane-based liquid solution concentration systems and related methods. According to certain embodiments, multiple osmotic modules may be used to perform a series of osmosis steps, such that an output stream having a relatively high solvent purity—compared to a solvent purity of a feed solution—is produced.

Some embodiments are related to the use of an isolation osmotic module. The isolation osmotic module, in accordance with certain embodiments, does not come into direct contact with the feed solution entering the osmotic system. Arranging the isolation osmotic module in this way can, in accordance with some embodiments, reduce (or minimize) the amount of fouling and/or scaling that is observed within the osmotic system (and especially within the isolation osmotic module).

In some embodiments, the retentate stream exiting the isolation osmotic module can be split into at least a first portion that is routed to the permeate side of the isolation module (e.g., and used as all or part of a draw solution) and a second portion that is routed to the permeate side of the feed osmotic module (e.g., and used as all or part of a draw solution). It has been discovered that routing the retentate stream exiting the isolation osmotic module in this way can, in some cases, reduce the osmotic membrane surface area that is needed to achieve a given level of purification for a given feed solution.

Certain embodiments are related to the use of inventive feed solution recycling techniques. For example, in some embodiments, at least a portion of the retentate stream exiting the feed osmotic module can be recycled back to an inlet of the retentate side of the feed osmotic module. In some cases, the amount of the retentate stream exiting the feed osmotic module that is recycled back to the inlet of the retentate side of the feed osmotic module is reduced (or the recycling is eliminated entirely). It has been discovered that, in certain cases, varying the degree of recycling over time leads, unexpectedly, to more efficient operation of the osmotic system and/or reduced fouling and/or scaling within the osmotic system.

In some embodiments, multiple osmotic modules can be used as part of an osmotic system to perform net solvent concentration (i.e., to produce a product stream having a relatively high purity of solvent compared to the purity of solvent in a feed solution). Such arrangements may be useful, for example, when purifying feed streams with high levels of contaminants that cause scaling and/or fouling.

As described in more detail below, certain systems and methods described herein can be used to treat a wide variety of feed streams, including but not limited to streams derived from seawater, ground water, brackish water, and/or the effluent of a chemical process. In certain embodiments, the feed stream (e.g., the fresh feed entering the osmotic system that is optionally mixed with a recycle stream, and/or the feed stream entering the feed osmotic module) contains a relatively large amount of solubilized ions, for example, at a concentration of at least 60,000 ppm. In certain embodiments, the feed stream contains, in addition to solubilized ions, a suspended and/or emulsified phase that is immiscible in the solvent (e.g., oil and/or grease in water). Additional examples of feed streams that could be treated are described in more detail elsewhere herein.

Certain embodiments are related to the use of osmotic systems to perform solvent concentration. FIG. 1A is a schematic diagram illustrating an exemplary osmotic system.

In certain embodiments, the osmotic system comprises a feed osmotic module comprising a first side, a second side, and at least one osmotic membrane between the first side and the second side. For example, referring to FIG. 1A, osmotic system 100 comprises feed osmotic module 102 comprising a first side 103 (e.g., a retentate side) and a second side 104 (e.g., a permeate side). Feed osmotic module 102 also includes at least one osmotic membrane, various exemplary configurations of which are described in more detail below (e.g., with respect to FIGS. 2A-2C).

In certain embodiments, the osmotic system comprises an isolation osmotic module comprising a first side, a second side, and at least one osmotic membrane between the first side and the second side. For example, referring to FIG. 1A, osmotic system 100 comprises isolation osmotic module 112 comprising a first side 113 (e.g., a retentate side) and a second side 114 (e.g., a permeate side). Isolation osmotic module 112 also includes at least one osmotic membrane, various exemplary configurations of which are described in more detail below (e.g., with respect to FIGS. 2A-2C).

In certain embodiments, the osmotic system comprises an optional purification osmotic module comprising a first side, a second side, and at least one osmotic membrane between the first side and the second side. For example, referring to FIG. 1A, osmotic system 100 comprises optional purification osmotic module 122 comprising a first side 123 (e.g., a retentate side) and a second side 124 (e.g., a permeate side). Purification osmotic module 122 also includes at least one osmotic membrane, various exemplary configurations of which are described in more detail below (e.g., with respect to FIGS. 2A-2C).

The use of the words "feed," "isolation," and "purification" in the phrases "feed osmotic module," "isolation osmotic module," and "purification osmotic module," respectively, are used throughout to aid in the understanding of the interconnectivity and operability of the system components, and these words are not meant to be otherwise limiting. For example, it should be understood that, while only one of these modules is referred to as a "purification osmotic module," each of the modules (including the feed and isolation osmotic modules) can perform some degree of purification. Similarly, while only one of these modules is referred to as a "feed osmotic module," any of the modules may receive an inlet stream. Similarly, while the phrase "isolation osmotic module" is used, the isolation osmotic module can be fluidically connected to other modules (as will be apparent from the description below and elsewhere herein). Each module may include further sub-units such as, for example, individual osmotic membrane cartridges, valving, fluidic conduits, and the like.

As described in more detail below, each osmotic "module" can include a single osmotic membrane or multiple osmotic membranes. In some embodiments, a single osmotic module can include multiple osmotic sub-units (e.g., multiple osmotic cartridges) that may or may not share a common container. In some cases, the "feed osmotic module," the "isolation osmotic module," and/or the "purification osmotic module" (and/or subcomponents thereof) can be standardized so as to be interchangeable with other modules. However, standardization and interchangeability are not required, and in other cases, the "feed osmotic module," the "isolation osmotic module," and/or the "purification osmotic module" (and/or subcomponents thereof) are not standardized and/or are not interchangeable with other modules.

As noted above, the osmotic system comprises, in some embodiments, a feed osmotic module.

Certain embodiments comprise operating the feed osmotic module to produce a feed osmotic module retentate outlet stream having a solute concentration that is greater than a solute concentration of a feed solution entering the feed osmotic module. For example, referring to FIG. 1A, some embodiments comprise operating feed osmotic module 102 to produce feed osmotic module retentate outlet stream 155, which can have a solute concentration that is greater than the solute concentration of feed solution 156 entering feed osmotic module 102.

Some embodiments comprise transporting a feed solution comprising a solvent and a solute to the retentate side of the feed osmotic module. For example, referring to FIG. 1A, certain embodiments comprise transporting feed solution 156 (which comprises a solvent and a solute) to retentate side 103 of feed osmotic module 102.

In some embodiments, a feed osmotic module retentate outlet stream exits the retentate side of the feed osmotic module, and the feed osmotic module retentate outlet stream has a concentration of the solute that is greater than a concentration of the solute within the feed solution entering the retentate side of the feed osmotic module. In certain embodiments in which the system illustrated in FIG. 1A is used, for example, feed osmotic module retentate outlet stream 155 exits retentate side 103 of feed osmotic module 102, and feed osmotic module retentate outlet stream 155 has a concentration of the solute that is greater than a concentration of the solute within feed solution 156 entering retentate side 103 of feed osmotic module 102.

In certain embodiments, at least a portion of the solvent from the feed solution is transported from the retentate side of the feed osmotic module, through an osmotic membrane of the feed osmotic module, to a permeate side of the feed osmotic module. For example, referring to FIG. 1A, in some embodiments, at least a portion of the solvent from feed solution 156 is transported from retentate side 103 of feed osmotic module 102, through an osmotic membrane of feed osmotic module 102, and to permeate side 104 of feed osmotic module 102.

Operation of the feed osmotic module in the manner outlined above can result in at least partial separation of the solute(s) in the feed stream from the solvent in the feed stream.

In some embodiments, the portion of the solvent that is transported from the retentate side of the feed osmotic module to the permeate side of the feed osmotic module is combined with a feed osmotic module permeate inlet stream to form a feed osmotic module permeate outlet stream that is transported out of the permeate side of the feed osmotic module. For example, referring to FIG. 1A, in some embodiments, the portion of the solvent that is transported from retentate side 103 of feed osmotic module 102 to permeate side 104 of feed osmotic module 102 is combined with feed osmotic module permeate inlet stream 160 to form feed osmotic module permeate outlet stream 162 that is transported out of permeate side 104 of feed osmotic module 102. The combination of the solvent transported through the osmotic membrane(s) of the feed osmotic module with a feed osmotic module permeate inlet stream can occur, for example, when the feed osmotic module is operated as a counter-flow osmotic module.

As noted above, the osmotic system comprises, in some embodiments, an isolation osmotic module.

Certain embodiments comprise operating an isolation osmotic module to produce an isolation osmotic module retentate outlet stream having an osmotic pressure that is greater than an osmotic pressure of an isolation osmotic module retentate inlet stream. For example, referring to FIG. 1A, some embodiments comprise operating isolation osmotic module 112 to produce isolation osmotic module retentate outlet stream 164, which can have an osmotic pressure that is greater than the osmotic pressure of isolation osmotic module retentate inlet stream 161.

Some embodiments comprise transporting an isolation osmotic module retentate inlet stream to a retentate side of an isolation osmotic module and an isolation osmotic module permeate inlet stream to a permeate side of the isolation osmotic module. For example, referring to FIG. 1A, certain embodiments comprise transporting isolation osmotic module retentate inlet stream 161 to retentate side 113 of isolation osmotic module 112 and isolation osmotic module permeate inlet stream 163 to permeate side 114 of isolation osmotic module 112.

In some embodiments, an isolation osmotic module retentate outlet stream exits the retentate side of the isolation osmotic module, and the isolation osmotic module retentate outlet stream has an osmotic pressure that is greater than an osmotic pressure of the isolation osmotic module retentate inlet stream. For example, in certain embodiments in which the system illustrated in FIG. 1A is used, isolation osmotic module retentate outlet stream 164 exits retentate side 113 of isolation osmotic module 112, and isolation osmotic module retentate outlet stream 164 has an osmotic pressure that is greater than the osmotic pressure of isolation osmotic module retentate inlet stream 161.

Operation of the isolation osmotic module in the manner outlined above can result in at least partial separation of the solute(s) in the isolation osmotic module retentate inlet stream from the solvent in the isolation osmotic module retentate inlet stream.

In certain embodiments, at least a portion of liquid from the isolation osmotic module retentate inlet stream is transported from the retentate side of the isolation osmotic module, through an osmotic membrane of the isolation osmotic module, to a permeate side of the isolation osmotic module. For example, referring to FIG. 1A, in some embodiments, at least a portion of liquid from isolation osmotic module retentate inlet stream 161 is transported from retentate side 113 of isolation osmotic module 112, through an osmotic membrane of isolation osmotic module 112, to permeate side 114 of isolation osmotic module 112.

In some embodiments, the portion of the liquid that is transported from the retentate side of the isolation osmotic module to the permeate side of the isolation osmotic module is combined with an isolation osmotic module permeate inlet stream to form an isolation osmotic module permeate outlet stream that is transported out of the permeate side of the isolation osmotic module. For example, referring to FIG. 1A, in some embodiments, the portion of the liquid that is transported from retentate side 113 of isolation osmotic module 112 to permeate side 114 of isolation osmotic module 112 is combined with isolation osmotic module permeate inlet stream 163 to form isolation osmotic module permeate outlet stream 165 that is transported out of permeate side 114 of the isolation osmotic module 112. The combination of the liquid transported through the osmotic membrane(s) of the isolation osmotic module with the isolation osmotic module permeate inlet stream can occur, for example, when the isolation osmotic module is operated as a counter-flow osmotic module.

As noted above, the osmotic system comprises, in some embodiments, an optional purification osmotic module.

Certain embodiments comprise operating the optional purification osmotic module to produce a purification osmotic module retentate outlet stream having an osmotic pressure that is greater than the osmotic pressure of the purification osmotic module retentate inlet stream. For example, referring to FIG. 1A, some embodiments comprise operating purification osmotic module 122 to produce purification osmotic module retentate outlet stream 166, which can have an osmotic pressure that is greater than the osmotic pressure of purification osmotic module retentate inlet stream 167.

Some embodiments comprise transporting a purification osmotic module retentate inlet stream to a retentate side of a purification osmotic module. For example, referring to FIG. 1A, certain embodiments comprise transporting purification osmotic module retentate inlet stream 167 to retentate side 123 of purification osmotic module 122. In some embodiments, a purification osmotic module retentate outlet stream exits the retentate side of the purification osmotic module. For example, referring to FIG. 1A, in some embodiments, purification osmotic module retentate outlet stream 166 exits retentate side 123 of purification osmotic module 122. In certain embodiments, the purification osmotic module retentate outlet stream has an osmotic pressure that is greater than the osmotic pressure of the purification osmotic module retentate inlet stream. For example, referring to FIG. 1A, in some embodiments, purification osmotic module retentate outlet stream 166 has an osmotic pressure that is greater than the osmotic pressure of purification osmotic module retentate inlet stream 167.

Operation of the purification osmotic module in the manner outlined above can result in at least partial separation of the solute(s) in the purification osmotic module retentate inlet stream from the solvent in the purification osmotic module retentate inlet stream.

In certain embodiments, at least a portion of liquid from the purification osmotic module retentate inlet stream is transported from the retentate side of the purification osmotic module, through an osmotic membrane of the purification osmotic module, to a permeate side of the purification osmotic module. For example, referring to FIG. 1A, in some embodiments, at least a portion of liquid from purification osmotic module retentate inlet stream 167 is transported from retentate side 123 of purification osmotic module 122, through an osmotic membrane of purification osmotic module 122, to permeate side 124 of purification osmotic module 122. The portion of liquid from purification osmotic module retentate inlet stream 167 that is transported from retentate side 123 of purification osmotic module 122, through an osmotic membrane of purification osmotic module 122, to permeate side 124 of purification osmotic module 122 can form at least a portion of purification osmotic module permeate outlet stream 168.

Certain embodiments comprise operating a purification osmotic module to produce a purification osmotic module permeate outlet stream having an osmotic pressure that is lower than an osmotic pressure of the feed solution entering the feed osmotic module. For example, referring to FIG. 1A, in some embodiments, purification osmotic module 122 is operated to produce purification osmotic module permeate outlet stream 168, which can have an osmotic pressure that is lower than the osmotic pressure of feed solution 156 entering feed osmotic module 102.

In FIG. 1A, purification osmotic module 122 is shown operated in cross-flow mode (i.e., there is no draw stream being flowed across permeate side 124 of purification osmotic module 122). Such operation is optional, however, and in other embodiments, the purification osmotic module can be operated in counter-flow mode. For example, in some embodiments, a draw stream can be fed to permeate side 124 of purification osmotic module 122, and purification osmotic module 122 can be operated in counter-flow mode.

According to certain embodiments, the isolation osmotic module retentate outlet stream can be split into at least a first portion that enters the permeate side of the feed osmotic module and a second portion that enters the permeate side of the isolation osmotic module. Some such embodiments comprise transporting a first portion of the isolation osmotic module retentate outlet stream to the permeate side of the feed osmotic module, and transporting a second portion of the isolation osmotic module retentate outlet stream to a permeate side of the isolation osmotic module. It has been observed that operating the osmotic system in this way can, surprisingly, reduce the amount of osmotic membrane surface area that is needed to achieve a given level of purification for a given feed stream. Without wishing to be bound by any particular theory, it is believed that this is due to a reduction in the total volume of fluid circulating in the osmotic system.

For example, in some embodiments, the second side (e.g., the permeate side) of the isolation osmotic module is fluidically connected to the first side (e.g., the retentate side) of the isolation osmotic module. In some embodiments, the isolation osmotic module permeate inlet stream comprises at least a portion (e.g., at least 1 wt %, at least 2 wt %, at least 5 wt %, at least 10 wt %, at least 25 wt %, at least 50 wt %, or more) of the isolation osmotic module retentate outlet stream. For example, referring to FIG. 1A, in some embodiments, permeate side 114 of isolation osmotic module 112 is fluidically connected to retentate side 113 of isolation osmotic module 112. In some embodiments, isolation osmotic module permeate inlet stream 163 comprises at least a portion of isolation osmotic module retentate outlet stream 164.

In accordance with certain embodiments, the second side (e.g., the permeate side) of the feed osmotic module is fluidically connected to the first side (e.g., the retentate side) of the isolation osmotic module. In some embodiments, the feed osmotic module permeate inlet stream comprises at least a portion (e.g., at least 1 wt %, at least 2 wt %, at least 5 wt %, at least 10 wt %, at least 25 wt %, at least 50 wt %, or more) of the isolation osmotic module retentate outlet stream. For example, referring to FIG. 1A, in some embodiments, permeate side 104 of feed osmotic module 102 is fluidically connected to retentate side 113 of isolation osmotic module 112. In some embodiments, feed osmotic module permeate inlet stream 160 comprises at least a portion of isolation osmotic module retentate outlet stream 164.

In some embodiments, a relatively high percentage of the isolation osmotic module retentate outlet stream either forms a part (or all) of the isolation osmotic module permeate inlet stream and/or a part (or all) of the feed osmotic module permeate inlet stream. For example, in some embodiments, at least 1 wt %, at least 2 wt %, at least 5 wt %, at least 10 wt %, at least 25 wt %, at least 50 wt %, at least 75 wt %, at least 90 wt %, at least 95 wt %, or at least 99 wt % (and/or, in some embodiments 100 wt %) of the isolation osmotic module retentate outlet stream is used as part (or all) of the isolation osmotic module permeate inlet stream and/or as a part (or all) of the feed osmotic module permeate inlet stream.

The "IOM retentate outlet stream split ratio" is used herein to describe the ratio of the amount of the isolation osmotic module retentate outlet stream that is used as part (or all) of the isolation osmotic module permeate inlet stream to the amount of the isolation osmotic module retentate outlet stream that is used as part (or all) of the feed osmotic module permeate inlet stream. The IOM retentate outlet stream split ratio is calculated as follows:

$$IOMROSSR = \frac{m_{IOM,perm,inlet}}{m_{FOM,perm,inlet}}$$

Where IOMROSSR is the IOM retentate outlet stream split ratio; $m_{IOM,perm,inlet}$ is the amount (by mass) of the isolation osmotic module retentate outlet stream that is used as part (or all) of the isolation osmotic module permeate inlet stream; and $m_{FOM,perm,inlet}$ is the amount (by mass) of the isolation osmotic module retentate outlet stream that is used as part (or all) of the feed osmotic module permeate inlet stream. In certain embodiments, the IOM retentate outlet stream split ratio is at least 0.01, at least 0.02, at least 0.1, at least 0.5, or at least 1 (and/or, in some embodiments, up to 2, up to 10, up to 50, or up to 100).

In accordance with some embodiments, the ratio of the mass flow rate of the feed osmotic module permeate inlet stream to the mass flow rate of the isolation osmotic module retentate outlet stream can have any of a variety of values. In some embodiments, the ratio of the mass flow rate of the feed osmotic module permeate inlet stream to the mass flow rate of the isolation osmotic module retentate outlet stream is at least 0.01, at least 0.02, at least 0.1, or at least 0.5 (and/or, in some embodiments, up to 0.75, up to 0.85, up to 0.9, up to 0.95, up to 0.98, up to 0.99, or higher). For example, referring to FIG. 1A, in some embodiments, the ratio of the mass flow rate of feed osmotic module permeate inlet stream 160 to the mass flow rate of isolation osmotic module retentate outlet stream 164 is at least 0.01, at least 0.02, at least 0.1, or at least 0.5 (and/or, in some embodiments, up to 0.75, up to 0.85, up to 0.9, up to 0.95, up to 0.98, up to 0.99, or higher).

In accordance with certain embodiments, the ratio of the mass flow rate of the isolation osmotic module permeate inlet stream to the mass flow rate of the isolation osmotic module retentate outlet stream can have any of a variety of values. In some embodiments, the ratio of the mass flow rate of the isolation osmotic module permeate inlet stream to the mass flow rate of the isolation osmotic module retentate outlet stream is at least 0.01, at least 0.02, at least 0.1, or at least 0.5 (and/or, in some embodiments, up to 0.75, up to 0.85, up to 0.9, up to 0.95, up to 0.98, up to 0.99, or higher). For example, referring to FIG. 1A, in some embodiments, the ratio of the mass flow rate of the isolation osmotic module permeate inlet stream 163 to the mass flow rate of isolation osmotic module retentate outlet stream 164 is at least 0.01, at least 0.02, at least 0.1, or at least 0.5 (and/or, in some embodiments, up to 0.75, up to 0.85, up to 0.9, up to 0.95, up to 0.98, up to 0.99, or higher).

In some embodiments, a relatively large percentage of the isolation osmotic module retentate outlet stream is used as a part (or all) of the isolation osmotic module permeate inlet stream. For example, in some embodiments, at least 1 wt %, at least 2 wt %, at least 5 wt %, at least 10 wt %, at least 25 wt %, or at least 50 wt % of the isolation osmotic module retentate outlet stream is used as part (or all) of the isolation osmotic module permeate inlet stream. In some embodiments, less than or equal to 99 wt %, less than or equal to 98 wt %, less than or equal to 95 wt %, less than or equal to 90 wt %, less than or equal to 85 wt %, or less than or equal to 75 wt % of the isolation osmotic module retentate outlet stream is used as part (or all) of the isolation osmotic module permeate inlet stream. Combinations of these ranges are also possible (e.g., at least 1 wt % and less than or equal to 99 wt %). Referring to FIG. 1A, for example, in some embodiments, at least 1 wt %, at least 2 wt %, at least 5 wt %, at least 10 wt %, at least 25 wt %, or at least 50 wt % (and/or, less than or equal to 99 wt %, less than or equal to 98 wt %, less than or equal to 95 wt %, less than or equal to 90 wt %, less than or equal to 85 wt %, or less than or equal to 75 wt %) of isolation osmotic module retentate outlet stream 164 is used as part (or all) of isolation osmotic module permeate inlet stream 163.

In some embodiments, a relatively large percentage of the isolation osmotic module permeate inlet stream is made up of fluid from the retentate side of the isolation osmotic module (e.g., from one or more retentate outlet streams originating from the retentate side of the isolation osmotic module). For example, in some embodiments, at least 1 wt %, at least 2 wt %, at least 5 wt %, at least 10 wt %, at least 25 wt %, at least 50 wt %, at least 75 wt %, at least 90 wt %, at least 95 wt %, at least 99 wt %, or all of the isolation osmotic module permeate inlet stream is made up of fluid from the retentate side of the isolation osmotic module (e.g., from one or more retentate outlet streams originating from the retentate side of the isolation osmotic module). Referring to FIG. 1A, for example, in some embodiments, at least 1 wt %, at least 2 wt %, at least 5 wt %, at least 10 wt %, at least 25 wt %, at least 50 wt %, at least 75 wt %, at least 90 wt %, at least 95 wt %, at least 99 wt %, or all of isolation osmotic module permeate inlet stream 163 is made up of retentate outlet stream 164.

In some embodiments, a relatively large percentage of the isolation osmotic module retentate outlet stream is used as a part (or all) of the feed osmotic module permeate inlet stream. For example, in some embodiments, at least 1 wt %, at least 2 wt %, at least 5 wt %, at least 10 wt %, at least 25 wt %, or at least 50 wt % of the isolation osmotic module retentate outlet stream is used as part (or all) of the feed osmotic module permeate inlet stream. In some embodiments, less than or equal to 99 wt %, less than or equal to 98 wt %, less than or equal to 95 wt %, less than or equal to 90 wt %, less than or equal to 85 wt %, or less than or equal to 75 wt % of the isolation osmotic module retentate outlet stream is used as part (or all) of the feed osmotic module permeate inlet stream. Combinations of these ranges are also possible (e.g., at least 1 wt % and less than or equal to 99 wt %). Referring to FIG. 1A, for example, in some embodiments, at least 1 wt %, at least 2 wt %, at least 5 wt %, at least 10 wt %, at least 25 wt %, or at least 50 wt % (and/or, less than or equal to 99 wt %, less than or equal to 98 wt %, less than or equal to 95 wt %, less than or equal to 90 wt %, less than or equal to 85 wt %, or less than or equal to 75 wt %) of isolation osmotic module retentate outlet stream 164 is used as part (or all) of feed osmotic module permeate inlet stream 160.

In some embodiments, a relatively large percentage of the feed osmotic module permeate inlet stream is made up of fluid from the retentate side of the isolation osmotic module (e.g., from one or more retentate outlet streams originating from the retentate side of the isolation osmotic module). For example, in some embodiments, at least 1 wt %, at least 2 wt %, at least 5 wt %, at least 10 wt %, at least 25 wt %, at least 50 wt %, at least 75 wt %, at least 90 wt %, at least 95 wt %, at least 99 wt %, or all of the feed osmotic module permeate inlet stream is made up of fluid from the retentate side of the isolation osmotic module (e.g., from one or more retentate outlet streams originating from the retentate side of the isolation osmotic module). Referring to FIG. 1A, for example, in some embodiments, at least 1 wt %, at least 2 wt %, at least 5 wt %, at least 10 wt %, at least 25 wt %, at least 50 wt %, at least 75 wt %, at least 90 wt %, at least 95 wt %, at least 99 wt %, or all of feed osmotic module permeate inlet stream 160 is made up of retentate outlet stream 164.

Additional fluidic connections may also be made within the osmotic system, for example, between the optional purification osmotic module and the feed osmotic module and/or the isolation osmotic module.

For example, in some embodiments, the second side (e.g., permeate side) of the feed osmotic module is fluidically connected to the first side (e.g., retentate side) of the purification osmotic module. In certain embodiments, the purification osmotic module retentate inlet stream comprises at least a portion (e.g., at least 1 wt %, at least 2 wt %, at least 5 wt %, at least 10 wt %, at least 25 wt %, at least 50 wt %, at least 75 wt %, at least 90 wt %, at least 95 wt %, or at least 99 wt %, and/or, in certain embodiments, up to 100 wt %) of the feed osmotic module permeate outlet stream. Referring to FIG. 1A, for example, in some embodiments, permeate side 104 of feed osmotic module 102 is fluidically connected to retentate side 123 of purification osmotic module 122. In certain embodiments, purification osmotic module retentate inlet stream 167 comprises at least a portion of feed osmotic module permeate outlet stream 162.

In certain embodiments, the second side (e.g., permeate side) of the isolation osmotic module is fluidically connected to the first side (e.g., retentate side) of the purification osmotic module. In some embodiments, the purification osmotic module retentate inlet stream comprises at least a portion (e.g., at least 1 wt %, at least 2 wt %, at least 5 wt %, at least 10 wt %, at least 25 wt %, at least 50 wt %, at least 75 wt %, at least 90 wt %, at least 95 wt %, or at least 99 wt %, and/or, in certain embodiments, up to 100 wt %) of the isolation osmotic module permeate outlet stream. Referring to FIG. 1A, for example, in some embodiments, permeate side 114 of isolation osmotic module 112 is fluidically connected to retentate side 123 of purification osmotic module 122. In certain embodiments, purification osmotic module retentate inlet stream 167 comprises at least a portion of isolation osmotic module permeate outlet stream 165.

The purification osmotic module can be configured, in some embodiments, to receive fluid from both the permeate side of the feed osmotic module and the permeate side of the isolation osmotic module. For example, in some embodiments, the first side (e.g., the retentate side) of the purification osmotic module is fluidically connected to both the second side (e.g., permeate side) of the feed osmotic module and the second side (e.g., permeate side) of the isolation osmotic module. In some such embodiments, the purification osmotic module retentate inlet stream comprises at least a portion (e.g., at least 1 wt %, at least 2 wt %, at least 5 wt %, at least 10 wt %, at least 25 wt %, at least 50 wt %, at least 75 wt %, at least 90 wt %, at least 95 wt %, or at least 99 wt %, and/or, in certain embodiments, up to 100 wt %) of the feed osmotic module permeate outlet stream and at least a portion (e.g., at least 1 wt %, at least 2 wt %, at least 5 wt %, at least 10 wt %, at least 25 wt %, at least 50 wt %, at least 75 wt %, at least 90 wt %, at least 95 wt %, or at least 99 wt %, and/or, in certain embodiments, up to 100 wt %) of the isolation osmotic module permeate outlet stream.

The "POM retentate inlet stream split ratio" is used herein to describe the ratio of the amount of the feed osmotic module permeate outlet stream that is used as part (or all) of the purification osmotic module retentate inlet stream to the amount of the isolation osmotic module permeate outlet stream that is used as part (or all) of the purification osmotic module retentate inlet stream. The POM retentate inlet stream split ratio is calculated as follows:

$$POMRISSR = \frac{m_{FOM,perm,out}}{m_{IOM,perm,out}}$$

where POMRISSR is the POM retentate inlet stream split ratio; $m_{FOM,perm,out}$ is the amount (by mass) of the feed osmotic module permeate outlet stream that is used as part (or all) of the purification osmotic module retentate inlet stream; and $m_{IOM,perm,out}$ is the amount (by mass) of the isolation osmotic module permeate outlet stream that is used as part (or all) of the purification osmotic module retentate inlet stream. In certain embodiments, the POM retentate inlet stream split ratio is at least 0.01, at least 0.02, at least 0.1, at least 0.5, or at least 1 (and/or, in some embodiments, up to 2, up to 10, up to 50, or up to 100).

In accordance with some embodiments, the ratio of the mass flow rate of the feed osmotic module permeate outlet stream to the mass flow rate of the purification osmotic module retentate inlet stream can have a variety of values. In some embodiments, the ratio of the mass flow rate of the feed osmotic module permeate outlet stream to the mass flow rate of the purification osmotic module retentate inlet stream is at least 0.01, at least 0.02, at least 0.1, or at least 0.5 (and/or, in some embodiments, up to 0.75, up to 0.85, up to 0.9, up to 0.95, up to 0.98, up to 0.99, or higher). For example, referring to FIG. 1A, in some embodiments, the ratio of the mass flow rate of feed osmotic module permeate outlet stream 162 to the mass flow rate of purification osmotic module retentate inlet stream 167 is at least 0.01, at least 0.02, at least 0.1, or at least 0.5 (and/or, in some embodiments, up to 0.75, up to 0.85, up to 0.9, up to 0.95, up to 0.98, up to 0.99, or higher).

In accordance with some embodiments, the ratio of the mass flow rate of the isolation osmotic module permeate outlet stream to the mass flow rate of the purification osmotic module retentate inlet stream can have a variety of values. In some embodiments, the ratio of the mass flow rate of the isolation osmotic module permeate outlet stream to the mass flow rate of the purification osmotic module retentate inlet stream is at least 0.01, at least 0.02, at least 0.1, or at least 0.5 (and/or, in some embodiments, up to 0.75, up to 0.85, up to 0.9, up to 0.95, up to 0.98, up to 0.99, or higher). For example, referring to FIG. 1A, in some embodiments, the ratio of the mass flow rate of isolation osmotic module permeate outlet stream 165 to the mass flow rate of purification osmotic module retentate inlet stream 167 is at least 0.01, at least 0.02, at least 0.1, or at least 0.5 (and/or, in some embodiments, up to 0.75, up to 0.85, up to 0.9, up to 0.95, up to 0.98, up to 0.99, or higher).

In some embodiments, a relatively large percentage of the purification osmotic module retentate inlet stream is made up of fluid from the permeate side of the isolation osmotic module (e.g., from one or more permeate outlet streams originating from the permeate side of the isolation osmotic module) and/or the permeate side of the feed osmotic module (e.g., from one or more permeate outlet streams originating from the permeate side of the feed osmotic module). For example, in some embodiments, at least 1 wt %, at least 2 wt %, at least 5 wt %, at least 10 wt %, at least 25 wt %, at least 50 wt %, at least 75 wt %, at least 90 wt %, at least 95 wt %, at least 99 wt %, or all of the purification osmotic module retentate inlet stream is made up of fluid from the permeate side of the isolation osmotic module (e.g., from one or more permeate outlet streams originating from the permeate side of the isolation osmotic module) and/or the permeate side of the feed osmotic module (e.g., from one or more permeate outlet streams originating from the permeate side of the feed osmotic module). Referring to FIG. 1A, for example, in some embodiments, at least 1 wt %, at least 2 wt %, at least 5 wt %, at least 10 wt %, at least 25 wt %, at least 50 wt %, at least 75 wt %, at least 90 wt %, at least 95 wt %, at least 99 wt %, or all of purification osmotic module retentate inlet stream 167 is made up of isolation osmotic module permeate outlet stream 165 and feed osmotic module permeate outlet stream 162.

In some embodiments, a relatively large percentage of the purification osmotic module retentate inlet stream is made up of fluid from the permeate side of the isolation osmotic module (e.g., from one or more permeate outlet streams originating from the permeate side of the isolation osmotic module). For example, in some embodiments, at least 1 wt %, at least 2 wt %, at least 5 wt %, at least 10 wt %, at least 25 wt %, or at least 50 wt % of the purification osmotic module retentate inlet stream is made up of fluid from the permeate side of the isolation osmotic module (e.g., from one or more permeate outlet streams originating from the permeate side of the isolation osmotic module). In some embodiments, less than or equal to 99 wt %, less than or equal to 98 wt %, less than or equal to 95 wt %, less than or equal to 90 wt %, less than or equal to 85 wt %, or less than or equal to 75 wt % of the purification osmotic module retentate inlet stream is made up of fluid from the permeate side of the isolation osmotic module (e.g., from one or more permeate outlet streams originating from the permeate side of the isolation osmotic module). Combinations of these ranges are also possible (e.g., at least 1 wt % and less than or equal to 99 wt %). Referring to FIG. 1A, for example, in some embodiments, at least 1 wt %, at least 2 wt %, at least 5 wt %, at least 10 wt %, at least 25 wt %, or at least 50 wt % (and/or, less than or equal to 99 wt %, less than or equal to 98 wt %, less than or equal to 95 wt %, less than or equal to 90 wt %, less than or equal to 85 wt %, or less than or equal to 75 wt %) of purification osmotic module retentate inlet stream 167 is made up of fluid from permeate side 114 of isolation osmotic module 112 (e.g., from permeate outlet stream 165 originating from permeate side 114 of isolation osmotic module 112).

In some embodiments, a relatively large percentage of the isolation osmotic module permeate outlet stream is used as part (or all) of the purification osmotic module retentate inlet stream. For example, in some embodiments, at least 1 wt %, at least 2 wt %, at least 5 wt %, at least 10 wt %, at least 25 wt %, at least 50 wt %, at least 75 wt %, at least 90 wt %, at least 95 wt %, at least 99 wt %, or all of the isolation osmotic module permeate outlet stream is used as part (or all) of the purification osmotic module retentate inlet stream. Referring to FIG. 1A, for example, in some embodiments, at least 1 wt %, at least 2 wt %, at least 5 wt %, at least 10 wt %, at least 25 wt %, at least 50 wt %, at least 75 wt %, at least 90 wt %, at least 95 wt %, at least 99 wt %, or all of isolation osmotic module permeate outlet stream 165 is used as part (or all) of purification osmotic module retentate inlet stream 167.

In some embodiments, a relatively large percentage of the purification osmotic module retentate inlet stream is made up of fluid from the permeate side of the feed osmotic module (e.g., from one or more permeate outlet streams originating from the permeate side of the feed osmotic module). For example, in some embodiments, at least 1 wt %, at least 2 wt %, at least 5 wt %, at least 10 wt %, at least 25 wt %, or at least 50 wt % of the purification osmotic module retentate inlet stream is made up of fluid from the permeate side of the feed osmotic module (e.g., from one or more permeate outlet streams originating from the permeate side of the feed osmotic module). In some embodiments, less than or equal to 99 wt %, less than or equal to 98 wt %, less than or equal to 95 wt %, less than or equal to 90 wt %, less than or equal to 85 wt %, or less than or equal to 75 wt % of the purification osmotic module retentate inlet stream is made up of fluid from the permeate side of the feed osmotic module (e.g., from one or more permeate outlet streams originating from the permeate side of the feed osmotic module). Combinations of these ranges are also possible (e.g., at least 1 wt % and less than or equal to 99 wt %). Referring to FIG. 1A, for example, in some embodiments, at least 1 wt %, at least 2 wt %, at least 5 wt %, at least 10 wt %, at least 25 wt %, or at least 50 wt % (and/or, less than or equal to 99 wt %, less than or equal to 98 wt %, less than or equal to 95 wt %, less than or equal to 90 wt %, less than or equal to 85 wt %, or less than or equal to 75 wt %) of purification osmotic module retentate inlet stream 167 is made up of fluid from permeate side 104 of feed osmotic module 102 (e.g., from permeate outlet stream 162 originating from permeate side 104 of feed osmotic module 102).

In some embodiments, a relatively large percentage of the feed osmotic module permeate outlet stream is used as part (or all) of the purification osmotic module retentate inlet stream. For example, in some embodiments, at least 1 wt %, at least 2 wt %, at least 5 wt %, at least 10 wt %, at least 25 wt %, at least 50 wt %, at least 75 wt %, at least 90 wt %, at least 95 wt %, at least 99 wt %, or all of the feed osmotic module permeate outlet stream is used as part (or all) of the purification osmotic module retentate inlet stream. Referring to FIG. 1A, for example, in some embodiments, at least 1 wt %, at least 2 wt %, at least 5 wt %, at least 10 wt %, at least 25 wt %, at least 50 wt %, at least 75 wt %, at least 90 wt %, at least 95 wt %, at least 99 wt %, or all of feed osmotic module permeate outlet stream 162 is used as part (or all) of purification osmotic module retentate inlet stream 167.

Additional fluidic connections may also be present in the osmotic system. For example, in some embodiments, the first side (e.g., retentate side) of the purification osmotic module is fluidically connected to the first side (e.g., retentate side) of the isolation osmotic module.

In certain embodiments, the isolation osmotic module retentate inlet stream comprises at least a portion (e.g., at least 1 wt %, at least 2 wt %, at least 5 wt %, at least 10 wt %, at least 25 wt %, at least 50 wt %, at least 75 wt %, at least 90 wt %, at least 95 wt %, or at least 99 wt %, and/or, in certain embodiments, up to 100 wt %) of the purification osmotic module retentate outlet stream. Referring to FIG. 1A, for example, in some embodiments, retentate side 123 of purification osmotic module 122 is fluidically connected to retentate side 113 of isolation osmotic module 112. In certain embodiments, isolation osmotic module retentate inlet stream 161 comprises at least a portion of purification osmotic module retentate outlet stream 166.

In some embodiments, a relatively large percentage of the isolation osmotic module retentate inlet stream is made up of fluid from the retentate side of the purification osmotic module (e.g., from one or more retentate outlet streams originating from the retentate side of the purification osmotic module). For example, in some embodiments, at least 1 wt %, at least 2 wt %, at least 5 wt %, at least 10 wt %, at least 25 wt %, at least 50 wt %, at least 75 wt %, at least 90 wt %, at least 95 wt %, at least 99 wt %, or all of the isolation osmotic module retentate inlet stream is made up of fluid from the retentate side of the purification osmotic module (e.g., from one or more retentate outlet streams originating from the retentate side of the purification osmotic module). Referring to FIG. 1A, for example, in some embodiments, at least 1 wt %, at least 2 wt %, at least 5 wt %, at least 10 wt %, at least 25 wt %, at least 50 wt %, at least 75 wt %, at least 90 wt %, at least 95 wt %, at least 99 wt %, or all of isolation osmotic module retentate inlet stream 161 is made up of purification osmotic module retentate outlet stream 166.

As noted above, certain embodiments are related to the use of inventive feed solution recycling techniques. It has been discovered that, in certain cases, varying the degree of recycling over time leads, unexpectedly, to more efficient operation of the osmotic system and/or reduced fouling and/or scaling within the osmotic system.

The osmotic system further comprises, in some embodiments, a recycle stream connecting an outlet of the first side of the feed osmotic module to an inlet of the first side of the feed osmotic module. For example, in FIG. 1A, osmotic system 100 comprises recycle stream 169 connecting outlet 170 of retentate side 103 of feed osmotic module 102 to inlet 171 of retentate side 103 of feed osmotic module 102.

According to certain embodiments, during a first period of time, the retentate side of the feed osmotic module receives at least a portion (e.g., at least 1 wt %, at least 2 wt %, at least 5 wt %, at least 10 wt %, at least 25 wt %, at least 50 wt %, at least 75 wt %, at least 90 wt %, at least 95 wt %, or at least 99 wt %, and/or, in certain embodiments, up to 100 wt %) of the feed osmotic module retentate outlet stream. For example, in some embodiments, during the first period of time, at least a portion of the feed osmotic module retentate outlet stream is transported to (e.g., recycled back to) a feed osmotic module retentate inlet. An example of one such mode of operation is illustrated in FIG. 1A, in which recycle stream 169 is used to recycle at least a portion of feed osmotic module retentate outlet stream 155 (from outlet 170) back to inlet 171 of feed osmotic module 102.

Figure 1B:
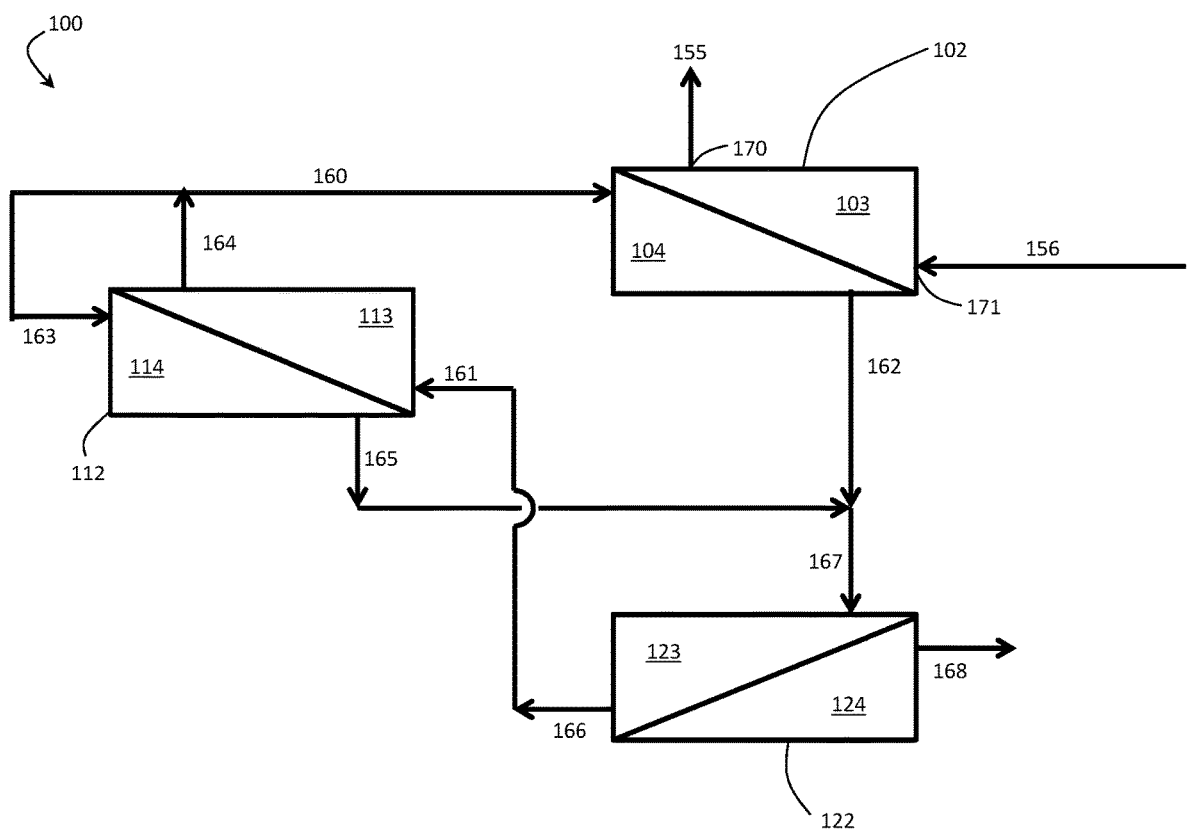
FIG. 1B is a schematic illustration of an exemplary osmotic system in which a retentate outlet of a feed osmotic module is not recycled back to a retentate-side inlet of the feed osmotic module, in accordance with certain embodiments.

According to some embodiments, during a second period of time that is after the first period of time, the retentate side of the feed osmotic module no longer receives any portion of the feed osmotic module retentate outlet stream or receives an amount of the feed osmotic module retentate outlet stream that is less than the amount of the feed osmotic module retentate outlet stream received by the retentate side of the feed osmotic module during the first period of time. For example, in some embodiments, during a second period of time that is after the first period of time, a feed osmotic module retentate outlet stream is not transported to (e.g., recycled back to) the feed osmotic module retentate inlet, or the amount of feed osmotic module retentate outlet stream that is transported to (e.g., recycled back to) the feed osmotic module retentate inlet is reduced relative to the amount of feed osmotic module retentate outlet stream that is transported to the feed osmotic module retentate inlet during the first period of time. An example of one such mode of operation is illustrated in FIG. 1B, in which recycle stream 169 has been eliminated such that no portion of feed osmotic module retentate outlet stream 155 (from outlet 170) is transported back to inlet 171 of feed osmotic module 102.

In some embodiments, during the second period of time that is after the first period of time, the amount of feed osmotic module retentate outlet stream that is transported to the feed osmotic module retentate inlet is reduced relative to the amount of feed osmotic module retentate outlet stream that is transported to the feed osmotic module retentate inlet during the first period of time by at least 10 wt %, at least 25 wt %, at least 50 wt %, at least 75 wt %, at least 90 wt %, at least 95 wt %, or at least 99 wt %. The percentage reduction of the amount of feed osmotic module retentate outlet stream that is transported to the feed osmotic module retentate inlet is calculated relative to the initial value. As an example, if one were to reduce the amount of feed osmotic module retentate outlet stream that is transported to the feed osmotic module retentate inlet from an initial value of 100 kg/min to a later value of 40 kg/min, the percentage reduction would be 60 wt % (because a reduction from 100 kg/min to 40 kg/min is a reduction of 60 kg/min, which is 60% of the initial value of 100 kg/min).

According to certain embodiments, during the second period of time, less than or equal to 90 wt %, less than or equal to 75 wt %, less than or equal to 50 wt %, less than or equal to 25 wt %, less than or equal to 10 wt %, less than or equal to 5 wt %, less than or equal to 1 wt %, or less of the feed osmotic module retentate outlet stream is recycled back to the retentate side of the feed osmotic module. In some embodiments, during the second period of time, none of the feed osmotic module retentate outlet stream is recycled back to the retentate side of the feed osmotic module.

The osmotic system can, in some embodiments, be operated as otherwise described elsewhere herein during the first period of time (during which the amount of feed osmotic module retentate side recycling is relatively high) and during the second period of time (during which the amount of feed osmotic module retentate side recycling is relatively low).

For example, in some embodiments, during both the first period of time and the second period of time, at least a portion of an isolation osmotic module retentate inlet stream is transported to a retentate side of an isolation osmotic module, and at least a portion of an isolation osmotic module permeate inlet stream is transported to a permeate side of the isolation osmotic module. In some such embodiments, an isolation osmotic module retentate outlet stream, having an osmotic pressure that is greater than an osmotic pressure of the isolation osmotic module retentate inlet stream, exits the retentate side of the isolation osmotic module. In certain such embodiments, at least a portion of liquid from the isolation osmotic module retentate inlet stream is transported from the retentate side of the isolation osmotic module, through an osmotic membrane of the isolation osmotic module, to a permeate side of the isolation osmotic module where the portion of the liquid is combined with an isolation osmotic module permeate inlet stream to form an isolation osmotic module permeate outlet stream that is transported out of the permeate side of the isolation osmotic module.

Additionally, in certain embodiments, during both the first period of time and the second period of time, the feed osmotic module permeate inlet stream comprises at least a portion of the isolation osmotic module retentate outlet stream. In some embodiments, during both the first period of time and the second period of time, the isolation osmotic module permeate inlet stream comprises at least a portion of the isolation osmotic module retentate outlet stream.

In some embodiments, during both the first period of time and the second period of time, a purification osmotic module retentate inlet stream is transported to a retentate side of a purification osmotic module such that a purification osmotic module retentate outlet stream exits the retentate side of the purification osmotic module, the purification osmotic module retentate outlet stream having an osmotic pressure that is greater than an osmotic pressure of the purification osmotic module retentate inlet stream. In some embodiments, during both the first period of time and the second period of time, at least a portion of liquid from purification osmotic module retentate inlet stream is transported from the retentate side of the purification osmotic module, through an osmotic membrane of the purification osmotic module, to a permeate side of the purification osmotic module.

In some embodiments, the first period of time (during which the amount of feed osmotic module retentate side recycling is relatively high) can be at least 1 minute, at least 4 minutes, at least 30 minutes, at least 1 hour, at least 6 hours, at least 24 hours, or longer.

In some embodiments, the second period of time (during which the amount of feed osmotic module retentate side recycling is relatively low) can be at least 1 minute, at least 10 minutes, at least 30 minutes, at least 1 hour, at least 6 hours, at least 24 hours, or longer.

According to certain embodiments, during a third period of time that is after the first period of time and the second period of time, the amount of the feed osmotic module retentate outlet stream that is recycled back to the retentate side of the feed osmotic module is adjusted to be relatively high again. For example, in some embodiments, during a third period of time that is after the first period of time and the second period of time, the retentate side of the feed osmotic module receives at least a portion (e.g., at least 1 wt %, at least 2 wt %, at least 5 wt %, at least 10 wt %, at least 25 wt %, at least 50 wt %, at least 75 wt %, at least 90 wt %, at least 95 wt %, or at least 99 wt %, and/or, in certain embodiments, up to 100 wt %) of the feed osmotic module retentate outlet stream. In some embodiments, during the third period of time, at least a portion of the feed osmotic module retentate outlet stream is transported to (e.g., recycled back to) a feed osmotic module retentate inlet. An example of one such mode of operation is illustrated in FIG. 1A, in which recycle stream 169 is used to recycle at least a portion of feed osmotic module retentate outlet stream 155 (from outlet 170) back to inlet 171 of feed osmotic module 102.

The amount of the feed osmotic module retentate outlet stream that is received by the retentate side of the feed osmotic module during the third period of time can be, in some embodiments, at least 50 wt %, at least 75 wt %, at least 90 wt %, at least 95 wt %, or at least 99 wt %, or more of the amount of the feed osmotic module retentate outlet stream that was received by the retentate side of the feed osmotic module during the first period of time.

According to certain embodiments, during a fourth period of time that is after the first period of time, the second period of time, and the third period of time, the amount of the feed osmotic module retentate outlet stream that is recycled back to the retentate side of the feed osmotic module is adjusted to be relatively low again. For example, in some embodiments, during a fourth period of time that is after the first period of time, the second period of time, and the third period of time, the retentate side of the feed osmotic module no longer receives any portion of the feed osmotic module retentate outlet stream or receives an amount of the feed osmotic module retentate outlet stream that is less than the amount of the feed osmotic module retentate outlet stream received by the retentate side of the feed osmotic module during the third period of time (and/or during the first period of time). For example, in some embodiments, during the fourth period of time, a feed osmotic module retentate outlet stream is not transported to (e.g., recycled back to) the feed osmotic module retentate inlet, or the amount of feed osmotic module retentate outlet stream that is transported to (e.g., recycled back to) the feed osmotic module retentate inlet is reduced relative to the amount of feed osmotic module retentate outlet stream that is transported to the feed osmotic module retentate inlet during the third period of time (and/or during the first period of time). An example of one such mode of operation is illustrated in FIG. 1B, in which recycle stream 169 has been eliminated such that no portion of feed osmotic module retentate outlet stream 155 (from outlet 170) is transported back to inlet 171 of feed osmotic module 102.

In some embodiments, during the fourth period of time, the amount of feed osmotic module retentate outlet stream that is transported to the feed osmotic module retentate inlet is reduced relative to the amount of feed osmotic module retentate outlet stream that is transported to the feed osmotic module retentate inlet during the third period of time (and/or the first period of time) by at least 10 wt %, at least 25 wt %, at least 50 wt %, at least 75 wt %, at least 90 wt %, at least 95 wt %, or at least 99 wt %.

According to certain embodiments, during the fourth period of time, less than or equal to 90 wt %, less than or equal to 75 wt %, less than or equal to 50 wt %, less than or equal to 25 wt %, less than or equal to 10 wt %, less than or equal to 5 wt %, less than or equal to 1 wt %, or less of the feed osmotic module retentate outlet stream is recycled back to the retentate side of the feed osmotic module. In some embodiments, during the fourth period of time, none of the feed osmotic module retentate outlet stream is recycled back to the retentate side of the feed osmotic module.

The osmotic system can, in some embodiments, be operated as otherwise described elsewhere herein during the third period of time and during the fourth period of time.

In some embodiments, the third period of time (during which the amount of feed osmotic module retentate side recycling is, again, relatively high) can be at least 1 minute, at least 4 minutes, at least 30 minutes, at least 1 hour, at least 6 hours, at least 24 hours, or longer.

In some embodiments, the fourth period of time (during which the amount of feed osmotic module retentate side recycling is, again, relatively low) can be at least 1 minute, at least 10 minutes, at least 30 minutes, at least 1 hour, at least 6 hours, at least 24 hours, or longer.

According to certain embodiments, the level of recycling that is employed in the osmotic system can be adjusted downward and upward, in an alternating fashion, for additional periods of time (e.g., over at least fifth, sixth, seventh, eighth, etc. periods of time). In some embodiments, the amount of the feed osmotic module retentate outlet stream that is recycled back to the retentate side of the feed osmotic module is subjected to at least 10 cycles (or at least 20, 50, 100, 500, or 1000 cycles) wherein, in each cycle, (1) the amount of the feed osmotic module retentate outlet stream that is recycled back to the retentate side of the feed osmotic module is first reduced by at least 10 wt % (or, in some embodiments, by at least 50 wt %, at least 75 wt %, at least 95 wt %, or is completely shut off) relative to the amount at the beginning of the cycle and (2) the amount of the feed osmotic module retentate outlet stream that is recycled back to the retentate side of the feed osmotic module is subsequently increased such that at least 50 wt % of the reduction (or at least 75 wt %, at least 90 wt %, at least 95 wt %, or at least 99 wt % of the reduction) is restored. As a non-limiting, illustrative example, a cycle could consist of a decline in the recycle stream flow rate from 100 kg/min to 85 kg/min (a 15 wt % reduction) followed by an increase to 99 kg/min (a restoration of 93.3 wt % of the 15 kg/min reduction).

In some embodiments, the hydraulic pressure on the retentate side of the feed osmotic module and/or on the retentate side of the isolation osmotic module may be increased during periods of time during which the feed is recycled, relative to their values when the feed is not recycled (or is recycled to a lesser degree). In some embodiments, during the first period of time and/or during the third period of time (during which a relatively high amount of feed recycling is employed, as discussed above), the maximum gauge pressure on the retentate side of the feed osmotic module is at least 5% greater (or at least 25% greater, at least 50% greater, at least 100% greater, or more) than the maximum gauge pressure on the retentate side of the feed osmotic module during the second period of time and/or during the fourth period of time (during which a relatively low amount of or no feed recycling is employed, as described above). In some embodiments, during the first period of time and/or during the third period of time (during which a relatively high amount of feed recycling is employed, as discussed above), the maximum gauge pressure on the retentate side of the isolation osmotic module is at least 5% greater (or at least 25% greater, at least 50% greater, at least 100% greater, or more) than the maximum gauge pressure on the retentate side of the isolation osmotic module during the second period of time and/or during the fourth period of time (during which a relatively low amount of or no feed recycling is employed, as described above).

In certain embodiments, the osmotic membrane surface area in the osmotic modules (e.g., the feed osmotic module, the isolation osmotic module, and/or the purification osmotic module) may be changed (e.g., increased or decreased) during operation of the osmotic system. In some embodiments, during the first period of time (and/or during any other period of time in which a relatively high amount of feed recycling is employed), the membrane surface area in the osmotic modules (e.g., the feed osmotic module, the isolation osmotic module, and/or the purification osmotic module) may be changed. Changing the amount of membrane surface area that is employed in the osmotic module(s) during recycling can, according to certain embodiments, allow one to advantageously control the concentrations of the solutions within the osmotic modules (e.g., permeate-side solutions and/or retentate-side solutions), which can enhance efficiency of operation.

In some embodiments, the osmotic membrane surface area in the isolation osmotic module may be increased as a function of time during periods of time in which the feed is recycled (e.g., during the first period of time, during the third period of time, etc.). For example, in some embodiments, when feed recycling is being employed, additional flow through the isolation osmotic module may be activated, for example, by introducing additional osmotic membrane(s) to the isolation osmotic module as the recycling operation progresses. That is to say, after an initial period of operation in which feed recycling is employed, additional osmotic membrane(s) may be introduced in the isolation osmotic module while the feed recycling continues. In some such embodiments, the additional osmotic membrane(s) within the isolation osmotic module may be permanently installed but separated from the rest of the membrane(s) in the isolation osmotic module with closed valves relatively early within the recycle period (e.g., relatively early within the first period of time, relatively early within the third period of time, etc.). In some such embodiments, as recycling progresses (e.g., later during the first period of time, later during the third period of time, etc.), flow to the separated membranes can be initiated (e.g., by opening one or more valves), increasing the overall osmotic membrane surface area available for osmotic separation.

In some embodiments, during the first period of time (during which a relatively high amount of feed recycling is employed, as discussed above), the total amount of osmotic membrane surface area within the retentate side of the isolation osmotic module increases, as a function of time, by at least 5%, at least 10%, or at least 25%. Stated another way, in some embodiments, there is at least one point in time during the first period of time at which the total amount of osmotic membrane surface area within the retentate side of the isolation osmotic module is at least 5% (or at least 10%, or at least 25%) greater than the total amount of osmotic membrane surface area that was present within the retentate side of the isolation osmotic module during at least one earlier point in time within the first period of time. A person of ordinary skill in the art would understand that a percentage increase is measured relative to the initial value. To illustrate, if the osmotic membrane surface area within the retentate side of the isolation osmotic module is originally at 100 cm$^2$, and the osmotic membrane surface area within the retentate side of the isolation osmotic module is subsequently increased to 106 cm$^2$, that would correspond to an increase of 6% (because the difference, 6 cm$^2$, is 6% of the original value of 100 cm$^2$). In some embodiments, during the third period of time (and/or during any other period of time in which a relatively high amount of feed recycling is employed), the total amount of osmotic membrane surface area within the retentate side of the isolation osmotic module can increase, as a function of time, by at least 5%, at least 10%, or at least 25%.

In some embodiments, the osmotic membrane surface area in the feed osmotic module may be decreased as a function of time during periods of time in which the feed is recycled (e.g., during the first period of time, during the third period of time, etc.). For example, in some embodiments, when feed recycling is being employed, flow through the feed osmotic module may be deactivated, for example, by actuating valves to stop the flow to a subset of membranes within the feed osmotic module. That is to say, after an initial period of operation in which feed recycling is employed, flow to a subset of the osmotic membrane(s) within the feed osmotic module may be stopped while the feed recycling continues. In some such embodiments, the osmotic membrane(s) to which flow has been stopped may remain separated from the rest of the membrane(s) in the feed osmotic module until a later point in time (e.g., the second period of time, the fourth period of time, etc.).

In some embodiments, during the first period of time (during which a relatively high amount of feed recycling is employed, as discussed above), the total amount of osmotic membrane surface area within the retentate side of the feed osmotic module decreases, as a function of time, by at least 5%, at least 10%, or at least 25%. Stated another way, in some embodiments, there is at least one point in time during the first period of time at which the total amount of osmotic membrane surface area within the retentate side of the feed osmotic module is at least 5% (or at least 10%, or at least 25%) less than the total amount of osmotic membrane surface area that was present within the retentate side of the feed osmotic module during at least one earlier point in time within the first period of time. A person of ordinary skill in the art would understand that a percentage decrease is measured relative to the initial value. To illustrate, if the osmotic membrane surface area within the retentate side of the feed osmotic module is originally at 100 cm$^2$, and the osmotic membrane surface area within the retentate side of the feed osmotic module is subsequently decreased to 92 cm$^2$, that would correspond to a decrease of 8% (because the difference, 8 cm$^2$, is 8% of the original value of 100 cm$^2$). In some embodiments, during the third period of time (and/or during any other period of time in which a relatively high amount of feed recycling is employed), the total amount of osmotic membrane surface area within the retentate side of the feed osmotic module decreases, as a function of time, by at least 5%, at least 10%, or at least 25%.

In some embodiments, the transition(s) between periods of time (e.g., from the first period of time during which a relatively high amount of feed recycling is employed to the second period of time during which a relatively low amount of or no feed recycling is employed; from the second period of time to the third period of time during which a relatively high amount of feed recycling is employed; from the third period of time to the fourth period of time during which a relatively low amount of or no feed recycling is employed; etc.) can be based, at least in part, upon one or more triggering events.

In some embodiments, the triggering event comprises an increase in salt concentration within the recycled feed stream (e.g., stream 169 in FIG. 1A) above a threshold concentration level. For example, in some embodiments, once the concentration of salt within the feed recycle stream exceeds a threshold concentration level, the recycle of the feed stream can be decreased or stopped. In some such embodiments, the threshold concentration level is at least 25 wt %.

In some embodiments, the triggering event comprises the passing of a predetermined amount of time. For example, in some embodiments, once the recycling (e.g., via stream 169) has been performed for a predetermined amount of time, the recycle of the feed stream can be decreased or stopped.

In certain embodiments, the triggering event comprises an increase in the pressure of the feed stream (e.g., stream 156 in FIG. 1A) above a threshold pressure level. In this context of a threshold pressure being a triggering event, the pressure of the feed stream refers to the hydrostatic pressure of the feed stream (e.g., the hydrostatic pressure of stream 156 in FIG. 1A), as determined relative to the ambient environment. For example, in some embodiments, once the pressure of the feed stream entering the retentate side of the feed osmotic module exceeds a threshold pressure level, the recycle of the feed stream can be decreased or stopped. In some such embodiments, the threshold pressure level is at least 25% higher than the pressure of the ambient environment. In some embodiments, the threshold pressure is at least 25% higher than the pressure of the feed stream during a period of time during which a which a relatively low amount of or no feed recycling is employed. As a non-limiting example, in some embodiments a transition from the third period of time during which a relatively high amount of feed recycling is employed to the fourth period of time during which a relatively low amount of or no feed recycling is employed is triggered when a pressure of the feed stream is above a threshold pressure level that is at least 25% higher than the pressure of the feed stream during the second period of time during which a relatively low amount of or no feed recycling is employed.

In some embodiments, the triggering event comprises an increase in the mass flow rate of the fluid exiting the retentate side of the feed osmotic module above a threshold percentage of the mass flow rate of the fluid entering the retentate side of the feed osmotic module. Generally, the difference between the flow rates of the inlet and outlet streams on the retentate side of the feed osmotic module is indicative of the amount of water being transported through the membrane of the feed osmotic module (i.e., from the retentate side to the permeate side of the feed osmotic module). In some embodiments, once the amount of water being transported through the membrane of the feed osmotic module decreases to below a threshold value, it is desirable to reduce or stop the recycling of the feed stream. In some embodiments, the value of the threshold setting that triggers the switch can be between 80% and 100%, between 90% and 100%, or between 95% and 100% of the mass flow rate of the inlet stream fed to the retentate side of the feed osmotic module. To illustrate, in some embodiments, the transition from a recycling regime (e.g., the first period of time) to a reduced or no recycling regime (e.g., the second period of time) can be triggered once the mass flow rate of the stream exiting the retentate side of the feed osmotic module reaches a value that is 97% of the mass flow rate of the stream entering the retentate side of the feed osmotic module. In this case, 97% would be the threshold percentage (which falls within all three of the ranges recited above in this paragraph (i.e., between 80% and 100%, between 90% and 100%, and between 95% and 100%).

In some embodiments, the triggering event can be a combination of two or more of the above.

Figure 1C:
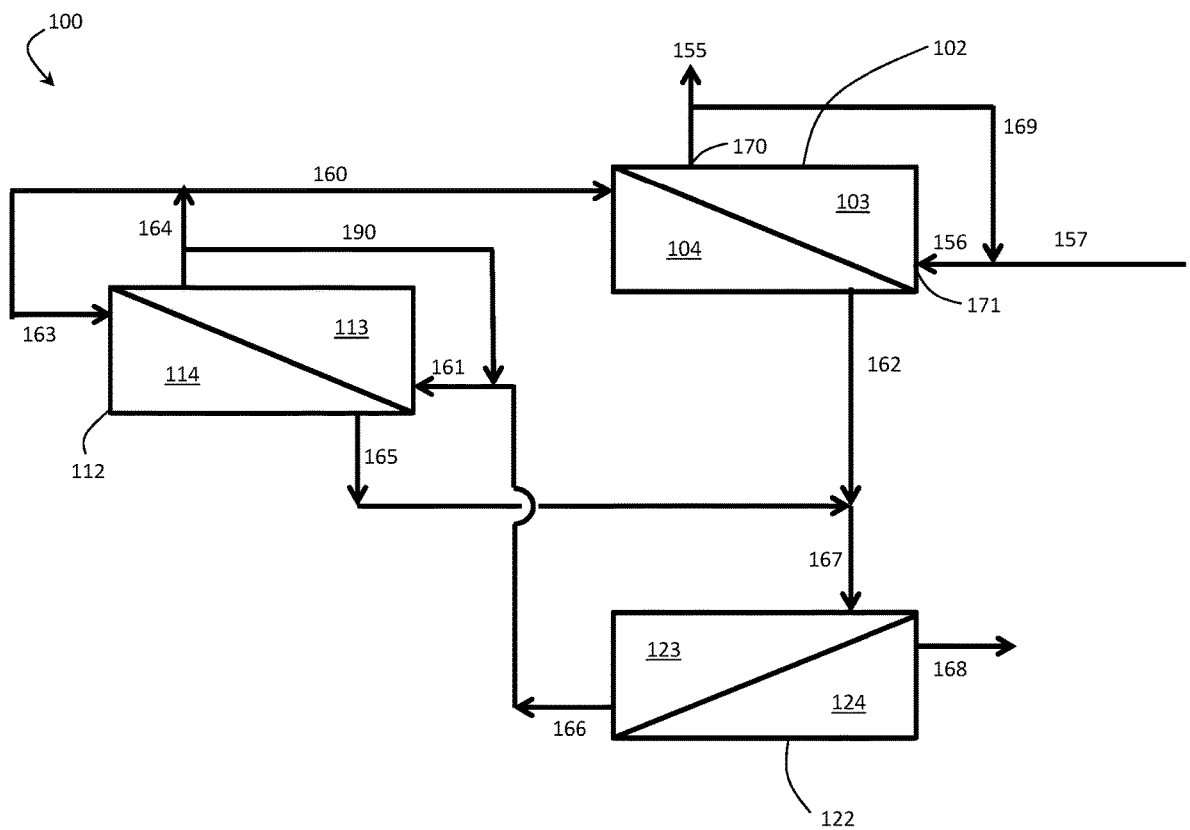
FIG. 1C is a schematic illustration of an exemplary osmotic system in which a retentate outlet of a feed osmotic module is recycled back to a retentate-side inlet of the feed osmotic module, and a retentate outlet of an isolation osmotic module is recycled back to a retentate-side inlet of the isolation osmotic module, in accordance with certain embodiments.

In certain embodiments, the osmotic system further comprises a recycle stream connecting an outlet of the first side (e.g., retentate side) of the isolation osmotic module to an inlet of the first side (e.g., retentate side) of the isolation osmotic module. An example of such a system is shown schematically in FIG. 1C. In FIG. 1C, osmotic system 100 comprises recycle stream 190 connecting the outlet of retentate side 113 of isolation osmotic module 112 to the inlet of retentate side 113 of isolation osmotic module 112.

According to certain embodiments, during the first period of time (when a relatively high level of feed recycling is being employed, as described above), the retentate side of the isolation osmotic module receives at least a portion (e.g., at least 1 wt %, at least 2 wt %, at least 5 wt %, at least 10 wt %, at least 25 wt %, at least 50 wt %, or more) of the isolation osmotic module retentate outlet stream. For example, in some embodiments, during the first period of time, at least a portion of the isolation osmotic module retentate outlet stream is transported to (e.g., recycled back to) an isolation osmotic module retentate inlet. An example of one such mode of operation is illustrated in FIG. 1C, in which recycle stream 169 is used to recycle at least a portion of feed osmotic module retentate outlet stream 155 (from outlet 170) back to inlet 171 of feed osmotic module 102, and in which recycle stream 190 is used to recycle at least a portion of isolation osmotic module retentate outlet stream 164 back to the inlet of retentate side 113 of isolation osmotic module 112.

Without wishing to be bound by any particular theory, it is believed that recycling of retentate-side outlet of the isolation osmotic module leads to an increase in the solute concentration in the retentate side of the isolation osmotic module, which in turn leads to an increase in the solute concentration in the retentate-side outlet of the isolation osmotic module. This can allow one to establish a higher concentration of solute in the permeate inlet streams for the feed osmotic module and/or the isolation osmotic module, which can lead to enhanced operation.

Transport of solvent (e.g., water) through the osmotic membrane(s) of the osmotic modules can be achieved via a transmembrane net driving force (i.e., a net driving force through the thickness of the membrane(s)), according to certain embodiments. Generally, the transmembrane net driving force ($\Delta \chi$) is expressed as:

$$\Delta \chi = \Delta P - \Delta \Pi = (P_1 - P_2) - (\Pi_1 - \Pi_2) \quad [1]$$

wherein $P_1$ is the hydraulic pressure on the first (retentate) side of the osmotic membrane, $P_2$ is the hydraulic pressure on the second (permeate) side of the osmotic membrane, $\Pi_1$ is the osmotic pressure of the stream on the first (retentate) side of the osmotic membrane, and $\Pi_2$ is the osmotic pressure of the stream on the second (permeate) side of the osmotic membrane. $(P_1-P_2)$ can be referred to as the transmembrane hydraulic pressure difference, and $(\Pi_1-\Pi_2)$ can be referred to as the transmembrane osmotic pressure difference.

Those of ordinary skill in the art are familiar with the concept of osmotic pressure. The osmotic pressure of a particular liquid is an intrinsic property of the liquid. The osmotic pressure can be determined in a number of ways, with the most efficient method depending upon the type of liquid being analyzed. For certain solutions with relatively low molar concentrations of ions, osmotic pressure can be accurately measured using an osmometer. In other cases, the osmotic pressure can simply be determined by comparison with solutions with known osmotic pressures. For example, to determine the osmotic pressure of an uncharacterized solution, one could apply a known amount of the uncharacterized solution on one side of a non-porous, semi-permeable, osmotic membrane and iteratively apply different solutions with known osmotic pressures on the other side of the osmotic membrane until the differential pressure through the thickness of the membrane is zero.

The osmotic pressure (Π) of a solution containing n solubilized species may be estimated as:

$$\Pi = \Sigma_{j=1}^{n} i_j dM_j RT \qquad [2]$$

wherein $i_j$ is the van't Hoff factor of the $j^{th}$ solubilized species, $M_j$ is the molar concentration of the $j^{th}$ solubilized species in the solution, R is the ideal gas constant, and T is the absolute temperature of the solution. Equation 2 generally provides an accurate estimate of osmotic pressure for liquid with low concentrations of solubilized species (e.g., concentrations at or below between about 4 wt % and about 6 wt %). For many liquid comprising solubilized species, at species concentrations above around 4-6 wt %, the increase in osmotic pressure per increase in salt concentration is greater than linear (e.g., slightly exponential).

The osmotic modules described herein may, in accordance with certain embodiments, be operated as (or be configured to be operated as) reverse osmosis modules.

Reverse osmosis generally occurs when the osmotic pressure on the first (retentate) side of the osmotic membrane is greater than the osmotic pressure on the second (permeate) side of the osmotic membrane, and a pressure is applied to the first side of the osmotic membrane such that the hydraulic pressure on the first side of the osmotic membrane is sufficiently greater than the hydraulic pressure on the second side of the osmotic membrane to cause solvent (e.g., water) to be transported from the first side of the osmotic membrane to the second side of the osmotic membrane. Generally, such situations result when the transmembrane hydraulic pressure difference ($P_1-P_2$) is greater than the transmembrane osmotic pressure difference ($\Pi_1-\Pi_2$) such that solvent (e.g., water) is transported from the first side of the osmotic membrane to the second side of the osmotic membrane (rather than having solvent transported from the second side of the osmotic membrane to the first side of the osmotic membrane, which would be energetically favored in the absence of the pressure applied to the first side of the osmotic membrane).

In some embodiments, the feed osmotic module is operated as (or is configured to be operated as) a reverse osmosis module. That is to say, in some embodiments, the feed osmotic module is operated (or is configured to be operated) such that solvent is transported from the retentate side of the feed osmotic module to the permeate side of the feed osmotic module by applying a hydraulic pressure to the retentate side of the feed osmotic module as a driving force, such that local osmotic pressure differences through the thickness of the membrane(s) of the feed osmotic module that would otherwise favor the transport of solvent from the permeate side of the feed osmotic module to the retentate side of the feed osmotic module are overcome by the applied hydraulic pressure. In some embodiments, the osmotic pressure of the stream on the retentate side of the feed osmotic module can be higher than the osmotic pressure of the stream on the permeate side of the feed osmotic module, such that solvent (e.g., water) is transported through the feed osmotic module due to a hydraulic pressure applied to the retentate side of the feed osmotic module. For example, referring to FIGS. 1A-1B, feed osmotic module 102 can be used to perform reverse osmosis when the osmotic pressure on retentate side 103 is higher than the osmotic pressure on permeate side 104, a pressure is applied to retentate side 103 such that the hydraulic pressure on retentate side 103 is higher than the hydraulic pressure on permeate side 104, and the difference between the hydraulic pressure on retentate side 103 and the hydraulic pressure on permeate side 104 is greater than the difference between the osmotic pressure on retentate side 103 and the osmotic pressure on permeate side 104. In such cases, solvent (e.g., water) can be transported from retentate side 103 of feed osmotic module 102 to permeate side 104 of feed osmotic module 102. This can result, according to certain embodiments, in the production of retentate outlet stream 155, which can have a higher osmotic pressure than feed 156. For example, when solubilized species (e.g., ions) are contained in stream 156, the reverse osmosis process can result, according to certain embodiments, in the production of retentate outlet stream 155, which can contain solubilized species (e.g., ions) at a molar concentration greater than the molar concentration of solubilized species (e.g., ions) in feed 156. In addition, this can result, according to some embodiments, in the production of feed osmotic module permeate outlet stream 162, which can have a lower osmotic pressure than the osmotic pressure of feed osmotic module permeate inlet stream 160.

In certain embodiments, the isolation osmotic module is operated as (or is configured to be operated as) a reverse osmosis module. In some embodiments, the purification osmotic module is operated as (or is configured to be operated as) a reverse osmosis module. In some embodiments, the feed osmotic module, the isolation osmotic module, and the purification osmotic module are all operated as (or are all configured to be operated as) reverse osmosis modules.

It should be understood, however, that the invention is not necessarily limited to the use of reverse osmosis modules, and in some embodiments, the osmotic modules described herein may be operated as (or be configured to be operated as) forward osmosis modules.

Forward osmosis generally occurs when the osmotic pressure on the permeate side of the osmotic module is greater than the osmotic pressure on the retentate side of the osmotic module such that solvent (e.g., water) is transported from retentate side of the osmotic module to the permeate side of the osmotic module. In forward osmosis modules, solvent (e.g., water) generally is transported from the retentate side of the osmotic module to the permeate side of the osmotic module as long as the hydraulic pressure difference between the permeate side of the osmotic module and the retentate side of the osmotic module is not sufficiently high to overcome the osmotic pressure difference between the retentate and permeate sides of the osmotic module. In this way, the permeate flow and the osmotic driving force are aligned in the same direction. In forward osmosis arrangements, the stream on the permeate side of the osmotic membrane can initiate the transport of solvent (e.g., water) from the stream of the retentate side of the osmotic membrane, through the osmotic membrane, to the permeate side, resulting in the production of a retentate outlet stream having a higher osmotic pressure (e.g., more concentrated in solubilized species (e.g., dissolved ions and/or disassociated molecules)) relative to the retentate inlet stream.

In some cases, pressure may be applied to enhance the forward osmosis process. For example, in some instances in which the stream on the retentate side of the osmotic module has a lower osmotic pressure than the stream on the permeate side of the osmotic module, pressure may be applied to the retentate side of the osmotic module such that the hydraulic pressure of the stream on the retentate side of the osmotic module is higher than the hydraulic pressure of the stream on the permeate side of the osmotic module. The applied pressure can increase the rate at which solvent (e.g., water) is transported from the retentate side of the osmotic module to the permeate side of the osmotic module. Such arrangements (which are a type of forward osmosis) are sometimes referred to as "pressure-assisted forward osmosis." Of course, the use of an applied pressure to enhance forward osmosis is not generally required, and in some embodiments, forward osmosis is performed in the substantial absence of an applied pressure (e.g., such that the hydraulic pressure difference through the osmotic membrane is less than or equal to 0.1 bar).

In some embodiments, the feed osmotic module is operated as (or is configured to be operated as) a forward osmosis module. For example, in some embodiments, the osmotic pressure of the stream on the retentate side of the feed osmotic module can be lower than the osmotic pressure of the stream on the permeate side of the feed osmotic module such that solvent is transported from the retentate side of the feed osmotic module to the permeate side of the feed osmotic module, at least in part, due to the transmembrane osmotic pressure difference. For example, referring to FIGS. 1A-1B, feed osmotic module 102 can be used to perform forward osmosis, for example, when the osmotic pressure on permeate side 104 is higher than the osmotic pressure on retentate side 103, and the hydraulic pressure difference from permeate side 104 to retentate side 103 ($P_{104}-P_{103}$) is not large enough to overcome the difference in the osmotic pressures on retentate side 103 and permeate side 104. In such cases, solvent (e.g., water) can be transported from retentate side 103 of feed osmotic module 102 to permeate side 104 of feed osmotic module 102. This can result, according to certain embodiments, in the production of retentate outlet stream 155, which can have a higher osmotic pressure than the osmotic pressure of feed 156. In certain embodiments in which feed 156 contains solubilized species (e.g., ions), the forward osmosis process can result in the production of retentate outlet stream 155, which can contain solubilized species (e.g., ions) at a molar concentration greater than the molar concentration of solubilized species (e.g., ions) in feed 156. In addition, the forward osmosis process can result, according to some embodiments, in the production of feed osmotic module permeate outlet stream 162, which can have a lower osmotic pressure than the osmotic pressure of feed osmotic module permeate inlet stream 160. For example, when solubilized species are used in feed osmotic module permeate inlet stream 160, feed osmotic module permeate outlet stream 162 can contain the solubilized species (e.g., ions) at a lower molar concentration than the molar concentration of solubilized species (e.g., ions) within feed osmotic module permeate inlet stream 160.

In certain embodiments, the isolation osmotic module is operated as (or is configured to be operated as) a forward osmosis module. In some embodiments, the purification osmotic module is operated as (or is configured to be operated as) a forward osmosis module.

Combinations of reverse osmosis operation and forward osmosis operation are also possible. For example, in some embodiments, the osmotic system comprises at least one osmotic module that is operated (or is configured to be operated) as a reverse osmosis module and at least one osmotic module that is operated (or is configured to be operated) as a forward osmosis module.

The osmotic modules described herein (e.g., the feed osmotic module, the isolation osmotic module, and/or the purification osmotic module) can each include a single osmotic membrane or a plurality of osmotic membranes.

Figure 2A:
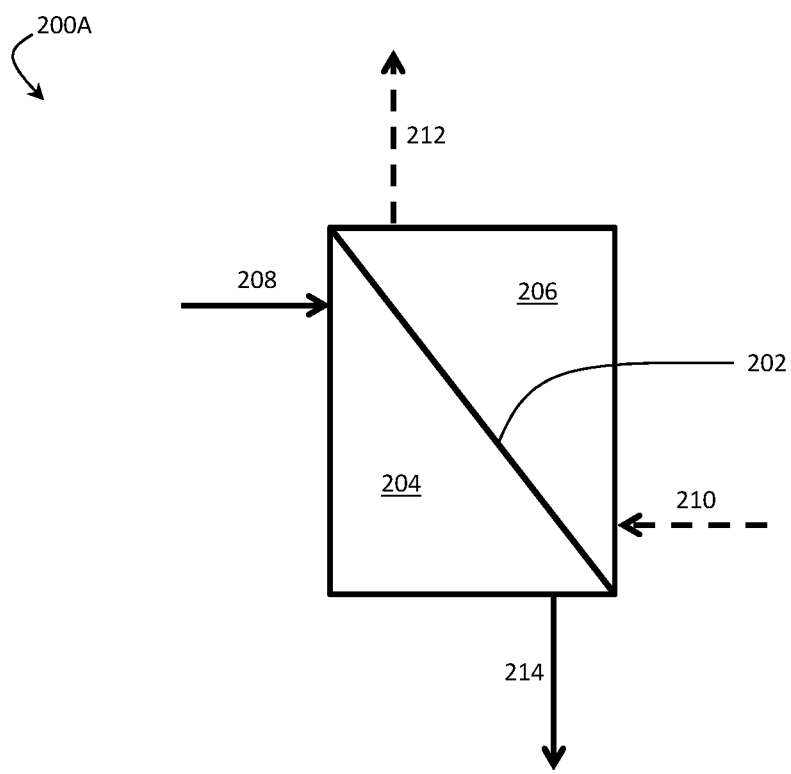
FIG. 2A is, in accordance with some embodiments, a schematic illustration of a single-membrane osmotic module.

FIG. 2A is a schematic illustration of osmotic module 200A, in which a single osmotic membrane is used to separate permeate side 204 from retentate side 206. Osmotic module 200A can be operated by transporting retentate inlet stream 210 across retentate side 206. At least a portion of a liquid (e.g., a solvent) within retentate inlet stream 210 can be transported across osmotic membrane 202 to permeate side 204. This can result in the formation of retentate outlet stream 212, which can include a higher concentration of solute than is contained within retentate inlet stream 210, as well as permeate outlet stream 214. Optionally (e.g., when osmotic module 200A is used as a counter-flow osmotic module), permeate inlet stream 208 is also present. When permeate inlet stream 208 is present, it can be combined with the liquid (e.g., solvent) that has been transported to permeate side 204 from retentate side 206 to form permeate outlet stream 214. When permeate inlet stream 208 is not present (e.g., when osmotic module 200A is used as a cross-flow osmotic module) permeate outlet stream 214 can correspond to the liquid (e.g., solvent) of retentate inlet stream 210 that was transported from retentate side 206 to permeate side 204.

Figure 2B:
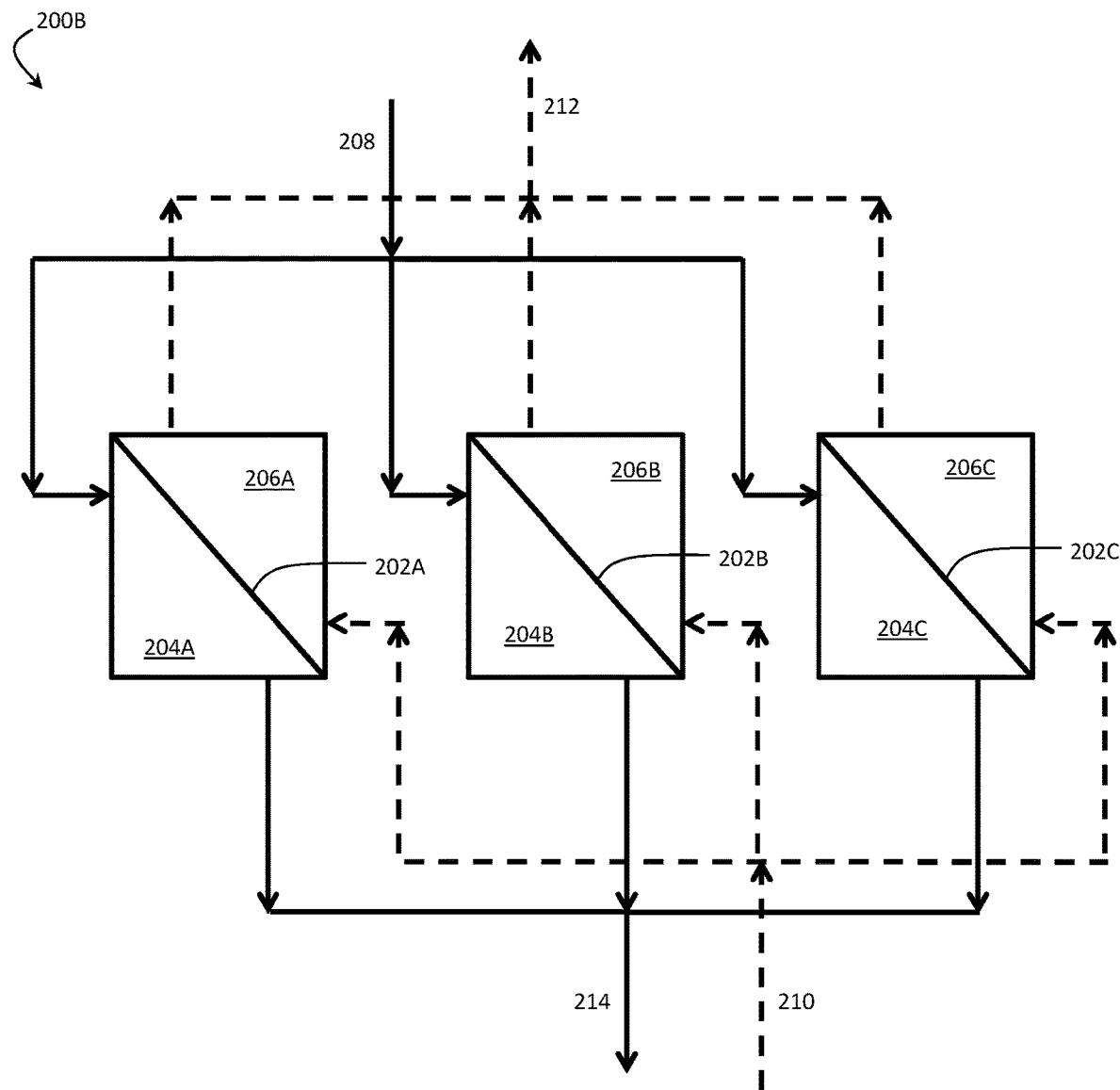
FIG. 2B is, in accordance with certain embodiments, a schematic illustration of an osmotic module comprising multiple osmotic membranes fluidically connected in parallel.

In some embodiments, an osmotic module (e.g., the feed osmotic module, the isolation osmotic module, and/or the purification osmotic module) comprises a plurality of osmotic membranes connected in parallel. One example of such an arrangement is shown in FIG. 2B. In FIG. 2B, osmotic module 200B comprises three osmotic membranes 202A, 202B, and 202C arranged in parallel. Retentate inlet stream 210 is split into three sub-streams, with one sub-stream fed to retentate side 206A of osmotic membrane 202A, another sub-stream fed to retentate side 206B of osmotic membrane 202B, and yet another sub-stream fed to retentate side 206C of osmotic membrane 202C. Osmotic module 200B can be operated by transporting the retentate inlet sub-streams across the retentate sides of the osmotic membranes. At least a portion of a liquid (e.g., a solvent) within retentate inlet stream 210 can be transported across each of osmotic membranes 202A, 202B, and 202C to permeate sides 204A, 204B, and 204C, respectively. This can result in the formation of three retentate outlet sub-streams, which can be combined to form retentate outlet stream 212. Retentate outlet stream 212 can include a higher concentration of solute than is contained within retentate inlet stream 210. Permeate outlet stream 214 can also be formed (from three permeate outlet sub-streams). Optionally (e.g., when osmotic module 200B is used as a counter-flow osmotic module), permeate inlet stream 208 is also present. When permeate inlet stream 208 is present, it can be divided into three sub-streams and transported to the permeate sides (204A, 204B, and 204C) of the three osmotic membranes (202A, 202B, and 202C) and combined with the liquid (e.g., solvent) that has been transported from the retentate sides (206A-206C) to the permeate sides (204A-204C) of the osmotic membranes (202A-202C) to form permeate outlet stream 214. When permeate inlet stream 208 is not present (e.g., when osmotic module 200A is used as a cross-flow osmotic module) permeate outlet stream 214 can correspond to the liquid (e.g., solvent) of retentate inlet stream 210 that was transported from retentate sides 206A-206C to permeate sides 204A-204C.

While FIG. 2B shows three osmotic membranes connected in parallel, other embodiments could include 2, 4, 5, or more osmotic membranes connected in parallel.

Figure 2C:
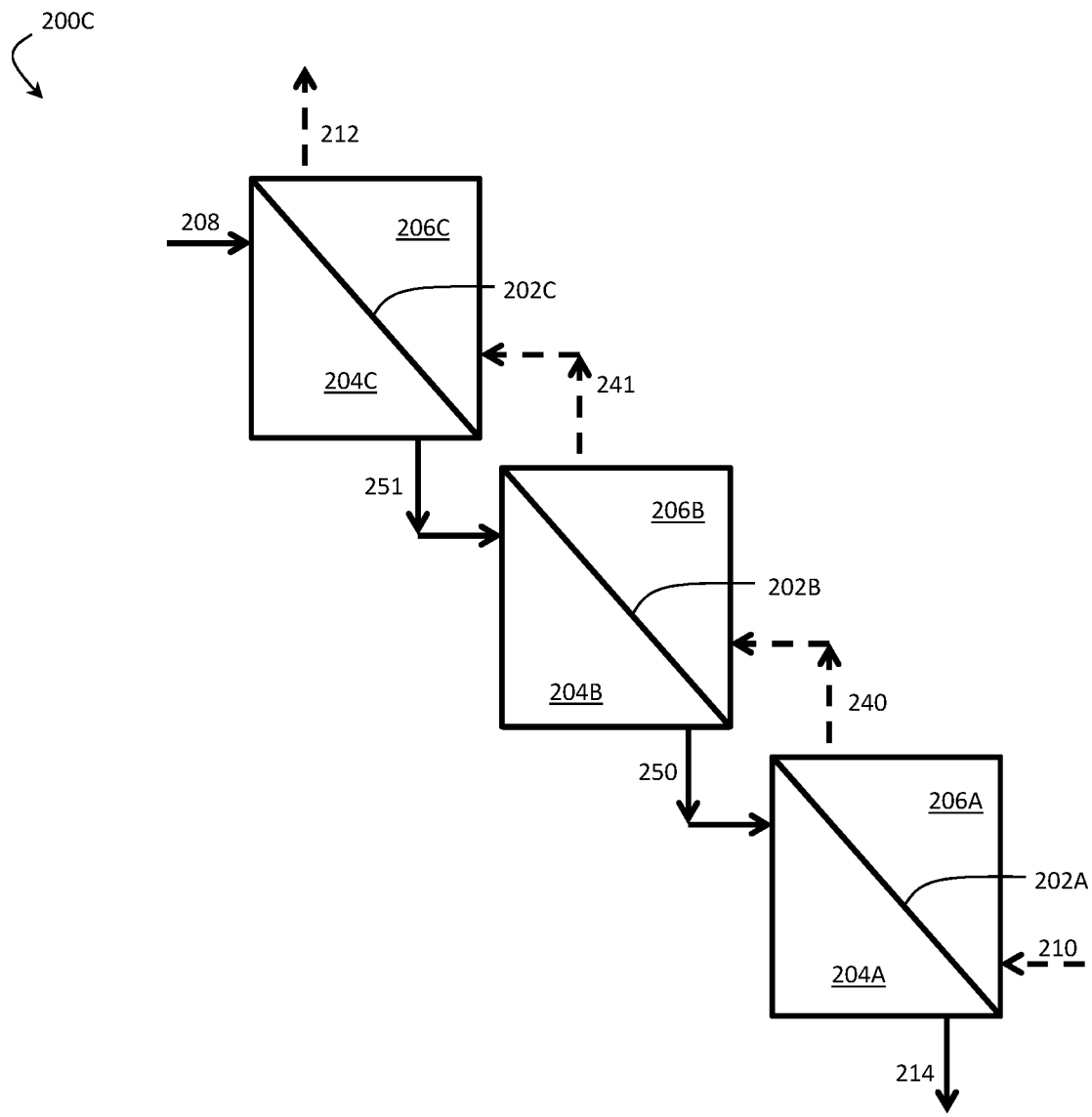
FIG. 2C is, in accordance with some embodiments, a schematic illustration of an osmotic module comprising multiple osmotic membranes fluidically connected in series.

In some embodiments, an osmotic module (e.g., the feed osmotic module, the isolation osmotic module, and/or the purification osmotic module) comprises a plurality of osmotic membranes connected in series. One example of such an arrangement is shown in FIG. 2C. In FIG. 2C, osmotic module 200C comprises three osmotic membranes 202A, 202B, and 202C arranged in series. In FIG. 2C, retentate inlet stream 210 is first transported to retentate side 206A of osmotic membrane 202A. At least a portion of a liquid (e.g., a solvent) within retentate inlet stream 210 can be transported across osmotic membrane 202A to permeate side 204A of osmotic membrane 202A. This can result in the formation of permeate outlet stream 214 and first intermediate retentate stream 240 that is transported to retentate side 206B of osmotic membrane 202B. At least a portion of a liquid (e.g., a solvent) within first intermediate retentate stream 240 can be transported across osmotic membrane 202B to permeate side 204B of osmotic membrane 202B. This can result in the formation of intermediate permeate outlet stream 250 and second intermediate retentate stream 241 that is transported to retentate side 206C of osmotic membrane 202C. At least a portion of a liquid (e.g., a solvent) within second intermediate retentate stream 241 can be transported across osmotic membrane 202C to permeate side 204C of osmotic membrane 202C. This can result in the formation of intermediate permeate outlet stream 251 and retentate outlet stream 212. When permeate inlet stream 208 is present, it can be transported to permeate side 204C of osmotic membrane 202C and combined with the liquid (e.g., solvent) that has been transported from retentate side 206C of osmotic membrane 202C to form intermediate permeate outlet stream 251. In some embodiments, as shown in FIG. 2C, intermediate permeate outlet stream 251 can be fed to permeate side 204B of osmotic membrane 202B and used as a sweep stream (i.e., combined with liquid that is transported through osmotic membrane 202B to form intermediate permeate outlet stream 250). In other embodiments, intermediate permeate outlet stream 251 is used directly as part (or all) of permeate outlet stream 214 (with another stream serving as the sweep stream across permeate side 204B of osmotic membrane 202B, or with osmotic membrane 202B being operated in cross-flow mode). In some embodiments, as shown in FIG. 2C, intermediate permeate outlet stream 250 can be fed to permeate side 204A of osmotic membrane 202A and used as a sweep stream (i.e., combined with liquid that is transported through osmotic membrane 202A to form permeate outlet stream 214). In other embodiments, intermediate permeate outlet stream 250 is used directly as part (or all) of permeate outlet stream 214 (with another stream serving as the sweep stream across permeate side 204A of osmotic membrane 202A, or with osmotic membrane 202A being operated in cross-flow mode).

While FIG. 2C shows three osmotic membranes connected in series, other embodiments could include 2, 4, 5, or more osmotic membranes connected in series.

In addition, in some embodiments, a given osmotic module could include multiple osmotic membranes connected in parallel as well as multiple osmotic membranes connected in series.

In some embodiments, the feed osmotic module comprises a plurality of osmotic membranes. In some such embodiments, the plurality of osmotic membranes within the feed osmotic module are connected in series. In some such embodiments, the plurality of osmotic membranes within the feed osmotic module are connected in parallel. In certain embodiments, the feed osmotic module comprises a plurality of membranes a first portion of which are connected in series and another portion of which are connected in parallel.

In some embodiments, the isolation osmotic module comprises a plurality of osmotic membranes. In some such embodiments, the plurality of osmotic membranes within the isolation osmotic module are connected in series. In some such embodiments, the plurality of osmotic membranes within the isolation osmotic module are connected in parallel. In certain embodiments, the isolation osmotic module comprises a plurality of membranes a first portion of which are connected in series and another portion of which are connected in parallel.

In some embodiments, the purification osmotic module comprises a plurality of osmotic membranes. In some such embodiments, the plurality of osmotic membranes within the purification osmotic module are connected in series. In some such embodiments, the plurality of osmotic membranes within the purification osmotic module are connected in parallel. In certain embodiments, the purification osmotic module comprises a plurality of membranes a first portion of which are connected in series and another portion of which are connected in parallel.

In certain embodiments, a relatively high percentage of the osmotic membrane surface area of the osmotic system is part of the isolation osmotic module. For example, in some embodiments, at least 20%, at least 30%, at least 40%, at least 50%, or at least 60% (and/or, in some embodiments, up to 70%, or more) of the membrane surface area of the osmotic system is part of the isolation osmotic module.

The systems and methods described herein can be used to process a variety of feed solutions. Generally, the feed solution comprises at least one solvent and at least one solubilized species (also referred to herein as a solute). According to certain embodiments, the feed solution comprises solubilized ions. For example, referring to FIGS. 1A-1B, feed solution 156 (and/or feed solution 157) can comprise at least one solubilized ion species. The solubilized ion(s) may originate, for example, from a salt that has been dissolved in the solvent(s) of the feed solution. A solubilized ion is generally an ion that has been solubilized to such an extent that the ion is no longer ionically bonded to a counter-ion. The feed solution can comprise any of a number of solubilized species including, but not limited to, $Na^+$, $Mg^{2+}$, $Ca^{2+}$, $Sr^{2+}$, $Ba^{2+}$, $Cl^-$, carbonate anions, bicarbonate anions, sulfate anions, bisulfate anions, and/or silica. In some embodiments, the aqueous feed stream comprises at least one solubilized monovalent cation (i.e., a cation with a redox state of +1 when solubilized). For example, in some embodiments, the aqueous feed stream comprises $Na^+$ and/or $K^+$. In certain embodiments, the aqueous feed stream comprises at least one monovalent anion (i.e., an anion having redox state of −1 when solubilized). For example, in some embodiments, the aqueous feed stream comprises $Cl^-$ and/or $Br^-$. In some embodiments, the aqueous feed stream comprises at least one monovalent cation and at least one monovalent anion. In some embodiments, the aqueous feed stream comprises one or more divalent cations (i.e., a cation with a redox state of +2 when solubilized) and/or one or more divalent anions (i.e., an anion with a redox state of −2 when solubilized). Cations and/or anions having other valencies may also be present in the aqueous feed stream, in some embodiments.

In some embodiments, the total concentration of solubilized ions in the feed solution can be relatively high. One advantage associated with certain embodiments is that initial aqueous feed streams with relatively high solubilized ion concentrations can be desalinated without the use of energy intensive desalination methods. In certain embodiments, the total concentration of solubilized ions in the feed solution transported into the osmotic system is at least 60,000 ppm, at least 80,000 ppm, or at least 100,000 ppm (and/or, in some embodiments, up to 500,000 ppm, or more). Feed solutions with solubilized ion concentrations outside these ranges could also be used.

According to certain embodiments, the feed solution that is transported to the osmotic system comprises a suspended and/or emulsified immiscible phase. Generally, a suspended and/or emulsified immiscible phase is a material that is not soluble in water to a level of more than 10% by weight at the temperature and other conditions at which the stream is operated. In some embodiments, the suspended and/or emulsified immiscible phase comprises oil and/or grease. The term "oil" generally refers to a fluid that is more hydrophobic than water and is not miscible or soluble in water, as is known in the art. Thus, the oil may be a hydrocarbon in some embodiments, but in other embodiments, the oil may comprise other hydrophobic fluids. In some embodiments, at least 0.1 wt %, at least 1 wt %, at least 2 wt %, at least 5 wt %, or at least 10 wt % (and/or, in some embodiments, up to 20 wt %, up to 30 wt %, up to 40 wt %, up to 50 wt %, or more) of the aqueous feed stream is made up of a suspended and/or emulsified immiscible phase.

In certain embodiments, the feed osmotic module is configured such that little or none of the suspended and/or emulsified immiscible phase is transported through the osmotic membrane(s) of the feed osmotic module. For example, in some embodiments, less than or equal to 10 wt %, less than or equal to 5 wt %, less than or equal to 2 wt %, less than or equal to 1 wt %, or substantially none of the suspended and/or emulsified immiscible phase is transported through the osmotic membrane(s) of the feed osmotic module as the feed solution stream is transported across the retentate side of the feed osmotic module.

While the feed osmotic module can be used to separate a suspended and/or emulsified immiscible phase from an incoming feed solution, such separation is optional. For example, in some embodiments, the feed solution transported to the osmotic system is substantially free of a suspended and/or emulsified immiscible phase. In certain embodiments, one or more separation units upstream of the osmotic system can be used to at least partially remove a suspended and/or emulsified immiscible phase from an aqueous feed stream before the aqueous feed stream is transported to the feed osmotic module. Non-limiting examples of such systems are described, for example, in International Patent Publication No. WO 2015/021062, published on Feb. 12, 2015, which is incorporated herein by reference in its entirety for all purposes.

In some embodiments, the feed solution stream can be derived from seawater, ground water, brackish water, and/or the effluent of a chemical process. In the oil and gas industry, for example, one type of aqueous feed stream that may be encountered is produced water (e.g., water that emerges from oil or gas wells along with the oil or gas). Due to the length of time produced water has spent in the ground, and due to high subterranean pressures and temperatures that may increase the solubility of certain salts and minerals, produced water often comprises relatively high concentrations of dissolved salts and minerals. For example, some produced water streams may comprise a supersaturated solution of dissolved strontium sulfate ($SrSO_4$). In contrast, another type of aqueous feed stream that may be encountered in the oil and gas industry is flowback water (e.g., water that is injected as a fracking fluid during hydraulic fracturing operations and subsequently recovered). Flowback water often comprises a variety of constituents used in fracking, including surfactants, proppants, and viscosity reducing agents, but often has a lower salinity than produced water. In some cases, the systems and methods described herein can be used to at least partially desalinate aqueous feed streams derived from such process streams.

A variety of types of solvents could also be used. In some embodiments, the feed solution comprises water as a solvent. Other examples of solvents include, but are not limited to alcohols and/or hydrocarbons.

The embodiments described herein are not limited to processing aqueous feed streams containing solubilized ions, and in other embodiments, other feed streams could be used. Non-limiting examples of such feed solutions include milk, beer, fruit juice, maple syrup, and/or oil feed stocks.

The draw solutions described herein (e.g., the isolation osmotic module permeate inlet stream and/or the feed osmotic module permeate inlet stream) can include any of a variety of solutes and solvents. The solute(s) in the draw streams can be the same as or different from the solute(s) in the feed solution. The solvent(s) in the draw streams are generally the same as the solvent(s) in the feed solution, although variations in solvent compositions can be present at various points in the osmotic system.

The draw solutions described herein can generally include any component(s) suitable for imparting an appropriate osmotic pressure to perform the functions described herein. In some embodiments, the draw stream(s) are aqueous solution(s) comprising one or more solubilized species, such as one or more dissolved ions and/or one or more dissociated molecules in water. For example, in some embodiments, the draw solution(s) (e.g., the isolation osmotic module permeate inlet stream and/or the feed osmotic module permeate inlet stream) comprise $Na^+$, $Mg^{2+}$, $Ca^{2+}$, $Sr^{2+}$, $Ba^{2+}$, and/or $Cl^-$. In some embodiments, the draw solution(s) (e.g., the isolation osmotic module permeate inlet stream and/or the feed osmotic module permeate inlet stream) comprises at least one solubilized monovalent cation, such as $Na^+$ and/or $K^+$. In certain embodiments, the draw solution(s) (e.g., the isolation osmotic module permeate inlet stream and/or the feed osmotic module permeate inlet stream) comprises at least one monovalent anion, such as $Cl^-$ and/or $Br^-$. Cations and/or anions having other valencies may also be present in the draw solution(s) (e.g., the isolation osmotic module permeate inlet stream and/or the feed osmotic module permeate inlet stream). Other species could also be used in the draw solutions. For example, in some embodiments, the draw solution(s) (e.g., the isolation osmotic module permeate inlet stream and/or the feed osmotic module permeate inlet stream) can be an aqueous stream comprising a solubilized non-ionic species, such as ammonia ($NH_3$).

Those of ordinary skill in the art, given the insight provided by the present disclosure, would be capable of selecting appropriate components for use in the various draw streams described herein.

The draw streams may be prepared, according to certain embodiments, by suspending and/or dissolving one or more species in a solvent (such as an aqueous solvent) to solubilize the species in the solvent. For example, in some embodiments, one or more draw inlet streams can be made by dissolving one or more solid salts in an aqueous solvent. Non-limiting examples of salts that may be dissolved in water include NaCl, LiCl, $CaCl_2$), $MgCl_2$, NaOH, other inorganic salts, and the like. In some embodiments, the draw stream can be prepared by mixing ammonia with water. In certain embodiments, the draw stream can be prepared by dissolving one or more ammonia salts (e.g., ammonium bicarbonate, ammonium carbonate, and/or ammonium carbamate) in water. In some embodiments, the draw stream can be prepared by dissolving ammonia and carbon dioxide gasses in water.

In some embodiments, the systems described herein can be used to achieve a relatively high level of purification. In some embodiments, the solute concentration in the feed osmotic module retentate outlet stream is at least at least 1%, at least 2%, at least 5%, at least 10%, at least 25%, at least 50%, at least 100%, at least 200% higher, on a mass basis, than the concentration of the solute in the feed solution. As would be understood by one of ordinary skill in the art, an increase in concentration is measured relative to the lower concentration. For example, if the solute concentration in the feed osmotic module retentate inlet stream is 35 grams/L, and the solute concentration in the feed osmotic module retentate outlet stream is 38.5 grams/L, then the solute concentration in the feed osmotic module retentate outlet stream is 10% higher, on a mass basis, than the solute concentration in the feed osmotic module retentate inlet stream (because the difference, 3.5 grams/L, is 10% of the lower value (i.e., 10% of 35 grams/L)).

According to certain embodiments, the streams on either side of an osmotic membrane(s) within the osmotic modules can be operated in counter-current configuration. Operation of the osmotic system in this manner can, according to certain but not necessarily all embodiments, allow one to more easily ensure that the transmembrane net driving force is spatially uniform across the facial area of the osmotic membrane, for example, as described in International Patent Publication No. WO 2017/019944, filed Jul. 29, 2016 as International Patent Application No. PCT/US2016/044663, and entitled "Osmotic Desalination Methods and Associated Systems," which is incorporated herein by reference in its entirety. It should be understood that two streams do not have to be transported in perfectly parallel and opposite directions to be considered to be in counter-current configuration, and in some embodiments, the primary flow directions of two streams that are in a counter-current flow configuration can form an angle of up to 100 (or, in some cases, up to 5°, up to 2°, or up to 1°).

In some embodiments, the feed osmotic module is operated in a counter-current configuration. In certain embodiments, the isolation osmotic module is operated in a counter-current configuration. In some embodiments in which the purification osmotic module includes a draw stream laterally traversing the permeate side of the purification osmotic module, the purification osmotic module is operated in a counter-current configuration.

Those of ordinary skill in the art are familiar with osmotic membranes. The membrane medium can comprise, for example, a metal, a ceramic, a polymer (e.g., polyamides, polyethylenes, polyesters, poly(tetrafluoroethylene), polysulfones, polycarbonates, polypropylenes, poly(acrylates)), and/or composites or other combinations of these. Osmotic membranes generally allow for the selective transport of solvent (e.g., water) through the membrane, where solvent is capable of being transmitted through the membrane while solute (e.g., solubilized species such as solubilized ions) are inhibited from being transported through the membrane. Examples of commercially available osmotic membranes that can be used in association with certain of the embodiments described herein include, but are not limited to, those commercially available from Dow Water and Process Solutions (e.g., FilmTec™ membranes), Hydranautics, GE Osmonics, and Toray Membrane, among others known to those of ordinary skill in the art.

It should be understood that, in the present disclosure, the word "purified" (and, similarly, "pure" and "purify") is used to describe any liquid that contains the component of interest in a higher percentage than is contained within a reference stream, and does not necessarily require that the liquid is 100% pure. That is to say, a "purified" stream can be partially or completely purified. As a non-limiting example, a water stream may be made up of 80 wt % water but could still be considered "purified" relative to a feed stream that is made up of 50 wt % water. Of course, it should also be understood that, in some embodiments, the "purified" stream could be made up of only (or substantially only) the component of interest. For example, a "purified" water stream could be made up of substantially only water (e.g., water in an amount of at least 98 wt %, at least 99 wt %, or at least 99.9 wt %) and/or could be made up of only water (i.e., 100 wt % water).

Various components are described herein as being fluidically connected. Fluidic connections may be either direct fluidic connections or indirect fluidic connections. Generally, a direct fluidic connection exists between a first region and a second region (and the two regions are said to be directly fluidically connected to each other) when they are fluidically connected to each other and when the composition of the fluid at the second region of the fluidic connection has not substantially changed relative to the composition of the fluid at the first region of the fluidic connection (i.e., no fluid component that was present in the first region of the fluidic connection is present in a weight percentage in the second region of the fluidic connection that is more than 5% different from the weight percentage of that component in the first region of the fluidic connection). As an illustrative example, a stream that connects first and second unit operations, and in which the pressure and temperature of the fluid is adjusted but the composition of the fluid is not altered, would be said to directly fluidically connect the first and second unit operations. If, on the other hand, a separation step is performed and/or a chemical reaction is performed that substantially alters the composition of the stream contents during passage from the first component to the second component, the stream would not be said to directly fluidically connect the first and second unit operations. In some embodiments, a direct fluidic connection between a first region and a second region can be configured such that the fluid does not undergo a phase change from the first region to the second region. In some embodiments, the direct fluidic connection can be configured such that at least 50 wt % (or at least 75 wt %, at least 90 wt %, at least 95 wt %, or at least 98 wt %) of the fluid in the first region is transported to the second region via the direct fluidic connection. Any of the fluidic connections described herein may be, in some embodiments, direct fluidic connections. In other cases, the fluidic connections may be indirect fluidic connections.

In some embodiments, the second side (e.g., the permeate side) of the isolation osmotic module is directly fluidically connected to the first side (e.g., the retentate side) of the isolation osmotic module (e.g., via the isolation osmotic module retentate outlet stream (164 in FIG. 1A) and the isolation osmotic module permeate inlet stream (163 in FIG. 1A)).

In certain embodiments, the second side (e.g., the permeate side) of the feed osmotic module is directly fluidically connected to the first side (e.g., the retentate side) of the isolation osmotic module (e.g., via the isolation osmotic module retentate outlet stream (164 in FIG. 1A) and the feed osmotic module permeate inlet stream (160 in FIG. 1A).

In some embodiments, the second side (e.g., permeate side) of the feed osmotic module is directly fluidically connected to the first side (e.g., retentate side) of the purification osmotic module (e.g., via the feed osmotic module permeate outlet stream (162 in FIG. 1A) and the purification osmotic module retentate inlet stream (167 in FIG. 1A).

In certain embodiments, the second side (e.g., permeate side) of the isolation osmotic module is directly fluidically connected to the first side (e.g., retentate side) of the purification osmotic module (e.g., via the purification osmotic module retentate inlet stream (167 in FIG. 1A) and the isolation osmotic module permeate outlet stream (165 in FIG. 1A).

In some embodiments, the first side (e.g., retentate side) of the purification osmotic module is directly fluidically connected to the first side (e.g., retentate side) of the isolation osmotic module (e.g., via the purification osmotic module retentate outlet stream (166 in FIG. 1A) and the isolation osmotic module retentate inlet stream (161 in FIG. 1A).

In certain embodiments, the recycle streams described herein (e.g., stream 169 in FIG. 1A, stream 169 in FIG. 1C, and/or stream 190 in FIG. 1C) are direct fluidic connections.

U.S. Provisional Application No. 62/721,015, filed Aug. 22, 2018, and entitled "Liquid Solution Concentration System Comprising Isolated Subsystem and Related Methods," is incorporated herein by reference in its entirety for all purposes.

The following example is intended to illustrate certain embodiments of the present invention, but do not exemplify the full scope of the invention.

EXAMPLE

This example describes the operation of an osmotic system comprising a feed module, an isolation module, and an optional purification module to produce a purified product stream.

The system described in this example can include isolation of a significant percentage (e.g., 20%-70%) of the total osmotic membrane surface area within the isolation osmotic module from the feed stream. The feed stream can have a high potential to form inorganic scale upon concentration of the feed steam. The isolation of osmotic membrane surface area within the isolation osmotic module can completely or almost completely eliminate inorganic scaling in the isolation osmotic module.

This example also describes the transient operation of osmotic membranes within a feed osmotic module (which is not isolated from the feed stream). The transient operation of the feed osmotic module can reduce (and, in some cases, minimize) the inorganic scaling in the feed osmotic module, relative to situations in which transient operation is not employed.

Figure 3:
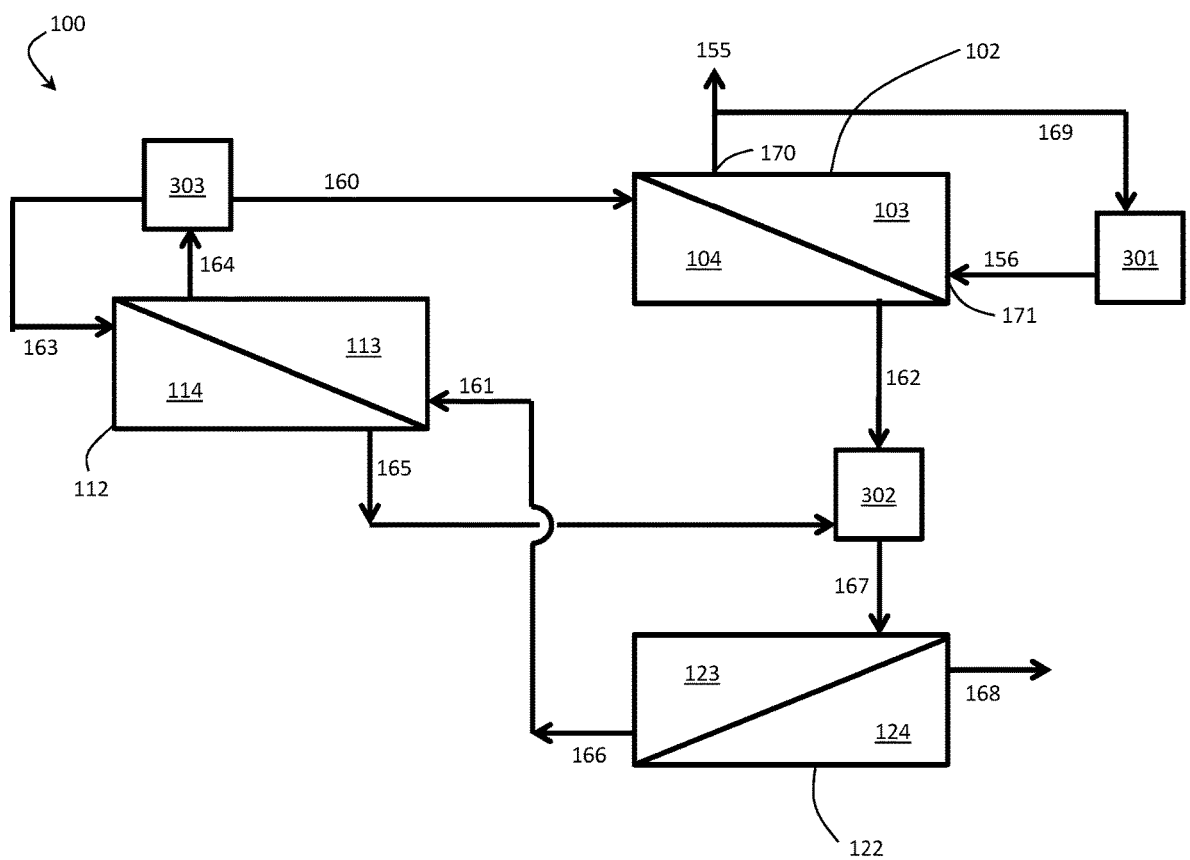
FIG. 3 is a schematic illustration of an exemplary osmotic system, in accordance with certain embodiments.

The osmotic system described in this example is schematically illustrated in FIG. 3, and is a non-limiting example of the type of system shown in FIGS. 1A-1B. For ease of understanding, reference numerals that are consistent with the reference numerals used in FIGS. 1A-1B are used below when referring to this non-limiting example. It should be understood, however, that this example is non-limiting, and that the invention is not necessarily limited to specific features, operational parameters, etc. described in this example.

In this example, the osmotic system is used for desalinating water from a saline feed stream (156) to produce a purified water effluent stream (168) and a high salinity concentrate stream (155). The feed stream comprises water and one or more dissolved salts and/or other contaminants. Other contaminants may include dissolved or suspended solids, organics, or solvents (e.g., ethanol).

The osmotic desalination system shown in FIG. 3 comprises three subsystems: a feed osmotic module (102); an isolation osmotic module (112); and a purification osmotic module (122). Each subsystem comprises one or more membrane modules that may be connected in series and/or parallel. In this example, each membrane module in the feed osmotic module comprises a first side and a second side with an inlet and an outlet each separated by a semipermeable membrane. In the feed osmotic module and the isolation osmotic module, each side of the membrane module is fluidically connected to each of an inlet and an outlet. A module of this configuration can be called a counter-flow reverse osmosis (CFRO) module. In the purification osmotic module, in this example, the first side of each membrane module is fluidically connected to both an inlet and an outlet, but the second side is fluidically connected to an outlet only. A module of this configuration can be called a cross flow RO module.

When two CFRO modules are connected in series, the first-side outlet of a first module can be directly fluidically connected to the first side-inlet of a second module and the second-side outlet of the second module can be directly fluidically connected to the second-side inlet of the first module. In this configuration a first fluid stream may flow across the first side of the first module, then continue to first side of the second module. Simultaneously, a second fluid stream may flow from the second side of the second module and continue to the second side of the first module.

When two CFRO modules are connected in parallel, the first-side inlet of the first module can be fluidically connected to the first-side inlet of the second module, the first-side outlet of the first module can be fluidically connected to the first-side outlet of the second module, the second-side inlet of the first module can be fluidically connected to the second-side inlet of the second module, and the second-side outlet of the first module can be fluidically connected to the second-side outlet of second membrane module. In this configuration, a first fluid stream may be split to flow to both the first side of the first module and the first side of the second module. Simultaneously, a second stream may be split to enter both the second side of the first module and the second side of the second module.

In this example, in each osmotic module, the first sides of each osmotic membrane are fluidically interconnected, such that a first fluid stream may interact with the first side of each osmotic membrane before exiting the osmotic module, and the second sides of each osmotic membrane are also fluidically interconnected such that a second fluid stream may interact with the second side of each osmotic membrane before exiting the osmotic module.

In this example, a pressurized feed stream enters the feed osmotic module (102), flowing across a first side (103) of the feed osmotic module, which comprises the interconnected first sides of the osmotic membrane(s) therein. Water from the feed stream may permeate the membrane(s), diffusing through the membrane(s) from the first side to the second side (104), while the dissolved salts can be largely inhibited from diffusion through the membrane(s). The diffusion of water from the feed stream (156) across the osmotic membrane(s) of the feed osmotic module (102) can result in a final concentrate (155) that is discharged from the subsystem.

The feed stream may have a relatively high pressure. Exemplary operational parameters are described below.

A low-pressure first sweep stream (160) can flow across a second side of the feed osmotic module, the second side of the feed osmotic module comprising the interconnected second side(s) of the membrane(s) therein. The first sweep stream (160) can comprise water and one or more dissolved salts. The dissolved salts of the first sweep stream may be substantially different from, or the same as, those of the feed stream. Notably, the sweep stream (160) may be free from certain contaminants contained in the feed stream (156). For example, the feed stream may comprise sparingly soluble salts (such as calcium sulfate), and the sweep stream may be free of sparingly soluble salts. In this case, the propensity of the sweep stream to deposit scale on membrane surface would be substantially reduced.

If the pressure differential between the feed stream and first sweep stream overcomes the osmotic pressure differential between the two streams, water may diffuse from the feed stream, through the membrane(s) of the feed osmotic module, and mix with the sweep stream, diluting it, and resulting in a first diluted sweep stream (162). Due to the presence of salts in the sweep stream, the osmotic pressure differential between the feed and sweep stream may be substantially reduced, advantageously requiring a lower pressure differential between the two streams than if the sweep stream had no salts.

In FIG. 3, the feed osmotic module (102) is fluidically connected to the purification osmotic module (122) such that a fluid stream may flow from the second side (104) of the feed osmotic module and subsequently enter the purification osmotic module (122) to flow across a first side (123) of the purification osmotic module (122). The first side of the purification osmotic module can comprise interconnected first side(s) of osmotic membrane(s) therein. For example, the first diluted sweep stream (162) may exit from the second side (104) of the feed osmotic module (102), then flow to the purification osmotic module (122) to flow across the first side (123) of the purification osmotic module (122).

The first diluted sweep stream (162) may be pressurized before entering the purification osmotic module (122). Water from the diluted sweep stream (162) may permeate the osmotic membrane(s) of the purification osmotic module, diffusing through the membrane(s) from the first side(s) (123) to the second side(s) (124), while the dissolved salts are largely inhibited from diffusion. The diffusion of water from the first diluted sweep stream can result in a partially concentrated sweep stream (166) that contains a higher concentration of dissolved salts relative to the first diluted sweep stream. The diffused water can be collected from the second side (124) of the purification osmotic module (122), the second side of the purification osmotic module comprising the interconnected second side(s) of the osmotic membrane(s) therein, and then discharged as a purified water effluent product stream (168).

In FIG. 3, the purification osmotic module is fluidically connected to the isolation osmotic module (112) such that a fluid stream may flow across the first side (123) of the purification osmotic module (122), then subsequently enter the isolation osmotic module (112) to flow across a first side (113) of the isolation osmotic module (112), the first side of the isolation osmotic module comprising interconnected first side(s) of the osmotic membrane(s) therein. For example, the partially concentrated sweep stream (166) may exit the first side (123) of the purification osmotic module (122) and then flow to the isolation osmotic module (112) to flow across the first side (113) of the isolation osmotic module (112).

The partially concentrated sweep stream (166, used as 161) entering the isolation osmotic module (112) may retain a substantial amount of pressure after exiting the purification osmotic module (122). Water from the partially concentrated sweep stream may permeate the membrane(s) of the isolation osmotic module (112), diffusing through the membrane(s) from the first side(s) (113) to the second side(s) (114), while the dissolved salts are largely inhibited from diffusion. The diffusion of water from the partially concentrated sweep stream results in a more concentrated sweep stream (164) that contains a higher concentration of dissolved salts relative to the partially concentrated sweep stream (166, used as 161).

In FIG. 3, a low-pressure second sweep stream (163) flows across the second side (114) of the isolation osmotic module (112), the second side (114) of the isolation osmotic module (112) comprising the interconnected second side(s) of the osmotic membrane(s) therein. The second sweep stream can comprise water and one or more dissolved salts. If the pressure differential between the partially concentrated sweep stream (161) and second sweep stream (163) overcomes the osmotic pressure differential between the two streams, water may diffuse through the membrane(s) of the isolation osmotic module (112) from the partially concentrated sweep stream (161) and mix with the second sweep stream (163), diluting it, and resulting in a second diluted sweep stream (165). Due to the presence of salts in the second sweep stream (163), the osmotic pressure differential between the first and second sweep stream may be substantially reduced, advantageously requiring a lower pressure differential between the two streams than would be required if the second sweep stream contained no salts.

The more concentrated sweep stream (164) may be split such that a first portion of the more concentrated sweep (164) stream is directed to the second side (104) of the feed osmotic module (102) to become the first sweep stream (160), and a second portion may be directed to the second side (114) of the isolation osmotic module (112) to become the second sweep stream (163). Prior to entering the second side (104) of the feed osmotic module (102) and/or the second side (114) of the isolation osmotic module (112), the pressure of the more concentrated sweep stream (164, before or after the split) may be reduced.

The second diluted sweep stream (165) may enter the purification osmotic module (122). The second diluted sweep stream (165) may be pressurized before entering the purification osmotic module (122). A combined diluted sweep stream (167) may be formed by mixing the first diluted sweep stream (162) and the second diluted sweep stream (165). In some embodiments, the mixing occurs upstream of the purification osmotic module (122), such that the combined diluted sweep stream enters the purification osmotic module (122). In some embodiments, the mixing occurs upstream of the pressurization step, such that the combined diluted sweep stream (167) is pressurized before entering the purification osmotic module (122). The purification osmotic module (122) may include multiple osmotic membrane modules connected in series or in parallel.

Exemplary Operation

In one example, the feed osmotic module (102) is made up of seven (7) stages; the isolation osmotic module (112) is made up of five (5) stages; and the purification osmotic module (122) is made up of four (4) RO membrane modules.

Feed solution can be stored in the feed tank (301) prior to entering the feed osmotic module (102). The feed tank (301) can provide a buffer volume to reduce fluctuations in salinity and flow. In transient-salinity operation, the feed tank can serve as a concentration volume. This operation is discussed in more detail below.

Prior to entering the feed osmotic module (102), the feed can be pressurized, for example, to about 1000 psi with a high-pressure pump. The first stage of the feed osmotic module (102), in this exemplary operational mode, is made up of two membrane modules connected in parallel, so the pressurized feed stream is split to flow through the two modules, then recombined. The second stage of the feed osmotic module (102) can be similarly configured, so the stream is again split and recombined. The last five stages of the feed osmotic module (102) can each contain single modules, each connected in series. In each stage, water from the feed diffuses through the membrane(s) resulting in a more concentrated effluent. The feed osmotic module concentrate (155) can exit the seventh stage.

While not present in this embodiment, the feed osmotic module (102) may additionally incorporate booster pumps to increase the feed pressure between modules.

The feed osmotic module concentrate (155) may be pressurized to a substantial degree. This pressure may be relieved with a pressure reducing valve, or an energy recovery device (ERD). Pressure recovered using an ERD may be used for the pressurization of other streams, such as the feed stream or the diluted sweep stream, reducing the energy required to power the pumps within the system. Pressure recovered using an ERD may also be used to generate mechanical work and electrical power.

When the system is configured for steady state operation, the concentrate from the last stage of the feed osmotic module (102) can be discharged as a final product (via stream 155). In embodiments configured for transient salinity operation, at least a portion of the feed osmotic module concentrate (155) may be recirculated (via stream 169) to feed tank (301) and/or to any of the stages of the feed osmotic module (102). The recirculation stream (169) may incorporate a circulation pump to direct and control flow. In embodiments in which the system is configured for transient-salinity operation, the pressurized effluent stream may be recirculated to the membrane feed by mixing it with the discharge of the high-pressure pump. Alternately, the effluent stream pressure may be relieved through a valve or ERD and returned to the suction of the high-pressure pump. Alternately, the feed tank (301) may be pressurized, and the pressurized effluent stream may be returned to the feed tank (301) without relieving the pressure. In these embodiments, the effluent may be periodically discharged. In these embodiments, the high-pressure pump may be positioned upstream of the feed tank (301), for example, in an influent line.

In this example, a low-pressure first sweep stream can be flowed through the feed osmotic module (102) in the opposite direction as the feed stream, entering Stage 7 first, and exiting Stage 1 last. The salinity of the sweep stream can be controlled to reduce the osmotic pressure difference between the feed stream and sweep stream across each membrane.

To compensate for pressure loss in the sweep stream, low-pressure pumps may be positioned between two or more membrane stages. The use of pumps between stages can, in certain cases, be preferred over the use of a single pump at the entrance to the subsystem because multiple pumps result in a lower average pressure. Lower average pressure in the sweep side can, in certain cases, maximize the hydraulic pressure difference between the feed side and the sweep side which results in an increased flux through the subsystem.

The first diluted sweep stream effluent (162) can be discharged from the feed osmotic module (102) into a storage tank (302). Like the feed tank (301), the storage tank (302) can serve to buffer against salinity and flow rate fluctuations and can provide a concentration volume for transient-salinity operation. Additionally, the storage tank can provide a positive suction head to a high-pressure pump, which can be used to draw diluted sweep stream from the storage tank to feed the purification osmotic module (122). In other embodiments, no storage tank is used.

In this exemplary operational mode, four arrays of multiple RO modules can be connected in parallel in the purification osmotic module (122). Each array may contain multiple RO modules connected in series. Pure water effluent can be collected from the permeate sides of each module and routed to a permeate collection tank. An optional low-pressure pump can draw from the tank to deliver the purified water to an end user, to disposal, or to any point in the system.

In other embodiments, the purification osmotic module (122) comprises a first stage and at least a second stage, arranged in series. Each stage may comprise a plurality of membrane modules connected in series and/or in parallel. In some such embodiments, a booster pump is located between the stages to add additional pressure.

The removal of pure water from the diluted sweep stream (162) can result in a partially concentrated sweep stream (166). The salinity of this stream can be, in some cases, too high to desalinate with reverse osmosis and too low to be used as sweep solution in the feed osmotic module (102). Therefore, as shown in FIG. 3, this partially concentrated sweep stream (166) can be directed toward the isolation osmotic module (112) (via stream 161).

In some embodiments of FIG. 3, each serial stage of the isolation osmotic module (112) consists of just one membrane. In other embodiments, some stages may comprise additional membranes, configured in parallel and/or in series (as may be used in the feed osmotic module (102)).

As it flows across the first side of the isolation osmotic module (112), water from the partially concentrated sweep stream (166) may diffuse through the membranes in the isolation osmotic module (112), resulting in a more concentrated sweep stream (164). After exiting the first side (113) of the isolation osmotic module (112), the more concentrated sweep stream (164) may be discharged into a draw split tank (303).

The pressure of the more concentrated sweep stream (164) may be relieved with a pressure control valve, or an energy recovery device (ERD). Pressure recovered using an ERD may be used for the pressurization of other streams, such as the feed stream or the diluted sweep stream, reducing the energy required to power the pumps within the system.

The draw split tank (303) can serve a similar purpose to the other tanks in the system: providing positive suction head to downstream pump(s), buffering against fluctuations in flow and salinity, and/or facilitating transient-salinity operating by serving as a concentration volume in that configuration.

A low-pressure pump can be used to deliver the more concentrated sweep stream (164) to the second side (104) of the feed osmotic module (102) to become the first sweep stream and to the second side (114) of the isolation osmotic module (112) to become the second sweep stream.

A pressure control valve located upstream of the second side (114) of the isolation osmotic module (112) can be used to regulate the pressure of the second sweep stream. In this embodiment, the pressure of the partially concentrated sweep stream (166 via 161) entering the first side of the isolation osmotic module (112) can be relatively uncontrolled, its pressure being a function of the pressure produced by the associated pump and the pressure loss in the purification osmotic module (122). The pressure of pump controlling the retentate pressure of the purification osmotic module (122) is typically controlled to maximize flux through the purification osmotic module (122), and the pressure loss can vary. Thus, the pressure control valve upstream of the second side (114) of the isolation osmotic module (112) can provide an advantageous control point for the differential pressure across the sides of the isolation osmotic module (112).

Other embodiments may feature other means of differential pressure control. For example, a pressure control valve or controllable booster pump may be placed on the partially concentrated sweep stream line between the first side (123) of the purification osmotic module (122) and the first side (113) of the isolation osmotic module (112). In some embodiments, an ERD may be placed in the partially concentrated sweep stream to capture energy of the partially concentrated sweep stream and apply it to other streams. In some embodiments, a booster pump (downstream of the low-pressure pump delivering the stream to the first side of the feed osmotic module) may control the pressure of the second sweep stream. Further variations on pump and control valve placement are possible.

In some embodiments, depressurization of the more concentrated sweep stream (164) may occur downstream of the draw split tank (303). In some such embodiments, the draw split tank (303) is pressurized. In some embodiments, the more concentrated sweep stream (164) may be split into the second sweep stream (163) and the first sweep stream (160) without first entering a tank. In some such embodiments, the second sweep stream (163) and/or the first sweep stream (160) may be flowed to tanks similar to the draw split tank (303) prior to entering the isolation osmotic module (112) and the feed osmotic module (102), respectively. Such tanks may be pressurized or depressurized.

A flow control valve located upstream of the second side (104) of the feed osmotic module (102) can be used to regulate the flow of the first sweep stream (160) into the feed osmotic module (102). In this embodiment, flow of more concentrated sweep stream can be controlled by the low pressure pump, and the portion of the more concentrated sweep stream that becomes the first sweep stream can be controlled by the flow control valve. The portion of more concentrated sweep stream that becomes the second sweep stream can be determined by these control points.

Other embodiments may feature other means of flow control. For example, the low-pressure pump may control flow of the first sweep stream, and a second low-pressure pump may control flow of the second sweep stream. In some such embodiments, these pumps may each draw from the sweep split tank individually. In other embodiments, an ERD may be placed in the partially concentrated sweep stream to capture energy of the partially concentrated sweep stream and apply it to other streams. In other embodiments, a flow control valve may be positioned on the second sweep stream line, such that flow of first sweep stream is determined by the setting of the low pressure pump and the flow of second sweep stream as controlled by the flow control valve. Further variations on pump and control valve placement are possible.

As the second sweep stream (163) flows across the second side (114) of the isolation osmotic module (112), water may diffuse from the partially concentrated sweep stream (161), through the membrane(s) of the isolation osmotic module (112), and into the second sweep stream, diluting it to produce a second diluted sweep stream (165).

Booster pumps may be located between stages of the isolation osmotic module (112). As described above in relation to the feed osmotic module (102), the use of pumps between stages can increase (and, in some cases, maximize) the average hydraulic pressure difference between the high-pressure and low-pressure sides of the module(s), advantageously increasing flux.

The second diluted sweep stream (165) can be directed to the storage tank (302) to mix with the first diluted sweep stream (162).

In a steady state operation, the system can function as described above. As one example, a feed stream with a 6.9% salinity can be concentrated to 20% in the feed osmotic module (102) while diluting an 18% sweep stream to 3.1%. The feed stream may have a relatively high pressure. For example, the feed stream may have a pressure of 60 to 80 bar. The sweep stream may have a relatively low pressure. For example, the sweep stream may have a pressure below 10 bar.

While the salinity of the modeled feed stream is calculated using sodium chloride, the stream may contain a variety of other dissolved solids instead of or in addition to sodium chloride. For example, the feed stream may contain lithium chloride, sodium hydroxide, or other inorganic salts. The feed stream may additionally contain sparingly soluble salts such as calcium carbonate or calcium sulfate.

The salinity of the sweep stream(s) (e.g., 160 and/or 163) may comprise the same dissolved salts as the feed stream (156). This parity may reduce the loss of sweep stream solutes from the isolated sweep stream loop or reduce the buildup of unwanted salts therein. However, in other embodiments, the salts dissolved in the sweep stream(s) may differ from those in the feed stream. For example, in some cases, the sweep stream(s) may be free of sparingly soluble salts which may precipitate and foul the membranes of the RO and isolated brine subsystems, or consist of organic salts (e.g., ammonium bicarbonate).

In some embodiments, pure water is separated from the diluted sweep solution, concentrating it to 5.6% and producing a pure water effluent. The partially concentrated sweep solution can be further concentrated in the isolation osmotic module (112) to 18%, forming the first sweep stream and the second sweep stream. The second sweep stream can be diluted by the concentration of the partially concentrated sweep stream to a salinity of 4.6%. This second diluted draw stream is, in this example, dilute enough to be desalinated in the RO system, so it can be mixed with the first diluted draw solution.

When the system is configured for transient-salinity operation, certain component parts of the system operate differently.

At low influent salinities, the system can initially function similarly to the operation described above for the steady-state configuration. However, instead of discharging final concentrate, at least a portion of the final concentrate can be directed back toward the feed tank (via 169) thus forming a closed loop. In other embodiments, there is no tank. Final concentrate can be directed to the osmotic module thus forming a closed loop.

In some embodiments, feed solution continues to flow into the tank during recirculation of the concentrate. In other embodiments, no influent enters, so the feed tank consists of recirculated concentrate.

Due to the recirculation, the salinity of the feed tank (and, thus, the feed stream) will generally increase in this operational mode. To some extent, the higher differential osmotic pressure may be compensated for with higher feed pressure. The capacity of the feed osmotic module (102) to compensate in this way can be limited by the maximum feed pressure of the osmotic membranes, which may become damaged if the pressure becomes too high.

As the salinity of the feed stream climbs above the capacity of the feed osmotic module (102) to compensate via pump pressure, the salinity of the first sweep stream can be advantageously increased. This can be accomplished, for example, by increasing the pressure of the partially concentrated sweep stream (166) entering the isolation osmotic module (112). The pressure may be increased with an additional high-pressure pump located on the partially concentrated sweep stream line between the first side of the purification osmotic module (122) and the first side of the isolation osmotic module (112).

The higher differential pressure in the isolation osmotic module (112) can result in an increased flux of pure water from the first side of the subsystem to the second. The additional transfer of pure water out of the partially concentrated sweep stream can further increase the salinity of the more concentrated sweep stream effluent from the isolation osmotic module (112), a portion of which is directed to the feed osmotic module (102) to become the first sweep stream.

The increase in salinity of the first sweep stream can allow further concentration of the feed stream, but the additional solutes present in the stream generally result in an increase in the salinity of the first diluted sweep stream. To some extent, this can be compensated by a more dilute second diluted sweep stream. The additional transfer of pure water of out the partially concentrated sweep stream at the increased pressure can also further dilute the second sweep stream resulting in a less saline diluted second sweep stream. This stream can be mixed with the first diluted sweep stream.

As the salinity of the combined diluted sweep stream (167) increases, flux in the purification osmotic module (122) may decrease. To some extent, this can be compensated by increasing the pressure of the high-pressure pump feeding the purification osmotic module (122). However, the pressure can generally only be increased to a limited extent without compromising the integrity of the RO membranes.

For higher recovery operation, additional flow through the isolated solute and/or feed osmotic module (102) may be needed. If a sufficiently high feed salinity has not been achieved once the maximum pressure has been reached in the feed, purification, and isolation osmotic modules, this additional flow can be realized by introducing additional osmotic membranes to the feed and/or isolation osmotic modules. In some such embodiments, the additional osmotic membranes may be permanently installed, but separated from the feed and/or sweep streams with closed valves during lower recovery operation.

An example of this type of operation is shown in Table 1 below.

TABLE 1

Stream Properties During Exemplary Transient Recycle Operation

|  | Time | Start | Intermediate | Final |
|---|---|---|---|---|
| Feed stream inlet (156) | Salinity [—] | 7% | 10% | 18% |
|  | Flow rate [kg/h] | 10 | 7 | 3.89 |
| Feed stream outlet (155) | Salinity [—] | 10% | 13% | 20% |
|  | Flow rate [kg/h] | 7 | 5.38 | 3.5 |
| First sweep stream (160) | Salinity [—] | 8% | 11% | 18% |
|  | Flow rate [kg/h] | 3.5 | 2.7 | 1.4 |
| First diluted sweep stream (162) | Salinity [—] | 4.31% | 6.88% | 14.08% |
|  | Flow rate [kg/h] | 6.5 | 4.32 | 1.79 |
| Combined diluted sweep stream (167) | Salinity [—] | 4.71% | 5.61% | 6.54% |
|  | Flow rate [kg/h] | 9.15 | 8.14 | 5.919 |
| Partially concentrated sweep stream (166) | Salinity [—] | 7% | 7% | 7.0% |
|  | Flow rate [kg/h] | 6.15 | 6.52 | 5.53 |
| More concentrated sweep stream (164) | Salinity [—] | 8% | 11% | 18% |
|  | Flow rate [kg/h] | 5.38 | 4.15 | 2.15 |
| Second sweep stream (163) | Salinity [—] | 8% | 11% | 18% |
|  | Flow rate [kg/h] | 1.88 | 1.45 | 0.75 |
| Second diluted sweep stream (165) | Salinity [—] | 5.68% | 4.18% | 3.27% |
|  | Flow rate [kg/h] | 2.65 | 3.82 | 4.129 |
| Purified water stream (168) | Salinity [—] | 0% | 0% | 0% |
|  | Flow rate [kg/h] | 3 | 1.62 | 0.39 |
| Feed Osmotic Module flow through the membrane (102) | Flow rate [kg/h] | 3 | 1.62 | 0.39 |
| Purification Osmotic Module flow through the membrane (122) | Flow rate [kg/h] | 3 | 1.62 | 0.39 |
| Isolation Osmotic Module flow through the membrane (112) | Flow rate [kg/h] | 0.77 | 2.37 | 3.38 |

In the above example, the demand for membranes in the isolated osmotic module is greater at the start than in the final time columns.

In alternative embodiments, the need for additional membranes can be avoided by incorporating sufficient membranes for high recovery operation in the modules. In some such embodiments, low recovery operation can be achieved at extremely low pressures. As the salinity of the streams within the system increases, increases in pumping pressure to the feed, RO, and isolation osmotic module (112) may be sufficient.

Transient feed salinity operation may also be accomplished with a constant sweep stream salinity, in some cases. In some such embodiments, the sweep stream is maintained at a high but constant salinity, and the differential pressure across the feed osmotic module (102) is adjusted to control flow into the sweep stream.

In some embodiments, initially, the salinity of the first sweep stream may be higher than the salinity of the feed stream such that the difference in osmotic pressure across the membranes of the feed osmotic module (102) is sufficient to draw water from the feed stream through the osmotic membranes to mix with and dilute the first sweep stream and concentrate the feed stream. In the art, this process is known as forward osmosis.

In an alternative embodiment, the osmotic difference across the feed osmotic module (102) at the start of the process can be used to generate energy in a process known as pressure retarded osmosis. In such embodiments, the first sweep stream may be pressurized by forward osmosis flow through the membrane within the feed osmotic module (102), and depressurized through an energy recovery device or power generating turbine after exiting the feed osmotic module (102). Recovered energy can be transferred to other components in the system, or transferred from the system, or stored to reduce the energy requirements of the high salinity portion of the concentration cycle.

The feed stream concentrate may be recirculated back to the feed tank and reintroduced to the feed osmotic module (102) at a higher salinity than the at the start of the process. As the salinity of the feed stream rises, the difference in osmotic pressure across the membranes of the feed osmotic module (102) generally decreases, resulting in lower flux. The reduced osmotic driving force may be compensated by increased hydraulic pressure. In some embodiments, a high-pressure pump may be used to increase the pressure of the feed stream prior to entering the feed osmotic module (102), in order to increase flux. In accordance with certain embodiments, once the salinity of the feed stream eclipses the salinity of the first sweep stream, hydraulic pressure is required to overcome the osmotic force of the salinity difference.

An example of this type of constant sweep stream salinity transient feed salinity operation is shown in Table 2 below.

TABLE 2

Stream Properties During Exemplary Constant Sweep Stream Salinity/Transient Feed Salinity Operation

| | | Start | Final |
|---|---|---|---|
| Feed stream inlet (156) | Salinity [—] | 7% | 18% |
| | Flow rate [kg/h] | 10 | 3.89 |
| Feed stream outlet (155) | Salinity [—] | 10% | 20% |
| | Flow rate [kg/h] | 7 | 3.5 |
| First sweep stream (160) | Salinity [—] | 18% | 18% |
| | Flow rate [kg/h] | 2.8 | 1.4 |
| First diluted sweep stream (162) | Salinity [—] | 8.7% | 14.08% |
| | Flow rate [kg/h] | 5.8 | 1.79 |
| Combined diluted sweep stream (167) | Salinity [—] | 4.87% | 5.66% |
| | Flow rate [kg/h] | 15.93 | 6.84 |
| Partially concentrated sweep stream (166) | Salinity [—] | 6% | 6% |
| | Flow rate [kg/h] | 12.93 | 6.45 |
| More concentrated sweep stream (164) | Salinity [—] | 18% | 18% |
| | Flow rate [kg/h] | 4.31 | 2.15 |
| Second sweep stream (163) | Salinity [—] | 18% | 18% |
| | Flow rate [kg/h] | 1.51 | 0.75 |
| Second diluted sweep stream (165) | Salinity [—] | 2.68% | 2.67% |
| | Flow rate [kg/h] | 10.13 | 5.05 |
| Purified water stream (168) | Salinity [—] | 0% | 0% |
| | Flow rate [kg/h] | 3 | 0.39 |
| Feed Osmotic Module flow through the membrane (102) | Flow rate [kg/h] | 3 | 0.39 |
| Purification Osmotic Module flow through the membrane (122) | Flow rate [kg/h] | 3 | 0.39 |
| Isolation Osmotic Module flow through the membrane (112) | Flow rate [kg/h] | 8.62 | 4.3 |

As shown above, the salinities and flow rate of the sweep stream may remain relatively unchanged, despite the large change in feed salinity.

It was expected that the use of a configuration in which osmotic membranes are isolated from the feed (via the use of an isolation osmotic module), as opposed to a non-isolated configuration, would lead to (1) a need for a larger amount of osmotic membrane surface area to achieve a given amount of separated water and (2) an increase in energy consumption. Unexpectedly and counter-intuitively, however, the inventive entity has found that this is not the case. For example, the energy consumption increased from 11.6 kWh/m$^3$ to 13.4 kWh/m$^3$, and the number of modules increased from 14 units to 17 units when the configuration changed from feed-isolation to non-feed-isolation. Without wishing to be bound by any particular theory, it is believed that the reason that the non-feed-isolation configuration requires more energy is that the total volume flow in the sweep streams is higher, as shown in Table 3 below. Moreover, the volume flow rate going into the pump of the purification osmotic module is also higher for the non-feed-isolation configuration; thus the higher overall energy consumption. The number of modules is generally determined by the max flow rate (~1 m$^3$/h) in the sweep stream such that the pressure drop is below 10-15 bar. As a result, more modules are needed in parallel when the sweep flow rate increases beyond the threshold of a single module.

TABLE 3

Operational Parameters for Exemplary Feed Isolation and Non–Feed Isolation Operations

| Configuration | Sweep stream flow rate (kg/h) | RO influent flow rate (kg/h) |
|---|---|---|
| Feed isolation + brine split (FIBS) | 0.9–9.6 | 16.2 |
| Brine split (BS) | 2.3–16.0 | 19.1 |

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

As used herein in the specification and in the claims, the phrase "at least a portion" means some or all. "At least a portion" may mean, in accordance with certain embodiments, at least 1 wt %, at least 2 wt %, at least 5 wt %, at least 10 wt %, at least 25 wt %, at least 50 wt %, at least 75 wt %, at least 90 wt %, at least 95 wt %, or at least 99 wt %, and/or, in certain embodiments, up to 100 wt %.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method of operating an osmotic system, the osmotic system comprising:
   a feed osmotic module comprising:
      a retentate side,
      a permeate side, and
      at least one osmotic membrane between the retentate side and the permeate side; and an isolation osmotic module comprising:
      a retentate side,
      a permeate side, and
      at least one osmotic membrane between the retentate side and the permeate side;
   wherein the retentate side of the isolation osmotic module is fluidically connected to the permeate side of the feed osmotic module; and
   wherein the method comprises:
      during both a first period of time and a second period of time, transporting a feed solution comprising a solvent and a solute to the retentate side of the feed osmotic module such that the feed solution enters the retentate side of the feed osmotic module;
      during both the first period of time and the second period of time, operating the feed osmotic module to produce:
         a feed osmotic module retentate outlet stream exiting the retentate side of the feed osmotic module, the feed osmotic module retentate outlet stream having a solute concentration that is greater than a solute concentration of the feed solution entering the retentate side of the feed osmotic module, and
         a feed osmotic module permeate outlet stream that exits the permeate side of the feed osmotic module, the feed osmotic module permeate outlet stream comprising at least a portion of the solvent from the feed osmotic module retentate inlet stream;

during both the first period of time and the second period of time, transporting an isolation osmotic module retentate inlet stream comprising at least a portion of the feed osmotic module permeate outlet stream to the retentate side of the isolation osmotic module such that the isolation osmotic module retentate inlet stream enters the retentate side of the isolation osmotic module; and during both the first period of time and the second period of time, operating the isolation osmotic module to produce:
  an isolation osmotic module retentate outlet stream exiting the retentate side of the isolation osmotic module, the isolation osmotic module retentate outlet stream having an osmotic pressure that is greater than an osmotic pressure of the isolation osmotic module retentate inlet stream, and
  an isolation osmotic module permeate outlet stream that exits the permeate side of the isolation osmotic module, the isolation osmotic module permeate outlet stream comprising at least a portion of solvent from the isolation osmotic module retentate inlet stream;

wherein:
  during the first period of time, the retentate side of the feed osmotic module receives at least a portion of the feed osmotic module retentate outlet stream; and
  during the second period of time, the retentate side of the feed osmotic module no longer receives any portion of the feed osmotic module retentate outlet stream or receives an amount of the feed osmotic module retentate outlet stream that is less than the amount of the feed osmotic module retentate outlet stream received by the retentate side of the feed osmotic module during the first period of time.

2. The method of claim 1, further comprising transferring a feed osmotic module permeate inlet stream to the permeate side of the feed osmotic module, wherein the feed osmotic module permeate inlet stream comprises at least a portion of the isolation osmotic module retentate outlet stream.

3. The method of claim 2, wherein the retentate side of the isolation osmotic module is fluidically connected to the permeate side of the isolation osmotic module, and wherein the method further comprises transferring an isolation osmotic permeate inlet stream to the permeate side of the isolation osmotic module, wherein the isolation osmotic module permeate inlet stream comprises at least a portion of the isolation osmotic module retentate outlet stream.

4. The method of claim 3, wherein:
the osmotic system further comprises a purification osmotic module comprising:
  a retentate side fluidically connected to the retentate side of the isolation osmotic module,
  a permeate side, and
  at least one osmotic membrane between the retentate side and the permeate side, and
the method further comprises transporting a purification osmotic module retentate inlet stream to the retentate side of the purification osmotic module, and operating the purification osmotic module to produce a purification osmotic module retentate outlet stream that exits the retentate side of the purification osmotic module, wherein the isolation osmotic module retentate inlet stream comprises at least a portion of the purification osmotic module retentate outlet stream, and wherein the purification osmotic module retentate inlet stream comprises at least a portion of the feed osmotic module permeate outlet stream and/or at least a portion of the isolation osmotic module permeate outlet stream.

5. The method of claim 4, wherein
at least a portion of the isolation osmotic module permeate outlet stream is transported to the retentate side of the purification osmotic module.

6. The method of claim 4, wherein
at least a portion of the feed osmotic module permeate outlet stream is transported to the retentate side of the purification osmotic module.

7. The method of claim 6, wherein
at least a portion of the isolation osmotic module permeate outlet stream is transported to the retentate side of the purification osmotic module.

8. The method of claim 1, wherein the retentate side of the isolation osmotic module is fluidically connected to the permeate side of the isolation osmotic module, and wherein the method further comprises transferring an isolation osmotic permeate inlet stream to the permeate side of the isolation osmotic module, wherein the isolation osmotic module permeate inlet stream comprises at least a portion of the isolation osmotic module retentate outlet stream.

9. The method of claim 1, wherein:
the osmotic system further comprises a purification osmotic module comprising:
  a retentate side fluidically connected to the retentate side of the isolation osmotic module,
  a permeate side, and
  at least one osmotic membrane between the retentate side and the permeate side, and
the method further comprises transporting a purification osmotic module retentate inlet stream to the retentate side of the purification osmotic module, and operating the purification osmotic module to produce a purification osmotic module retentate outlet stream that exits the retentate side of the purification osmotic module, wherein the isolation osmotic module retentate inlet stream comprises at least a portion of the purification osmotic module retentate outlet stream, and wherein the purification osmotic module retentate inlet stream comprises at least a portion of the feed osmotic module permeate outlet stream and/or at least a portion of the isolation osmotic module permeate outlet stream.

10. The method of claim 1, wherein:
the osmotic system further comprises a purification osmotic module comprising:
  a retentate side fluidically connected to the permeate side of the feed osmotic module,
  a permeate side, and
  at least one osmotic membrane between the retentate side and the permeate side, and the method further comprises:
  producing a feed osmotic module permeate outlet stream that exits the permeate side of the feed osmotic module,
  transporting a purification osmotic module retentate inlet stream to the retentate side of the purification osmotic module, and
  operating the purification osmotic module to produce a purification osmotic module retentate outlet stream that exits the retentate side of the purification osmotic module, wherein the purification osmotic module retentate inlet stream comprises at least a portion of the feed osmotic module permeate outlet stream.

11. The method of claim 1, wherein:
the osmotic system further comprises a purification osmotic module comprising:
a retentate side fluidically connected to the permeate side of the isolation osmotic module,
a permeate side, and
at least one osmotic membrane between the retentate side and the permeate side, and the method further comprises:
producing an isolation osmotic module permeate outlet stream that exits the permeate side of the isolation osmotic module,
transporting a purification osmotic module retentate inlet stream to the retentate side of the purification osmotic module, and
operating the purification osmotic module to produce a purification osmotic module retentate outlet stream that exits the retentate side of the purification osmotic module, wherein the purification osmotic module retentate inlet stream comprises at least a portion of the isolation osmotic module permeate outlet stream.

12. The method of claim 1, wherein, during the second period of time, less than or equal to 90 wt % of the feed osmotic module retentate outlet stream exiting the retentate side of the feed osmotic module is recycled back to the retentate side of the feed osmotic module.

13. The method of claim 1, wherein, during the second period of time, none of the feed osmotic module retentate outlet stream exiting the retentate side of the feed osmotic module is recycled back to the retentate side of the feed osmotic module.

14. The method of claim 1, wherein the feed osmotic module is operated as a reverse osmosis module.

15. The method of claim 1, wherein:
the osmotic system further comprises a purification osmotic module comprising:
a retentate side fluidically connected to the permeate side of the feed osmotic module and/or the permeate side of the isolation osmotic module,
a permeate side, and
at least one osmotic membrane between the retentate side and the permeate side, and the method further comprises:
transporting a purification osmotic module retentate inlet stream to the retentate side of the purification osmotic module, and
operating the purification osmotic module to produce a purification osmotic module retentate outlet stream that exits the retentate side of the purification osmotic module, wherein the purification osmotic module is operated as a reverse osmosis module, and wherein the purification osmotic module retentate inlet stream comprises at least a portion of the feed osmotic module permeate outlet stream and/or at least a portion of the isolation osmotic module permeate outlet stream.

16. The method of claim 1, wherein the isolation osmotic module is operated as a reverse osmosis module.

17. The method of claim 1, wherein the feed osmotic module comprises a plurality of osmotic membranes.

18. The method of claim 1, wherein the isolation osmotic module comprises a plurality of osmotic membranes.

19. The method of claim 1, wherein the solute concentration in the feed osmotic module retentate outlet stream is at least 1% higher, on a mass basis, than the concentration of the solute in the feed solution.

20. The method of claim 1, wherein:
the osmotic system further comprises a purification osmotic module comprising:
a retentate side fluidically connected to the permeate side of the feed osmotic module and/or the permeate side of the isolation osmotic module,
a permeate side, and
at least one osmotic membrane between the retentate side and the permeate side, and the method further comprises:
transporting a purification osmotic module retentate inlet stream to the retentate side of the purification osmotic module, and
operating the purification osmotic module to produce a purification osmotic module retentate outlet stream that exits the retentate side of the purification osmotic module, wherein, during the first period of time, the total amount of osmotic membrane surface area within the retentate side of the feed osmotic module is changed, the total amount of osmotic membrane surface area within the retentate side of the isolation osmotic module is changed, and/or the total amount of osmotic membrane surface area within a retentate side of the purification osmotic module is changed, and wherein the purification osmotic module retentate inlet stream comprises at least a portion of the feed osmotic module permeate outlet stream and/or at least a portion of the isolation osmotic module permeate outlet stream.

21. The method of claim 1, wherein, during the first period of time, the total amount of osmotic membrane surface area within the retentate side of the feed osmotic module decreases, as a function of time, by at least 5%.

22. The method of claim 1, wherein, during the first period of time, the total amount of osmotic membrane surface area within the retentate side of the isolation osmotic module increases, as a function of time, by at least 5%.

23. The method of claim 1, wherein, during the first period of time, the retentate side of the isolation osmotic module receives at least a portion of the isolation osmotic module retentate outlet stream.

* * * * *